United States Patent
Sudoh et al.

(10) Patent No.: US 7,864,443 B2
(45) Date of Patent: Jan. 4, 2011

(54) ZOOM LENS, IMAGING APPARATUS, AND PERSONAL DATA ASSISTANT

(75) Inventors: Yoshifumi Sudoh, Machida (JP); Hiromichi Atsuumi, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 12/329,247

(22) Filed: Dec. 5, 2008

(65) Prior Publication Data

US 2009/0147375 A1 Jun. 11, 2009

(30) Foreign Application Priority Data

Dec. 7, 2007 (JP) ............................. 2007-317756
Mar. 25, 2008 (JP) ............................. 2008-079377

(51) Int. Cl.
*G02B 15/14* (2006.01)

(52) U.S. Cl. ..................... 359/684; 359/676; 359/683

(58) Field of Classification Search .............. 359/676, 359/678, 683–684; 396/72–88; 348/240.99–240.3
See application file for complete search history.

(56) References Cited

U.S. PATENT DOCUMENTS

| | | | |
|---|---|---|---|
| 5,233,454 A | 8/1993 | Sakuma et al. | |
| 5,355,244 A | 10/1994 | Suzuki et al. | |
| 5,408,095 A | 4/1995 | Atsuumi et al. | |
| 5,426,298 A | 6/1995 | Sakuma et al. | |
| 5,459,601 A | 10/1995 | Suzuki et al. | |
| 5,475,522 A | 12/1995 | Itabashi et al. | |
| 5,504,613 A | 4/1996 | Itabashi et al. | |
| 5,684,618 A | 11/1997 | Atsuumi et al. | |
| 6,078,419 A | 6/2000 | Atsuumi et al. | |
| 6,198,563 B1 | 3/2001 | Atsuumi et al. | |
| 6,388,792 B1 | 5/2002 | Atsuumi et al. | |
| 6,417,509 B1 | 7/2002 | Atsuumi et al. | |
| 6,448,998 B1 | 9/2002 | Suzuki et al. | |
| 6,509,995 B1 | 1/2003 | Suzuki et al. | |
| 6,596,985 B2 | 7/2003 | Sakai et al. | |
| 6,606,179 B2 | 8/2003 | Suzuki et al. | |
| 6,697,183 B2 | 2/2004 | Atsuumi et al. | |
| 6,771,407 B2 | 8/2004 | Hayashi et al. | |
| 6,781,729 B2 | 8/2004 | Suzuki et al. | |

(Continued)

FOREIGN PATENT DOCUMENTS

JP 08-248318 9/1996

(Continued)

*Primary Examiner*—Darryl J Collins
*Assistant Examiner*—Zachary Wilkes
(74) *Attorney, Agent, or Firm*—Dickstein Shapiro LLP

(57) ABSTRACT

A zoom lens includes a first optical system having a positive focal length, the first optical system, a second optical system having a negative focal length, a third optical system having a positive focal length, a fourth optical system having a negative focal length, and a fifth optical system having a positive focal length, which are arranged in order from an object side to an image side and an aperture stop provided at an object side of the third optical system. The following condition is satisfied:

$$0.5 < (T23w/Y')/(ft/fw) < 1.0$$

where $T23w$ is an interval between the second optical system and the third optical system at the short focus end, $Y'$ is a maximum image height of the zoom lens, $ft$ is a focal length of the zoom lens at the long focus end, and $fw$ is a focal length of the zoom lens at the short focus end.

8 Claims, 42 Drawing Sheets

U.S. PATENT DOCUMENTS

| | | |
|---|---|---|
| 6,785,028 B1 | 8/2004 | Atsuumi et al. |
| 6,791,729 B2 | 9/2004 | Atsuumi et al. |
| 6,800,845 B2 | 10/2004 | Sakai et al. |
| 6,801,351 B2 | 10/2004 | Suzuki et al. |
| 6,829,104 B2 | 12/2004 | Suzuki et al. |
| 6,937,371 B2 | 8/2005 | Hayashi et al. |
| 6,961,164 B2 | 11/2005 | Atsuumi et al. |
| 6,999,208 B2 | 2/2006 | Suzuki et al. |
| 7,006,120 B2 | 2/2006 | Sakai et al. |
| 7,012,724 B2 | 3/2006 | Atsuumi et al. |
| 7,038,822 B2 | 5/2006 | Sakai et al. |
| 7,050,210 B2 | 5/2006 | Atsuumi et al. |
| 7,068,407 B2 | 6/2006 | Sakai et al. |
| 7,106,483 B2 | 9/2006 | Hayashi et al. |
| 7,126,737 B2 | 10/2006 | Atsuumi et al. |
| 7,154,651 B2 | 12/2006 | Atsuumi et al. |
| 7,164,516 B2 | 1/2007 | Hayashi et al. |
| 7,215,354 B1 | 5/2007 | Sakai et al. |
| 7,236,281 B2 | 6/2007 | Hayashi et al. |
| 7,271,823 B2 | 9/2007 | Izumi et al. |
| 7,298,537 B2 | 11/2007 | Hayashi et al. |
| 7,372,635 B2 * | 5/2008 | Morooka et al. ............ 359/678 |
| 7,372,636 B2 | 5/2008 | Sudoh |
| 7,397,591 B2 | 7/2008 | Hayashi et al. |
| 7,505,210 B2 * | 3/2009 | Kuroda et al. ............... 359/676 |
| 2005/0275735 A1 | 12/2005 | Nanjo |
| 2005/0280884 A1 | 12/2005 | Atsuumi et al. |
| 2006/0238845 A1 | 10/2006 | Atsuumi et al. |
| 2006/0279853 A1 | 12/2006 | Morooka et al. |
| 2007/0008418 A1 | 1/2007 | Kuroda et al. |
| 2007/0139788 A1 | 6/2007 | Watanabe |
| 2007/0206261 A1 | 9/2007 | Hayashi et al. |
| 2007/0247726 A1 | 10/2007 | Sudoh |
| 2009/0046374 A1 * | 2/2009 | Ohtake ....................... 359/684 |

FOREIGN PATENT DOCUMENTS

| | | |
|---|---|---|
| JP | 2005-215165 | 8/2005 |
| JP | 2005352348 | 12/2005 |
| JP | 2007-003598 | 1/2007 |
| JP | 2007-171456 | 7/2007 |

* cited by examiner

FIG. 5
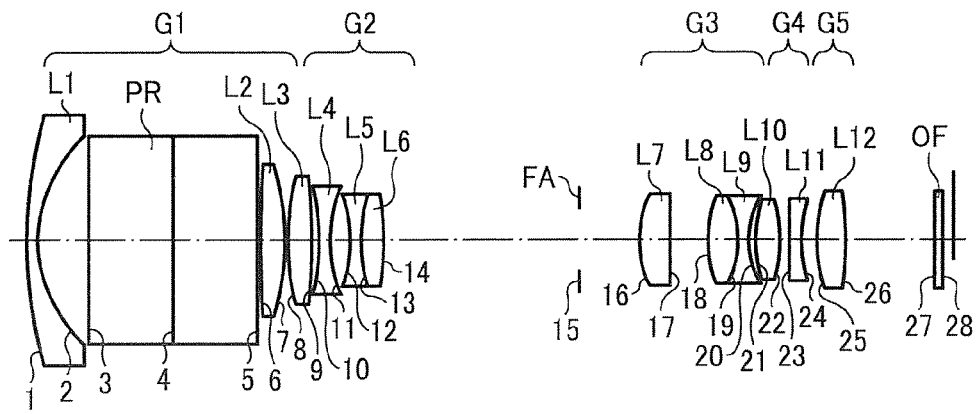
Wide
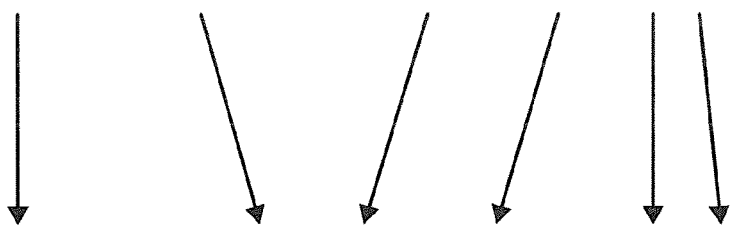
Mean
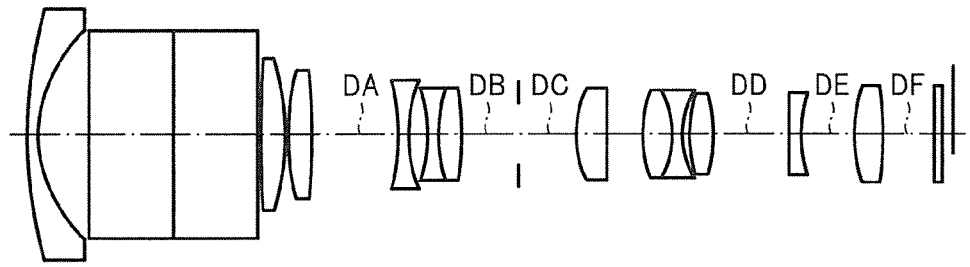
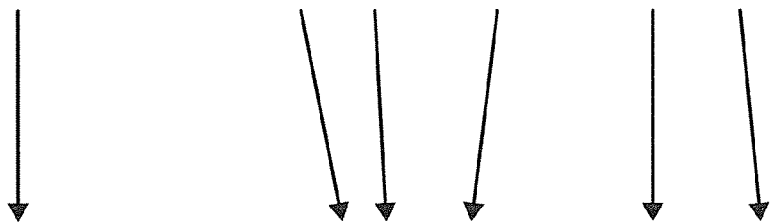
Tele
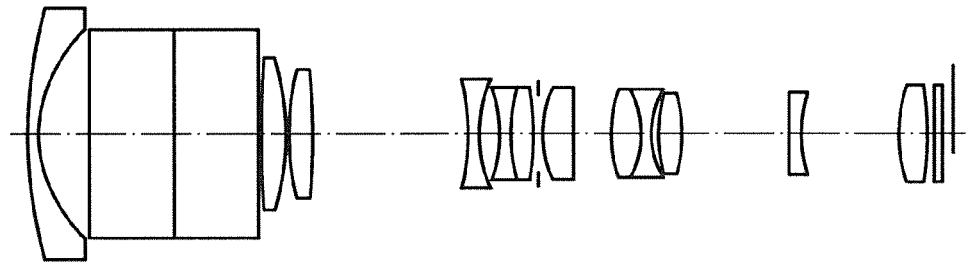

FIG. 9
Wide
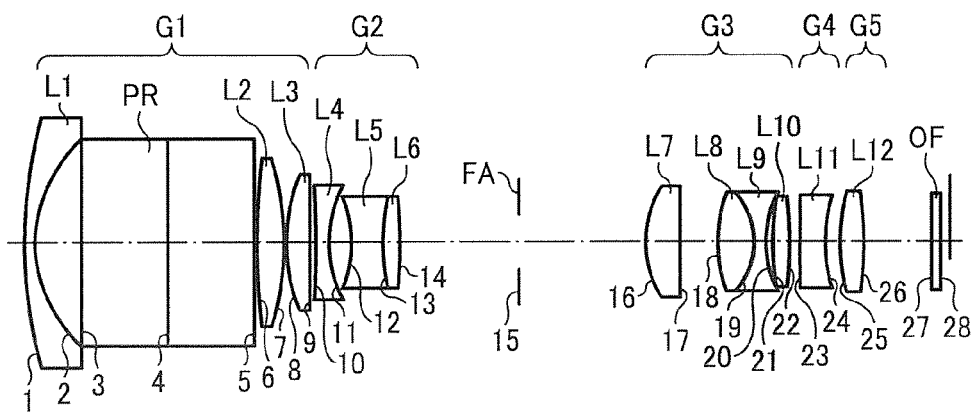
Mean
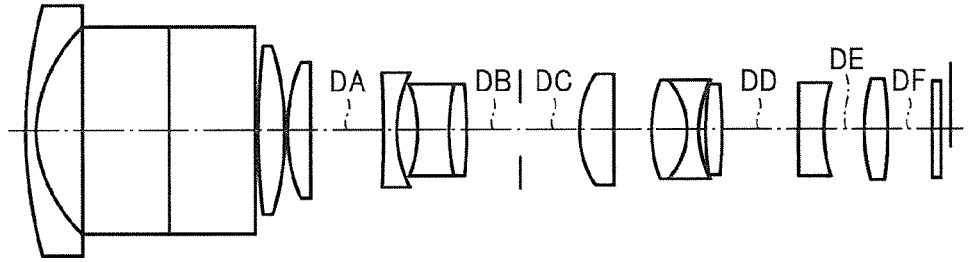
Tele
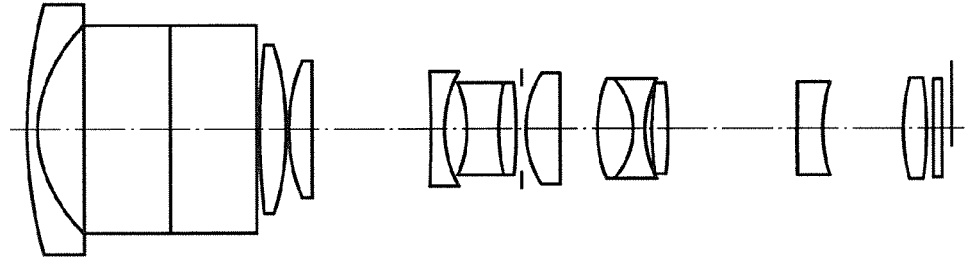

FIG. 13
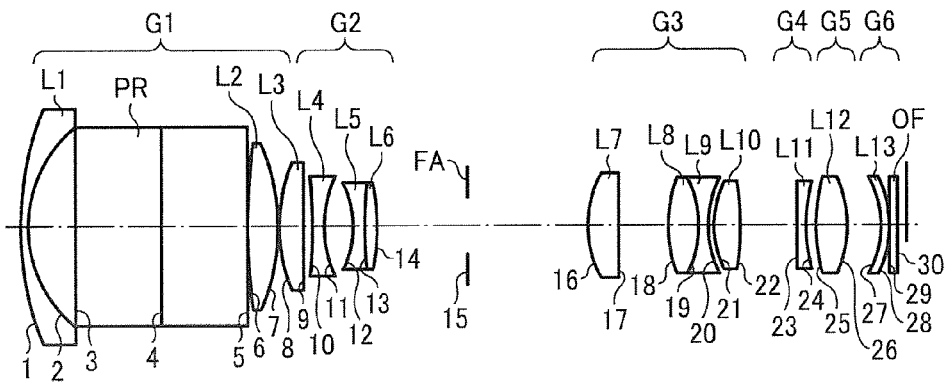
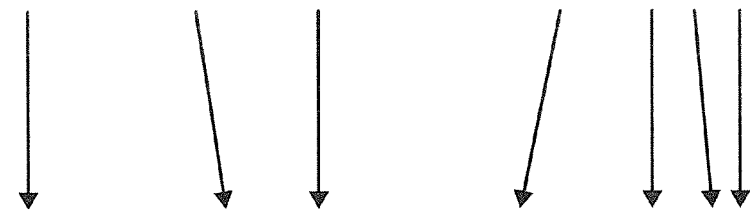
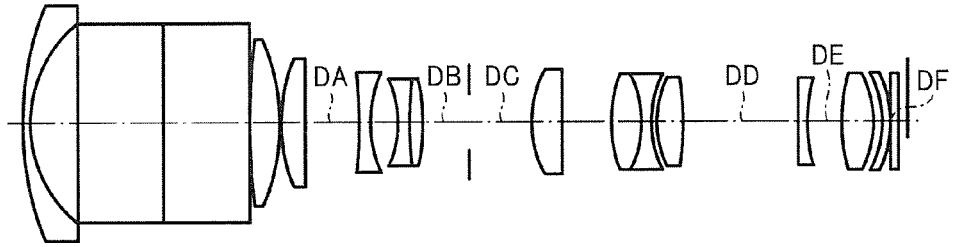
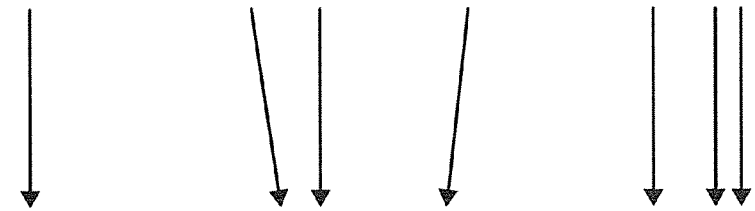
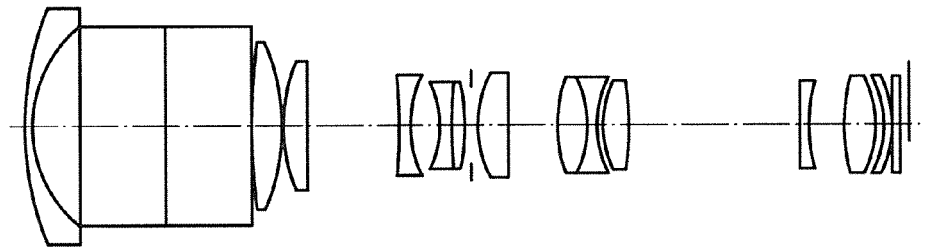

FIG. 21
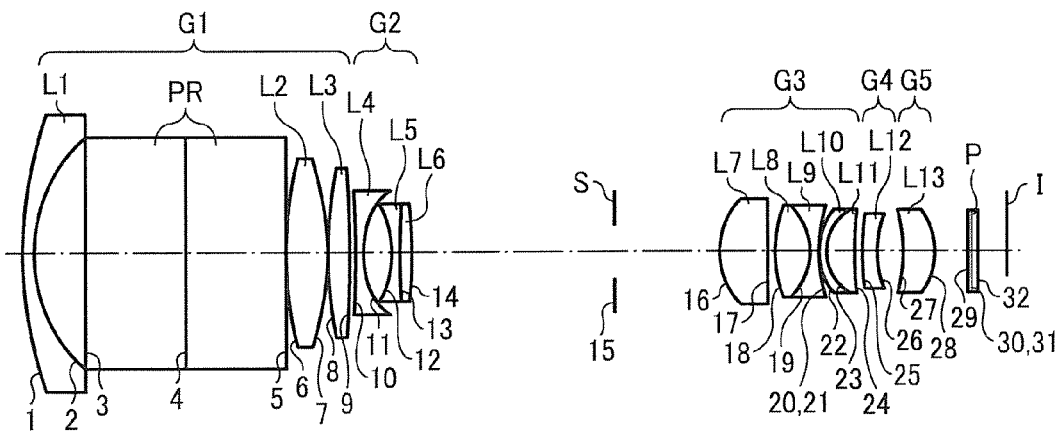
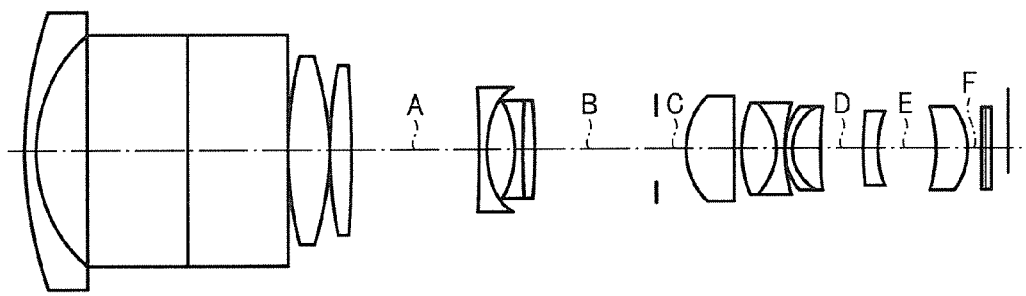
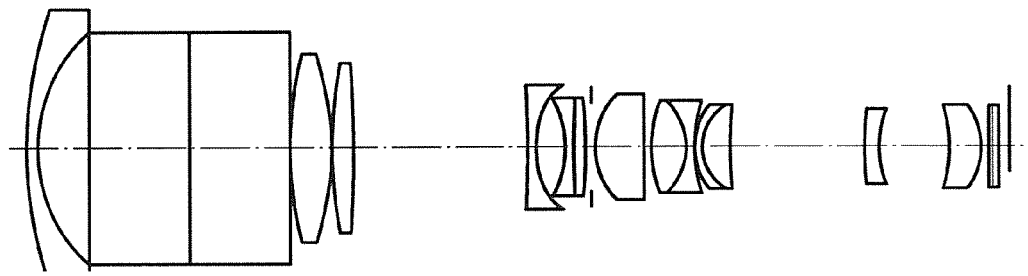

ZOOM LENS, IMAGING APPARATUS, AND PERSONAL DATA ASSISTANT

CROSS REFERENCE TO RELATED APPLICATIONS

The present application is based on and claims priority from Japanese Application Numbers 2007-317756 filed on Dec. 7, 2007 and 2008-079377 filed on Mar. 25, 2008, the disclosures of which are hereby incorporated by reference herein in their entirety.

BACKGROUND OF THE INVENTION

1. Field of the Invention

The present invention relates to a zoom lens which selects and sets a focal length as needed within a predetermined focal length range. The present invention further relates to an improved zoom lens having a large aperture, a wide angle of view in addition to a small size, high image quality and a high variable magnification ratio. The zoom lens according to the present invention can also be used in a silver salt camera with a silver salt film but the zoom lens is preferably used in an imaging apparatus using an electronic image pickup device which converts images into digital information. In particular, the present invention relates to a zoom lens used in a digital camera, a video camera, a personal computer, a mobile computer, a cell phone, a mobile information terminal device, personal digital assistant (PDA) or the like.

2. Description of the Related Art

In recent years, there are increased needs for a digital camera with high image quality, a small size, a wide angle of view and a high variable magnification ratio or the like. Product development corresponding to these needs is necessary. Therefore, a zoom lens with a high variable magnification ratio of 5 or more is necessary as a photographic lens and in order to use it for a light receiving element whose pixel number exceeds ten million pixels, a zoom lens with high image quality, a small size, a wide angle of view and a large aperture is required.

A zoom lens where in order from an object side a first optical system or a first lens group having a positive focal length, a second optical system or a second lens group having a negative focal length, a third optical system or a third lens group having a positive focal length, a fourth optical system or a fourth lens group having a negative focal length and a fifth optical system or a fifth lens group having a positive focal length are disposed and the first optical system includes a deflection optical element such as a reflective member or the like is disclosed, for example, in JP2005-215165A, JP2006-352348A, JP2007-171456A and JP2007-3598A and so on.

In addition, when a zoom lens with high performance is adapted to a high end digital camera, resolution corresponding to an image pickup device of about at least 5 million to 10 million pixels must be obtained across the whole zoom area.

Furthermore, many users also require a photographic lens with a wide angle of view and a high variable magnification ratio. A half angle of view at a wide angle end of the room lens should preferably be set to above 38 degrees. The 38 degrees half angle of view is equal to 28 mm when converted to a focal length of a 35 mm silver salt camera (so called Leica version). On the other hand, a variable magnification ratio of 5 or more is needed.

For the above requirements, JPH8-248318A and JP2005-215165A disclose a conventional zoom lens in which a thinner shape in an optical axis direction of the camera is attained by inserting a prism within the optical system.

That is, JPH8-248318A discloses a zoom lens that has disposed in order from an object side a variable magnification system constituted from a first optical system having a positive refractive power and a second optical system having a negative refractive power, an aperture, a fixed third optical system having a positive refractive power, a fourth optical system having a positive refractive power and which is movable for adjusting a focus position at a time where the distance to an subject changes or when changing the magnification or the like.

The first optical system of the zoom lens includes in order from the object side a first concave lens, an orthogonal prism, a first convex lens, a second concave lens and a cemented lens of a second convex lens.

In addition, JP2005-215165A discloses a zoom lens that includes in order from an object side a first lens group having a positive refractive power and which is fixed when zooming, a second lens group having a negative refractive power, a third lens group having a positive refractive power, a fourth lens group having a negative refractive power, a fifth lens group having a positive refractive power in which zooming is performed by moving at least the second lens group and the fourth lens group. The first lens group of the zoom lens includes in order from the object side a single first lens having a negative refractive power, a reflective member to bond a light path by 90 degrees and at least one second lens having a positive refractive power.

However, the zoom lenses disclosed in JPH8-248318A and JP2006-215165A are well suited for video cameras. In the specific embodiments, the variable magnification ratio is 8 or more in JP2005-215165A and 7 or more in JP2005-215165A. But in contrast to such a large variable magnification ratio, the half angle of view at the wide-angle end is about 33 degrees in JPH8-248318A and about 34 degrees in JP2005-215165A so that the requirement of more than 38 degrees imposed on a digital camera is not satisfied.

In JP2005-215165A, the numerical example 2 of the second embodiment discloses an example of a zoom lens of a high magnification zoom with a zoom ratio of 7. However, in this case, an aperture and the third optical system (third lens group) have an integrated constitution so that when the angle of view is widened, the optical systems disposed after the aperture towards the object side become too large and it becomes difficult to correct the aberration. Therefore, in this example, a wide angle of view of 38 degrees or more is not realized.

In JP2005-352348A, the numerical example 3 of the third embodiment discloses an example of a zoom lens of high variable magnification and wide angle in which the zoom ratio is about 35 and the wide angle of view is above 38 degrees. However, in this case, an aperture and the third optical system (third lens group) have an integrated constitution so that the size is too large. In addition, in this case, distortion becomes exceedingly large and high performance is no longer realized.

JP2007-171456A discloses in the third embodiment a zoom lens of high variable magnification and wide angle in which the zoom ratio is about 7 and the wide angle of view is above 38 degrees. However, in this case also, an aperture and the third optical system (third lens group) are integrally disposed so that a light path can only be bent in a short side direction of an image pickup device as an image pickup surface by a reflective member as the deflection optical element. Therefore, the layout of the camera becomes difficult. Under such a constitution, in order to bend the light path in a long side or longitudinal direction, the prism as the reflective member needs to be enlarged so that the first optical system (first lens group) becomes large and it becomes difficult to correct the aberration.

In each embodiment of JP2007-3598A, it is disclosed that an interval between an aperture and the third optical system (third lens group) is decreased when changing the magnification from a short focus end to a long focus end. However, in this case, a wide angle of view of 38 degrees or more and a high variable magnification ratio of 5 or more are not realized. Furthermore, under such a constitution, in order to realize a wide angle of view and a high variable magnification ratio, the conditions described in Claim 1 of JP2007-3598A needs to be satisfied.

SUMMARY OF THE INVENTION

An object of the present invention is to provide a zoom lens, an imaging apparatus, a personal data assistant in which various aberrations such as chromatic aberration of magnification, chromatic coma aberration, or the like can be appropriately corrected while achieving a small size body in thickness in an optical axis direction, high performance, wide half angle of view of, for example, 38 degrees or more, high variable magnification ratio of, for example, 5 or more, and high resolution of, for example, $5 \times 10^6$ to $10^7$ pixels.

To achieve the above object, a zoom lens according to an embodiment of the present invention includes a first optical system having a positive focal length, the first optical system including a deflection optical element, a second optical system having a negative focal length, a third optical system having a positive focal length, a fourth optical system having a negative focal length, a fifth optical system having a positive focal length, the first to fifth optical systems being arranged in order from an object side to an image side, and an aperture stop provided at an object side of the third optical system. When changing a magnification of the zoom lens from a short focus end to a long focus end, an interval between the first optical system and the second optical system increases, an interval between the second optical system and the aperture stop decreases, an interval between the aperture stop and the third optical system decreases, an interval between the third optical system and the fourth optical system increases, and an interval between the fourth optical system and the fifth optical system varies. The following condition is satisfied:

$$0.5 < (T23w/Y')/(ft/fw) < 1.0$$

where T23w is an interval between the second optical system and the third optical system at the short focus end, Y' is a maximum image height of the zoom lens, ft is a focal length of the zoom lens at the long focus end, and fw is a focal length of the zoom lens at the short focus end.

BRIEF DESCRIPTION OF THE DRAWINGS

FIG. 5 is a sectional view schematically illustrating configurations of an optical system in a zoom lens according to Example 2 of the first embodiment of the present invention along an optical axis of the zoom lens.

FIG. 9 is a sectional view schematically illustrating configurations of an optical system in a zoom lens according to Example 3 of the first embodiment of the present invention along an optical axis of the zoom lens.

FIG. 13 is a sectional view schematically illustrating configurations of an optical system in a zoom lens according to Example 4 of the first embodiment of the present invention along an optical axis of the zoom lens.

FIG. 21 is a sectional view schematically illustrating configurations of an optical system in a zoom lens according to Example 6 of the present invention.

DETAILED DESCRIPTION OF THE PREFERRED EMBODIMENTS

Figure 1:
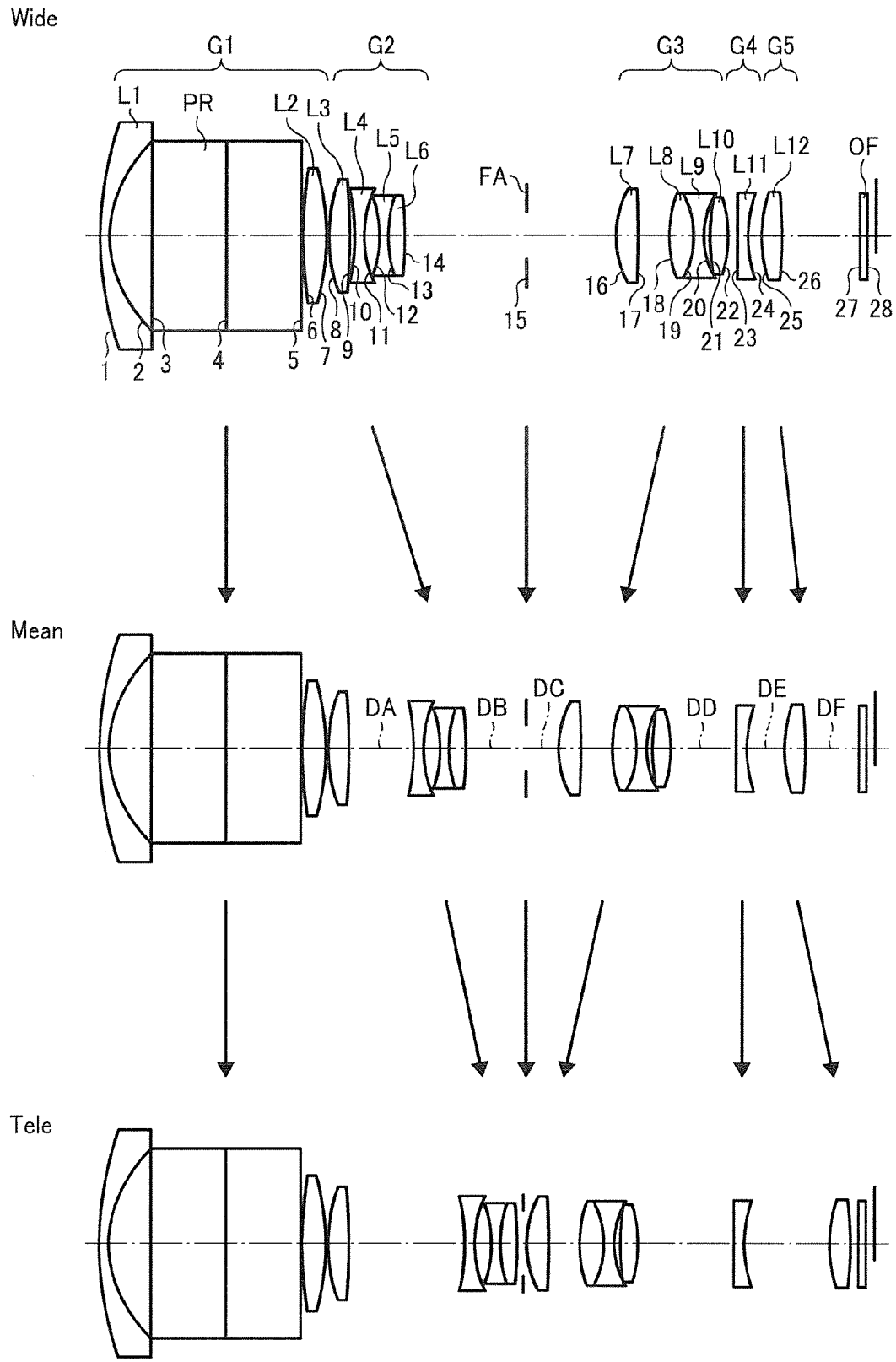
FIG. 1 is a sectional view schematically illustrating configurations of an optical system in a zoom lens according to Example 1 of a first embodiment of the present invention along an optical axis of the zoom lens.

Preferred embodiments of a zoom lens, an imaging apparatus, and a personal data assistant of the present invention will be described in detail with reference to the accompanying drawings below.

First, A zoom lens according to a first embodiment of the present invention will be explained.

Currently, for a digital camera, there are demands for high image quality, small size, and wide angle increase and, in order to meet the demands, a zoom lens in negative-lead type is of current interest as an imaging optical system in such a digital camera. In addition, from the viewpoints of portability and design, an imaging optical system capable of achieving a low thickness of the camera in total has been required and a zoom lens having a reflection surface disposed on a light path of the zoom lens to reflect and deflect a light flux has been used. In the zoom lens, the light path is bent at the reflection surface.

As an example, a zoom lens in which a first optical systems having a positive focal length, a second optical system having a negative focal length, a third optical system having a positive focal length, a fourth optical system having a positive focal length, a fifth optical system having a negative focal length, and a sixth optical system having a positive optical system are arranged in order from an object side and the first optical system has a deflection optical element has been proposed. In the zoom lens of such a type, influence due to decentering sensitivity of lens groups in the third optical system and the fourth optical system tends to be greater, and this makes production difficult.

First Embodiment

A zoom lens according to a first embodiment of the present invention includes a first optical system or a first lens group G1 having a positive focal length, a second optical system or a second lens group G2 having a negative focal length) a third optical system or a third lens group G3 having a positive focal length, a fourth optical system or a fourth lens group G4 having a negative focal length, and a fifth optical system or a fifth lens group G5 having a positive focal length, which are arranged in order from an object side. The zoom lens has also an aperture stop provided at an object side of the third optical system and the first optical system may include a deflection optical element.

When changing a magnification of the zoom lens from a short focus end to a long focus end, an interval between the first optical system and the second optical system increases, an interval between the second optical system and the aperture stop decreases, an interval between the aperture stop and the third optical system decreases, an interval between the third optical system and the fourth optical system increases, and an interval between the fourth optical system and the fifth optical system varies.

If the aperture stop is separately provided on the third optical system at an object side of the third optical system and the aperture stop is moved closer to the second optical system from the third optical system when the zoom lens is set to the short focus end, increased off-axis light due to the wide angle change can be avoided so that a small size zoom lens can be achieved. Accordingly, small size zoom lens can be achieved and aberration of off-axis light can be easily corrected.

In the zoom lens of such a type, the second optical system and the third optical system serve as variable magnification optical systems or variable magnification lens groups mainly used for changing magnification of the zoom lens. In order to achieve a high variable magnification ratio, an interval between the second optical system and the third optical system is important.

In order to achieve the variable magnification ratio of 5 or more, which achieves a wide half angle of view of 38 degrees or more, the following condition is preferably satisfied:

$$0.5 < (T23w/Y')/(ft/fw) < 1.0 \quad (1)$$

where T23w is an interval between the second optical system and the third optical system at the short focus end, Y' is a maximum image height of the zoom lens, ft is a focal length of the zoom lens at the long focus end, and fw is a focal length of the zoom lens at the short focus end.

If the value is less than the lower limit of the condition (1), the interval between the second optical system and the third optical system is too small and then power of the second optical system and the third optical system is required to be too large so that the correction of off-axis aberration throughout all the zoom range is difficult. If the value is more than the upper limit of the condition (1), the interval between the second optical system and the third optical system is too large and therefore the off-axis light passing the second optical system and the third optical system at the short focus end is high so that the correction of off-axis aberration becomes difficult.

Then, in order to achieve further small size and higher performance of the zoom lens, the following condition is preferably satisfied:

$$0.2 < Ts3w/T2sw < 1.5 \quad (2)$$

where Ts3w is an interval between the aperture stop and the third optical system at the short focus end, and T2sw is an interval between the second optical system and the aperture stop at the short focus end.

If the value is less than the lower limit of the condition (2), the aperture is largely far from the second optical system so that the off-axis light passing through the lens groups arranged at an object side of the aperture stop at the short focus end is increased. Therefore, it becomes difficult to correct the off-axis aberration for the first optical system or the second optical system. On the other hand, if the value is more than the upper limit of the condition (2), the aperture stop is largely far from the third optical system so that the off-axis light of the third optical system is increased. Therefore, it becomes difficult to correct the off-axis aberration third optical system.

A maximum aperture diameter Dt of the aperture stop at the long focus end may be larger than a maximum aperture diameter Dw of the aperture stop at the short focus end. In the configurations according to this embodiment of the present invention, if the aperture diameter of the aperture stop is the same from the short focus end to the long focus end, the F value (F number) of the zoom lens at the long focus end is more than that at the short focus end. Accordingly, the maximum aperture diameter at the long focus end is set to be larger than the maximum aperture at the short focus end so that a small full aperture F value can be obtained. If the maximum aperture diameter remains constant and the F value at the long focus end is set to be small when changing the magnification from the short focus end to the long focus end, the F value at the short focus end becomes too small and therefore it becomes difficult to correct spherical aberration, coma aberration and the like at the short focus end.

In this embodiment, the following condition is preferably satisfied:

$$2.0 > Dt/Dw > 1.1 \quad (3)$$

where Dt is a maximum aperture diameter of the aperture stop at the long focus end and Dw is a maximum aperture diameter of the aperture stop at the short focus end.

If the value is less than the lower limit of the condition (3), when the F value at the long focus end is small, the F value at the short focus end becomes too small. Accordingly, it becomes difficult to correct the spherical aberration, the coma aberration and the like at the short focus end. On the other hand, if the value is more than the upper limit of the condition (3), the F value at the long focus end becomes too small and therefore it becomes difficult to correct the spherical aberration, coma aberration and the like at the long focus end.

In this embodiment, the following conditions are preferably satisfied:

$$-3.0 < f2/Y' < -1.2 \quad (4)$$

$$2.0 < f3/Y' < 4.0 \quad (5)$$

where f2 is a focal length of the second optical system and f3 is a focal length of the third optical system.

If the value f2/Y' is less than the lower limit of the condition (4), power of the second optical system is too large so that it becomes difficult to correct the aberration in the second optical system. On the other hand, if the value f2/Y' is more than the upper limit of the condition (4), the power of the second optical system is too small. When the magnification is changed by use of the second optical system, the movement amount of the second optical system is large so that the off-axis light passing through the first optical system or the second optical system at the short focus end becomes too large and therefore the size of the zoom lens needs to be increased. Accordingly, it becomes difficult to correct the off-axis aberration.

If the value f3/Y' is less than the lower limit of the condition (5), the power of the third optical system is too large so that it becomes difficult to correct the aberration in the third optical system. On the other hand, if the value f3/Y' of the condition (5) is more than the upper limit of the condition (5), the power of the third optical system is too small and therefore the movement amount of the third optical system is too large to change the magnification of the zoom lens by use of the third optical system. Accordingly, the off-axis light entering the third optical system at the short focus end becomes too large so that it becomes difficult to correct the off-axis aberration.

In the zoom lens according to this embodiment of the present invention, the fourth optical system preferably remains still when changing the magnification of the zoom lens from the short focus end to the long focus end. If the fourth optical system is retained at a fixed position without being moved in changing the magnification of the zoom lens, it can be possible to simplify a configuration of a lens barrel where the zoom lens is provided and to ensure the accuracy for the decentering among the optical systems. Although it is advantageous to move all of the optical systems in the zoom lens to effectively correct the aberration, the configuration of the lens barrel is complex so that production errors easily occur.

Since mainly the second optical system and the third optical system are the variable magnification optical systems to change the magnification of the zoom lens, in order to achieve high performance as well as a high variable magnification ratio, the following condition is preferably satisfied:

$$3.5 > b2t/b2w > 2.0 \quad (6)$$

$$3.0 > b3t/b3w > 1.5 \quad (7)$$

where b2t is a lateral magnification of the second optical system at the long focus end, b2w is a lateral magnification of the second optical system at the short focus end, b3t is a lateral magnification of the third optical system at the long focus end, and b3w is a lateral magnification of the third optical system at the short focus end.

If the value b2t/b2w is more than the upper limit of the condition (6), the variable magnification ratio due to the second optical system is too large and therefore the movement amount of the second optical system is too large. Accordingly, a large size zoom lens is required and the off-axis light passing the first optical system or the second optical system at the short focus end is increased so that it becomes difficult to correct the off-axis aberration. If the value b2t/b2w is less than the lower limit of the condition (6), the variable magnification ratio due to the second optical system is small and therefore a large variable magnification ratio due to the other optical systems is required 80 that it becomes difficult to correct the aberration throughout all zoom range.

If the value b3t/b3w is more than the upper limit of the condition (7), the variable magnification ratio due to the third optical system is too large and therefore the movement amount of the third optical system is too large. Accordingly, a large size zoom lens is required and the off-axis light passing the third optical system at the short focus end is increased so that it becomes difficult to correct the off-axis aberration. If the value b3t/b3w is less than the lower limit of the condition (7), the variable magnification ratio due to the third optical system is small and therefore a large variable magnification ratio due to the second optical system is required so that it becomes difficult to correct the aberration throughout all zoom range of the zoom lens.

In order to achieve high performance as well as a high variable magnification ratio, the following condition is preferably satisfied:

$$1.0 > (b3t/b3w)/(b2t/b2w) > 0.5 \quad (8)$$

where b2t is a lateral magnification of the second optical system at the long focus end, b2w is a lateral magnification of the second optical system at the short focus end, b3t is a lateral magnification of the third optical system at the long focus end, and b3w is a lateral magnification of the third optical system at the short focus end.

If the value is more than the upper limit of the condition (8), the variable magnification ratio due to the third optical system becomes too large and therefore the off-axis light passing the third optical system is increased so that it is possible to correct the off-axis aberration. If the value is less than the lower limit of the condition (8), the variable magnification ratio due to the second optical system becomes too large and therefore the off-axis light passing the second optical system is increased so that it becomes difficult to correct the off-axis aberration.

Although the basic configurations of the zoom lens according to the first embodiment of the present invention are described hereinbefore, various examples of the zoom lens according to this embodiment will be explained in detail based on the specific examples with reference to FIGS. 1 to 16.

Example 1

Specific examples of the zoom lens according to the first embodiment of the present invention will be explained in detail. Examples 1, 2, 3, and 4 show specific configurations of the zoom lens according to this embodiment based on the specific examples. In Examples 1 to 4, the configurations and the specific examples are shown.

In Examples 1 to 4, the zoom lens further includes an optical element, which is disposed at an image side of the fifth lens group and is formed in a parallel plate form. The optical element is, for example, an optical filter such as an optical low-pass filter, an infrared cut filter or the like, or a cover glass (seal glass) of a light-receiving element such as a COD sensor or the like and is referred to as a filter hereinafter.

In addition, in Examples 1 to 4, aspheric surfaces in an image-side surface of a lens disposed at the most object side of the first lens group G1, an image-side surface of a lens disposed at most object side of the second lens group G2, and in both of the most object-side and most image-side surfaces of the third lens group G3. Although each aspheric surface in Examples 1 to 4 is a so-called aspheric mold lens, each aspheric surface may be formed of a so-called aspheric hybrid lens in which resin films are laid on a spherical lens to form an aspheric surface.

The aberration is sufficiently corrected in Examples 1 to 4, and the zoom lens can be applied to a light-receiving element having $10^7$ pixels. Due to the configurations of the zoom lens according to the embodiments of the present invention, the wide half angle of view of 38 degrees or more, the sufficiently small size of the zoom lens, and excellent image performance can be achieved.

Reference numbers used hereinafter denote as follows:

f: total focal length of the lens system
F (F No.): F-number (F value)
ω: half field of angle (degree)
R: curvature radius
DA, DB, DC, DD, DE, DE: (variable) interval
Nd: refractive index
vd: Abbe number K: conic constant of aspheric surface
$A_4$: fourth order aspheric coefficient
$A_6$: sixth order aspheric coefficient
$A_8$: eighth order aspheric coefficient In this regard, the aspheric surfaces used in the following examples are defined by the following equation:

$$X = \frac{CH^2}{1+\sqrt{1-(K+1)C^2H^2}} + A_4 \cdot H^4 + A_6 \cdot H^6 + A_8 \cdot H^8 \quad (9)$$

where C is an inverse of a paraxial curvature radius (paraxial curvature), and H is a height from an optical axis of the zoom lens.

FIG. 1 shows a configuration of optical systems of the zoom lens according to Example 1 of the present invention. The positions of each of the lens groups in changing from a short focus end, that is, a wide angle end (WIDE) to a long focus end, that is, a telephoto end (TELE) through an intermediate focal length position (MEAN) are shown in FIG. 1. Movement loci of each lens groups in zooming are also schematically shown in FIG. 1.

The zoom lens shown in FIG. 1 includes a first lens L1, a second lens L2, a third lens L3, a fourth lens L4, a fifth lens L5, a sixth lens L6, a seventh lens L7, an eighth lens L8, a ninth lens L9, a $10^{th}$ lens L10, an $11^{th}$ lens L11, a $12^{th}$ lens L12, a prism PR, an aperture stop FA and the above-described filter OF. In this case, the first lens L1, the prism PR, the second lens L2, and the third lens L3 constitute the first optical system G1, the fourth to sixth lenses L4 to L6 constitute the second optical system G2, the seventh to $10^{th}$ lenses L7 to L10 constitute the third optical system G3, the $11^{th}$ lens L11 singularly constitutes the fourth optical system G4 and the $12^{th}$ lens L12 singularly constitutes the fifth optical system G5. Each optical system is supported by an appropriate common base frame or the like and each optical system is operated integrally in zooming to change relative distances or intervals among the first optical system G1, the second optical system G2, the aperture stop FA, the third optical system G3, the fourth optical system G4, the fifth optical system G5 and the filter OF. In FIG. 1, surface numbers of optical surfaces in the zoom lens are shown.

Furthermore, each reference number in FIG. 1 is independently used in each example to avoid cumbersome description in the drawings due to increased numbers of reference numbers. Although the same reference numbers in FIG. 1 will be used for the different configurations of the zoom lens in FIGS. 5, 9, and 13, the configurations are not limited thereto.

In FIG. 1, each optical element, which constitutes the optical system of the zoom lens, is disposed in series, for example, the first lens L1, the prism PR, the second lens L2, the third lens L3, the fourth lens L4, the fifth lens L5, the sixth lens L6, the aperture stop FA, the seventh lens L7, the eighth lens L8, the ninth lens L9, the $10^{th}$ lens L10, the $11^{th}$ lens L11, the $12^{th}$ lens L12, and the filter OF are arranged in series in order from the object side to image an image on a back side of the filter OF.

The first lens L1 is a negative meniscus lens, which has an aspheric surface at the image side and a convex surface at the object side. The prism PR is used as a deflection optical element to deflect a light path. The prism PR reflects and deflects the light path, for example, by 90 degrees. The second lens L2 is a positive lens, which has convex surfaces at both of the object side and the image side. The third lens L3 is a positive lens, which has a convex surface at both sides. The first lens L1, the prism PR, the second lens L2, and the third lens L3 constitute the first optical system G1 having the positive focal length and are operated in a group in zooming. In this case, the first optical system G1 remains still, that is, is not moved at a fixed position when zooming.

The fourth lens L4 is a negative lens which has a concave surface at both sides and where the concave surface at the image side is formed as an aspheric surface. The fifth lens L5 is a negative lens which has a concave surface at both sides and the sixth lens L6 is a positive lens which has a convex surface at both sides. The fifth lens L5 and the sixth lens L6 are closely attached to each other and integrally cemented to form a cemented lens formed by the two lenses. The fourth to sixth lenses L4 to L6 constitute the second optical system G2 having the negative focal length and are operated in a group when zooming.

The aperture stop FA is singularly operated when zooming. In this case, the aperture stop FA is not moved at a fixed position when zooming.

The seventh lens L7 is a positive lens which has a convex surface at both sides and where the convex surface at the object side is formed as an aspheric surface. The eighth lens L8 is a positive lens which has a convex surface at both sides and the ninth lens L9 is a negative lens which has a concave surface at both sides. The eighth lens L8 and the ninth lens L9 are closely attached to each other and integrally cemented to form a cemented lens formed by the two lenses. The $10^{th}$ lens L10 is a positive lens which has a convex surface at both sides and where the convex surface at the image side is formed as an aspheric surface. The above-described seventh to $10^{th}$ lenses L7 to L10 constitute the third optical system G3 having the positive focal length and are operated in a group when zooming.

The $11^{th}$ lens L11 is a negative lens which has a concave surface at both sides and where the concave surface at the image side is formed as an aspheric surface. The $11^{th}$ lens L11 singularly constitutes the fourth optical system G4 having the negative focal length and is operated in a group when zooming. In this case, the fourth optical system G4 is not moved at a fixed position when zooming.

The $12^{th}$ lens L12 is a positive lens which has a convex surface at both sides and where the convex surface at the object side is formed as an aspheric surface. The $12^{th}$ lens L12 singularly constitutes the fifth optical system G5 having the positive focal length and is operated in a group when zooming.

In changing magnification of the zoom lens between the short focus end (wide angle end) and the long focus end (telephoto end), the intervals between the optical elements DA, DB, DC, DD, DE and DF in the zoom lens are variable. The interval DA is an interval between a surface of the first optical system G1 at the most image side of the first optical system G1, that is, the surface (9) of the third lens L3 at the image side and a surface of the second optical system G2 at the most object side, that is, a surface (10) of the fourth lens L4 at the object side. The interval DB is an interval between a surface of the second optical system G2 at the most image side of the second optical system G2, that is, the surface (14) of the sixth lens LE at the image side and a surface (15) of the aperture stop FA. The interval DC is an interval between the surface (15) of the aperture stop FA and a surface of the third optical system G3 at the most object side of the third optical system G3, that is, the surface (16) of the seventh lens L7 at the object side. The interval DD is an interval between a surface of the third optical system G3 at the most image side of the third optical system G3, that is, the surface (22) of the 10$^{th}$ lens L10 at the image side and a surface of the fourth optical system G4 at the most object side, that is, a surface (23) of the 11$^{th}$ lens L11 at the object side. The interval DE is an interval between a surface of the fourth optical system G4 at the most image side of the fourth optical system G4, that is, the surface (24) of the 11$^{th}$ lens L11 at the image side and a surface of the fifth optical system G5 at the most object side, that is, a surface (25) of the 12$^{th}$ lens L12 at the object side. The interval DF is an interval between a surface of the fifth optical system G5 at the most image side of the fifth optical system G5, that is, the surface (26) of the 12$^{th}$ lens L12 at the image side and a surface (27) of the filter OF at the most object side.

When changing the magnification of the zoom lens from the wide angle end to the telephoto end, the second optical system G2, the third optical system G3, and the fifth optical system G5 are moved such that the interval DA between the first optical system G1 and the second optical system G2 is gradually increased, the interval DB between the second optical system G2 and the aperture stop FA is gradually decreased, the interval DC between the aperture stop FA and the third optical system G3 is gradually decreased, the interval DD between the third optical system G3 and the fourth optical system G4 is gradually increased, the interval DE between the fourth optical system G4 and the fifth optical system G5 is gradually increased, and the interval DF between the fifth optical system G5 and the filter OF is gradually decreased.

In the movement when changing the magnification of the zoom lens from the wide angle end to the telephoto end, the second optical system G2 is substantially monotonously moved toward the image side, the third optical system G3 is substantially monotonously moved toward the object side, and the fifth optical system G5 is substantially monotonously moved to the image side.

In Example 1, the focal length f of the zoom lens and the F-value F vary, respectively, in ranges of f=5.20 to 34.93 and F=3.69 to 5.40. Optical properties of each optical element are shown in the following table.

TABLE 1

| Surface No. | R | D | Nd | vd | Remarks | Glass |
|---|---|---|---|---|---|---|
| 01 | 35.683 | 1.00 | 1.84666 | 23.77 | L1 | LTIH53 (OHARA) |
| 02* | 12.075 | 4.45 | | | | |
| 03 | ∞ | 8.00 | 1.88300 | 40.76 | PR | SLAH58 (OHARA) |
| 04 | ∞ | 8.00 | 1.88300 | 40.76 | PR | SLAH58 (OHARA) |
| 05 | ∞ | 0.20 | | | | |
| 06 | 52.873 | 2.40 | 1.49700 | 81.54 | L2 | SFPL51 (OHARA) |
| 07 | −23.745 | 0.20 | | | | |
| 08 | 20.684 | 2.04 | 1.51633 | 64.14 | L3 | SBSL7 (OHARA) |
| 09 | −83.294 | Variable (DA) | | | | |
| 10 | −24.411 | 1.00 | 1.80510 | 40.88 | L4 | LLAH53 (OHARA) |
| 11* | 10.236 | 1.64 | | | | |
| 12 | −12.136 | 1.00 | 1.57099 | 50.80 | L5 | SBAL2 (OHARA) |
| 13 | 11.916 | 1.89 | 1.84666 | 23.78 | L6 | STIH53 (OHARA) |
| 14 | −33.632 | Variable (DB) | | | | |
| 15 | Aperture stop | Variable (DC) | | | FA | |
| 16* | 11.000 | 2.05 | 1.73077 | 40.51 | L7 | LLAM69 (OHARA) |
| 17 | −92.305 | 3.47 | | | | |
| 18 | 13.988 | 2.44 | 1.57099 | 50.80 | L8 | SBAL2 (OHARA) |
| 19 | −9.232 | 1.00 | 1.80518 | 25.42 | L9 | STIH6 (OHARA) |
| 20 | 7.996 | 0.64 | | | | |
| 21 | 15.595 | 2.03 | 1.51633 | 64.05 | L10 | LBSL7 (OHARA) |
| 22* | −13.564 | Variable (DD) | | | | |
| 23 | −1405.683 | 1.00 | 1.73077 | 40.51 | L11 | LLAM69 (OHARA) |
| 24* | 17.000 | Variable (DE) | | | | |
| 25* | 18.945 | 2.25 | 1.51633 | 64.06 | L12 | LBSL7 (OHARA) |
| 26 | −29.998 | Variable (DF) | | | | |
| 27 | ∞ | 0.80 | 1.50863 | 64.00 | OF | Filter |

In Table 1, an asterisk indicates that the surface is aspheric. That is, each of a second surface, an 11th surface, a 16th surface, a 22nd surface, 24th surface, and a 25th surface is aspheric and the parameters in the equation (9) for each aspheric surface are as follows.

Aspheric surface: the 2nd surface
 $K=-2.66318E-05(=-2.66318\times10^{-5})$
 $A_4=-3.73542E-07$
 $A_6=3.46456E-09$
 $A_8=-3.54130E-11$ Aspheric surface: the 11th surface
 $K=-1.16008E-05$
 $A_4=1.75709E-06$
 $A_6=-5.13170E-08$
 $A_8=2.30633E-09$ Aspheric surface: the 16th surface
 $K=-7.64600E-05$
 $A_4=1.18832E-06$
 $A_6=-7.00964E-08$
 $A_8=1.35244E-09$ Aspheric surface: the 22nd surface
 $K=-1.597807E-05$
 $A_4=5.86433E-06$
 $A_6=-8.40400E-07$
 $A_8=2.09610E-08$ Aspheric surface: the 24th surface
 $K=1.51024E-04$
 $A_4=9.33987E-06$
 $A_6=-3.92025E-07$
 $A_8=6.18211E-09$ Aspheric surface: the 25th surface
 $K=9.38549E-05$
 $A_4=1.41070E-05$
 $A_6=-6.64229E-07$
 $A_8=1.20242E-08$ The interval DA between the first optical system G1 and the second optical system G2, the interval DB between the second optical system G2 and the aperture stop FA, the interval DC between the aperture stop FA and the third optical system G3, the interval DD between the third optical system G3 and the fourth optical system G4, the interval DE between the fourth optical system G4 and the fifth optical system G5, and the interval DF between the fifth optical system G5 and the filter OF are changed when zooming as shown in the following table.

TABLE 2

|  | Short focus end | Intermediate focal length position | Long focus end |
|---|---|---|---|
| f | 5.20 | 13.49 | 34.93 |
| F-Number | 3.69 | 5.50 | 5.40 |
| DA | 0.50 | 7.06 | 12.87 |
| DB | 12.88 | 6.32 | 0.51 |
| DC | 9.55 | 3.71 | 0.49 |
| DD | 1.00 | 6.84 | 10.06 |
| DE | 1.46 | 4.26 | 8.85 |
| DF | 8.14 | 5.34 | 0.75 |

Values according to the conditions in this Example 1 are as follows: The values used in the conditions of the Example 1
 $Dw=2.40$
 $Dt=3.50$
 $b2t=-1.453$
 $b2w=-0.510$
 $b3t=-0.962$
 $b3w=-0.528$
 $f2=-9.720$
 $f3=14.358$ The values of the conditions of the Example 1:
 $(T23w/Y')/(ft/fw)=0.795$
 $(Ts3w/T2sw)=0.741$
 $Dt/Dw=1.458$
 $f2/Y'=-2.314$
 $f3/Y'=3.419$
 $b2t/b2w=2.849$
 $b3t/b3w=1.822$
 $(b3t/b3w)/(b2t/b2w)=0.640$ Accordingly, the numerical values according to the above-described conditions in Example 1 are within the conditions.

Figure 2:
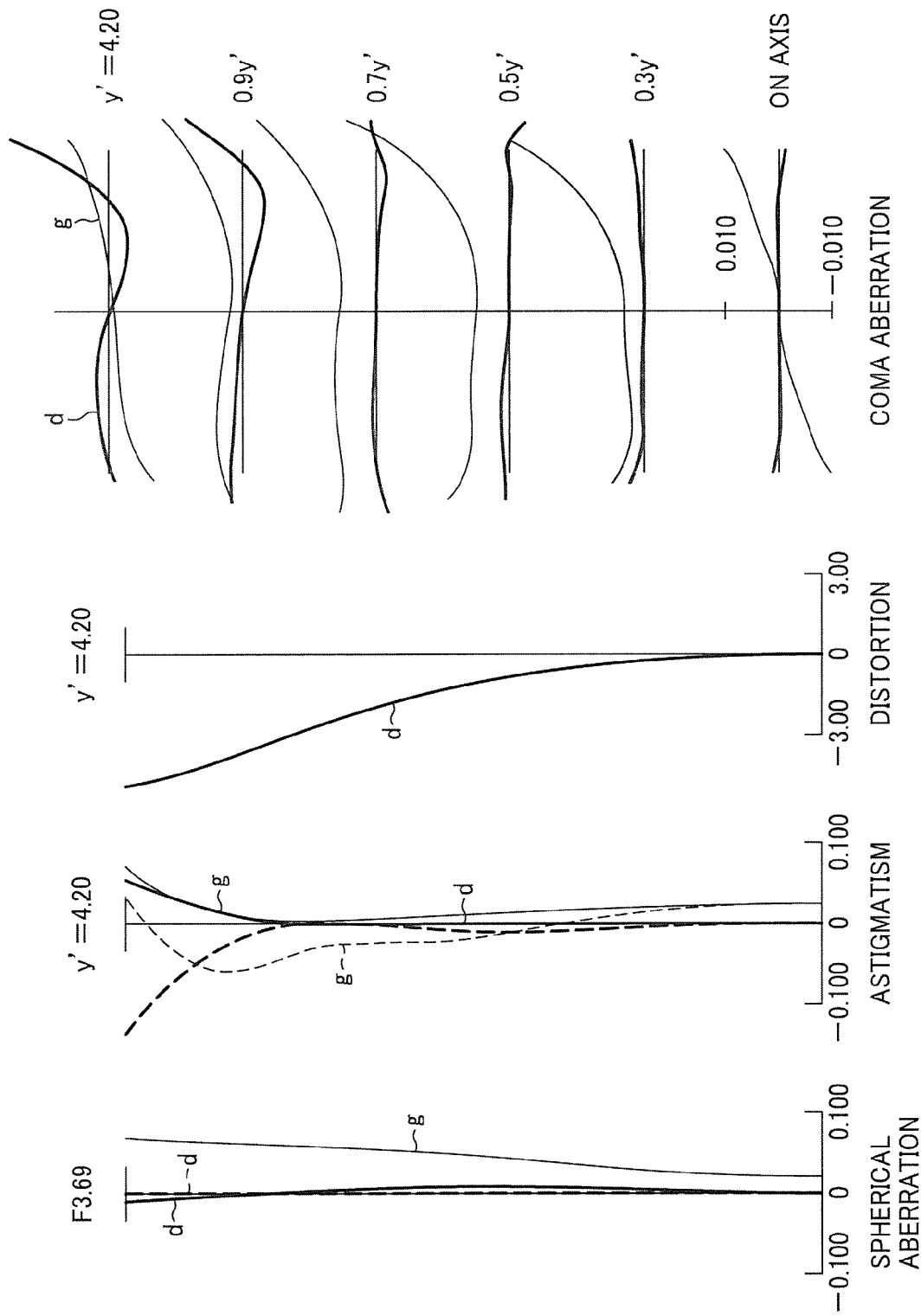
FIG. 2 is a view illustrating an aberration curve of a spherical aberration, astigmatism, distortion and coma aberration of the zoom lens according to Example 1 shown in FIG. 1 at a short focus end.
Figure 3:
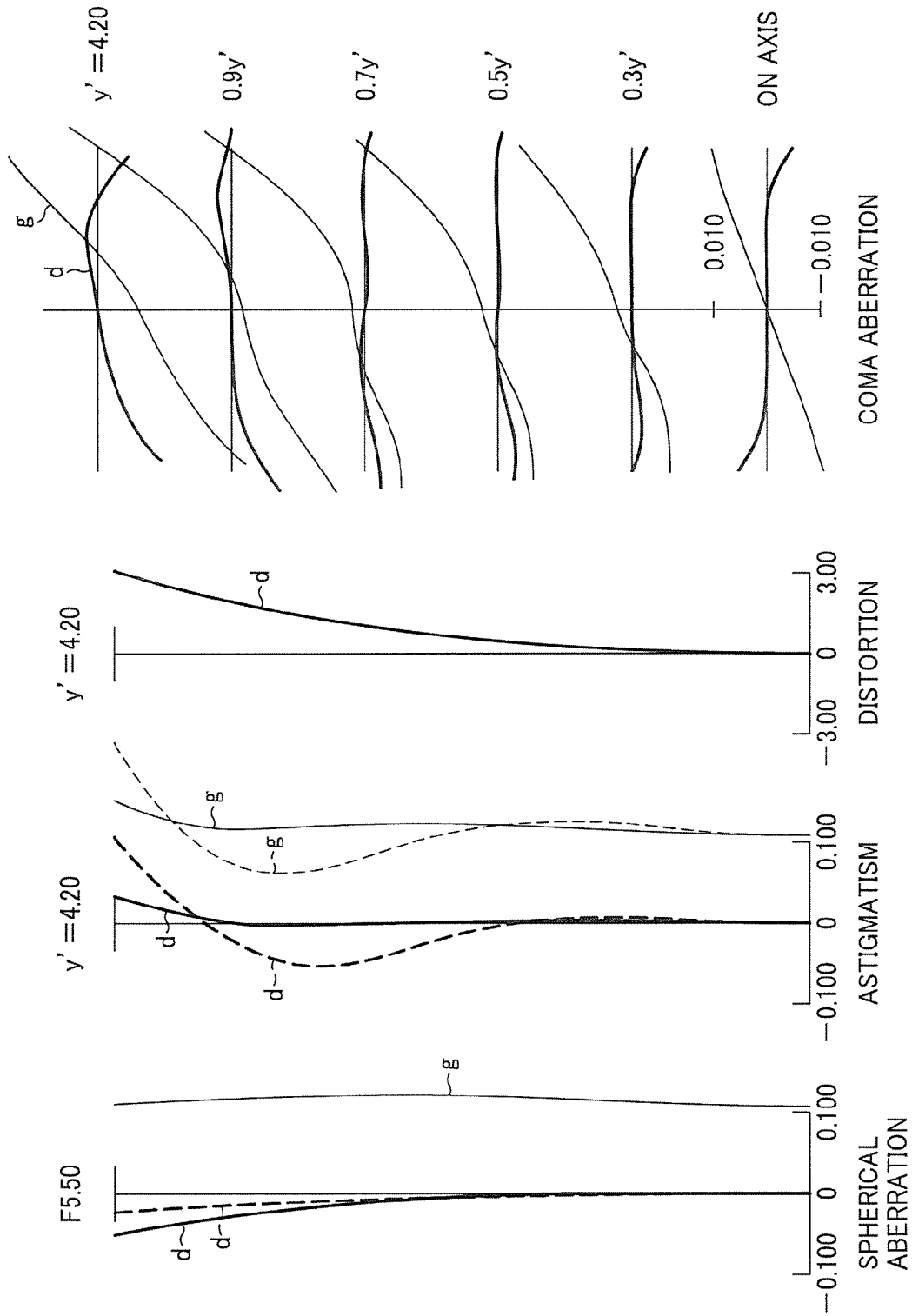
FIG. 3 is a view illustrating an aberration curve of a spherical aberration, astigmatism, distortion and coma aberration of the zoom lens according to Example 1 shown in FIG. 1 at an intermediate focal length position.
Figure 4:
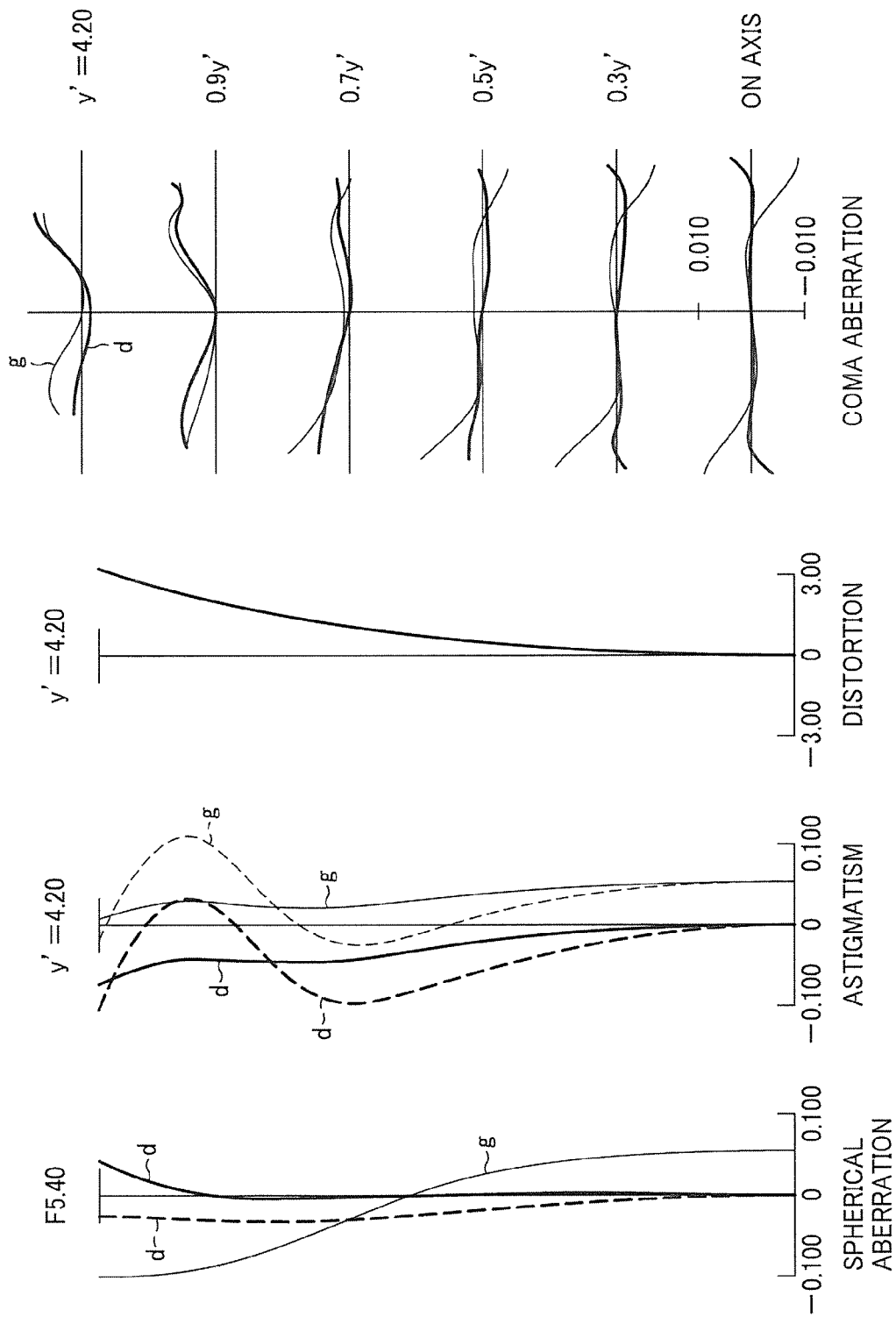
FIG. 4 is a view illustrating an aberration curve of a spherical aberration, astigmatism, distortion and coma aberration of the zoom lens according to Example 1 shown in FIG. 1 at a long focus end.

FIGS. 2 to 4 show aberration curves of spherical aberration, astigmatism, distortion, and coma aberration in the zoom lens according to Example 1 shown in FIG. 1. FIG. 2 shows the aberration curve at the short focus end (wide angle end), FIG. 3 shows the aberration curve at the intermediate focal length position, and FIG. 4 shows the aberration curve at the long focus end (telephoto end). In the spherical aberration curves, the broken line indicates a sine condition, in astigmatism curves, the solid line indicates a sagittal image plane, the broken line indicates a meridional image plane, the heavy line indicates a d-line, and the thin line indicates a g-line.

According to the aberration curves shown in FIGS. 2 to 4, it is found that in the zoom lens of Example 1 shown in FIG. 1, the aberration is sufficiently corrected or controlled.

Example 2

FIG. 5 shows a configuration of optical systems of the zoom lens according to Example 2 of the present invention. The positions of each of the lens groups in changing from a short focus end (WIDE) to a long focus end (TELE) through an intermediate focal length position (MEAN) are shown in FIG. 5. Movement loci of each of the lens groups in zooming are also schematically shown in FIG. 5.

The zoom lens shown in FIG. 5 includes a first lens L1, a second lens L2, a third lens L3, a fourth lens L4, a fifth lens L5, a sixth lens L6, a seventh lens L7, an eighth lens L8, a ninth lens L9, a $10^{th}$ lens L10, an $11^{th}$ lens L11, a $12^{th}$ lens L12, a prism PR, an aperture stop FA and the filter OF. In this case, the first lens L1, the prism PR, the second lens L2, and the third lens L3 constitute the first optical system G1, the fourth to sixth lenses L4 to LB constitute the second optical system G2, the seventh to 10th lenses L7 to L10 constitute the third optical system G3, the $11^{th}$ lens L11 singularly constitutes the fourth optical system G4 and the $12^{th}$ lens L12 singularly constitutes the fifth optical system G5. Each optical system is supported by an appropriate common base frame or the like and each optical system is operated integrally in zooming to change relative distances or intervals among the first optical system G1 the second optical system G2, the aperture stop FA, the third optical system G5, the fourth optical system G4, the fifth optical system G5 and the filter, OF. In FIG. 5, surface numbers of optical surfaces in the zoom lens are shown. Furthermore, each reference number in FIG. 5 is independently used in each example to avoid cumbersome description in the drawings due to increased numbers of reference numbers.

In FIG. 5, each optical element, which constitutes the optical system of the zoom lens, is disposed in series, for example, the first lens L1, the prism PR, the second lens L2, the third lens L3, the fourth lens L4, the fifth lens L5, the sixth lens L6, the aperture stop FA, the seventh lens L7, the eighth lens L8, the ninth lens L9, the $10^{th}$ lens L10, the $11^{th}$ lens L11, the $12^{th}$ lens L12, and the filter OF are arranged in series in order from the object side to image an image on a back side of the filter OF.

The first lens L1 is a negative meniscus lens which has an aspheric surface at the image side and a convex surface at the object side. The prism PR is used as a deflection optical element to deflect a light path. The prism PR reflects and deflects the light path, for example, by 90 degrees. The second lens L2 is a positive lens which has convex surfaces at both of the object side and the image side. The third lens L3 is a positive lens which has a convex surface at both sides. The first lens L1, the prism PR, the second lens L2, and the third lens L3 constitute the first optical system G1 having the positive focal length and are operated in a group in zooming. In this case, the first optical system G1 is not moved at a fixed position when zooming.

The fourth lens L4 is a negative lens which has a concave surface at both sides and where the concave surface at the image side is formed as an aspheric surface. The fifth lens L5 is a negative lens which has a concave surface at both sides and the sixth lens L6 is a positive lens which has a convex surface at both sides. The fifth lens L5 and the sixth lens L6 are closely attached to each other and integrally cemented to form a cemented lens formed by the two lenses. The fourth to sixth lenses L4 to L6 constitute the second optical system G2 having the negative focal length and are operated in a group when zooming.

The aperture stop FA is singularly operated when zooming.

The seventh lens L7 is a positive lens which has a convex surface at both sides and where the convex surface at the object side is formed as an aspheric surface. The eighth lens L8 is a positive lens which has a convex surface at both sides and the ninth lens L9 is a negative lens which has a concave surface at both sides. The eighth lens L8 and the ninth lens L9 are closely attached to each other and integrally cemented to form a cemented lens formed by the two lenses. The $10^{th}$ lens L10 is a positive lens which has a convex surface at both sides and where the convex surface at the image side is formed as an aspheric surface. The above-described seventh to $10^{th}$ lenses L7 to L10 constitute the third optical system G3 having the positive focal length and are operated in a group when zooming.

The $11^{th}$ lens L11 is a negative lens which has a concave surface at both sides and where the concave surface at the image side is formed as an aspheric surface. The $11^{th}$ lens L11 singularly constitutes the fourth optical system G4 having the negative focal length and is operated in a group when zooming. In this case, the fourth optical system G4 is not moved at a fixed position when zooming.

The $12^{th}$ lens L12 is a positive lens which has a convex surface at both sides and where the convex surface at the object side is formed as an aspheric surface. The $12^{th}$ lens L12 singularly constitutes the fifth optical system G5 having the positive focal length and is operated in a group when zooming.

In changing magnification of the zoom lens between the short focus end (wide angle end) and the long focus end (telephoto end), the intervals between the optical elements DA, DB, DC, DD, DE and DF in the zoom lens are variable. The interval DA is an interval between a surface of the first optical system G1 at the most image side of the first optical system G1, that is, the surface (9) of the third lens L3 at the image side and a surface of the second optical system G2 at the most object side, that is, a surface (10) of the fourth lens L4 at the object side. The interval DB is an interval between a surface of the second optical system G2 at the most image side of the second optical system G2, that is, the surface (14) of the sixth lens L6 at the image side and a surface (15) of the aperture stop FA. The interval DC is an interval between the surface (15) of the aperture stop FA and a surface of the third optical system G3 at the most object side of the third optical system G3, that is, the surface (16) of the seventh lens L7 at the object side. The interval DD is an interval between a surface of the third optical system (33 at the most image side of the third optical system GB, that is, the surface (22) of the $10^{th}$ lens L10 at the image side and a surface of the fourth optical system G4 at the most object side, that is, a surface (23) of the $11^{th}$ lens L11 at the object side. The interval DE is an interval between a surface of the fourth optical system G4 at the most image side of the fourth optical system (34, that is, the surface (24) of the $11^{th}$ lens L11 at the image side and a surface of the fifth optical system G5 at the most object side, that is, a surface (26) of the $12^{th}$ lens L12 at the object side. The interval DF is an interval between a surface of the fifth optical system G5 at the most image side of the fifth optical system G5, that is, the surface (26) of the $12^{th}$ lens L12 at the image side and a surface (27) of the filter OF at the most object side.

When changing the magnification of the zoom lens from the wide angle end to the telephoto end, the second optical system G2, the aperture stop FA, the third optical system G3, and the fifth optical system G5 are moved such that the interval DA between the first optical system G1 and the second optical system G2 is gradually increased, the interval DB between the second optical system G2 and the aperture stop FA is gradually decreased, the interval DC between the aperture stop FA and the third optical system G3 is gradually decreased, the interval DD between the third optical system G3 and the fourth optical system G4 is gradually increased, the interval DE between the fourth optical system G4 and the fifth optical system G5 is gradually increased, and the interval DF between the fifth optical system G5 and the filter OF is gradually decreased.

In the movement when changing the magnification of the zoom lens from the wide angle end to the telephoto end, the second optical system G2 is substantially monotonously moved toward the image side, the aperture stop FA is once moved to the object side and then moved to the image side, the third optical system G3 is moved toward the object side, and the fifth optical system G5 is substantially monotonously moved to the image side.

In Example 2, the focal length f of the zoom lens and the F-value F vary, respectively, in ranges of f=5.19 to 35.05 and F=3.82 to 5.71. Optical properties of each optical element are shown in the following table.

TABLE 3

| Surface No. | R | D | Nd | vd | Remarks | Glass |
|---|---|---|---|---|---|---|
| 01 | 41.012 | 0.98 | 1.84666 | 23.77 | L1 | LTIH53 (OHARA) |
| 02* | 12.172 | 4.46 | | | | |
| 03 | ∞ | 8.10 | 1.88300 | 40.76 | PR | SLAH58 (OHARA) |
| 04 | ∞ | 8.10 | 1.88300 | 40.76 | PR | SLAH58 (OHARA) |
| 05 | ∞ | 0.20 | | | | |
| 06 | 144.335 | 2.35 | 1.49700 | 81.54 | L2 | SFPL51 (OHARA) |
| 07 | −22.831 | 0.20 | | | | |
| 08 | 21.078 | 2.36 | 1.51633 | 64.14 | L3 | SBSL7 (OHARA) |
| 09 | −59.738 | Variable (DA) | | | | |
| 10 | −21.994 | 1.00 | 1.80610 | 40.88 | L4 | LLAH53 (OHARA) |
| 11* | 11.451 | 1.91 | | | | |
| 12 | 11.669 | 1.00 | 1.57099 | 50.80 | L5 | SBAL2 (OHARA) |
| 13 | 15.006 | 2.10 | 1.84666 | 23.78 | L6 | STIH53 (OHARA) |
| 14 | −25.369 | Variable (DB) | | | | |
| 15 | Aperture stop | Variable (DC) | | | FA | |
| 16* | 11.022 | 3.00 | 1.73077 | 40.51 | L7 | LLAM69 (OHARA) |
| 17 | −4143.919 | 3.43 | | | | |
| 18 | 12.676 | 2.82 | 1.57099 | 50.80 | L8 | SBAL2 (OHARA) |
| 19 | −9.471 | 1.00 | 1.80518 | 25.42 | L9 | STIH6 (OHARA) |
| 20 | 7.898 | 0.63 | | | | |
| 21 | 13.026 | 2.19 | 1.51633 | 64.06 | L10 | LBSL7 (OHARA) |
| 22* | −15.809 | Variable (DD) | | | | |
| 23 | −183.057 | 1.00 | 1.73077 | 40.51 | L11 | LLAM69 (OHARA) |
| 24* | 17.006 | Variable (DE) | | | | |
| 25* | 18.597 | 2.77 | 1.51633 | 64.06 | L12 | LBSL7 (OHARA) |
| 26 | −30.009 | Variable (DF) | | | | |
| 27 | ∞ | 0.80 | 1.50863 | 64.00 | OF | Filter |
| 28 | ∞ | | | | | |

In Table 3, an asterisk indicates that the surface is aspheric. That is, each of a second surface, an 11th surface, a 16th surface, a 22nd surface, 24th surface, and a 25th surface is aspheric and the parameters in the equation (9) for each aspheric surface are as follows.

Aspheric surface; the 2-nd surface
  $K = -2.95802E-05$
  $A_4 = -4.14571E-07$
  $A_6 = 3.44622E-09$
  $A_8 = -3.41502E-11$ Aspheric surface: the 11$^{th}$ surface
  $K = 3.85674E-05$
  $A_4 = 1.37916E-06$
  $A_6 = -4.03783E-08$
  $A_8 = 4.34243E-10$ Aspheric surface: the 16th surface
  $K = -5.39246E-05$
  $A_4 = 7.86322E-07$
  $A_6 = -4.46790E-08$
  $A_8 = 8.13937E-10$ Aspheric surface the 22nd surface
  $K = 2.31019E-05$
  $A_4 = 1.42982E-06$
  $A_6 = -3.67689E-07$
  $A_8 = 7.19641E-09$ Aspheric surface: the 24th surface
  $K = 1.63010E-04$
  $A_4 = 4.29213E-06$
  $A_6 = -1.93397E-08$
  $A_8 = 1.76094E-09$ Aspheric surface: the 25th surface
  $K = 1.15198E-04$
  $A_4 = 7.39314E-06$
  $A_6 = -2.38598E-07$
  $A_8 = 3.98643E-09$ The interval DA between the first optical system G1 and the second optical system G2, the interval DB between the second optical system G2 and the aperture stop FA, the interval DC between the aperture stop FA and the third optical system G3, the interval DD between the third optical system G3 and the fourth optical system G4, the interval DE between the fourth optical system G4 and the fifth optical system G5, and the interval DF between the fifth optical system G5 and the filter OF are changed when zooming as shown in the following table.

TABLE 4

| | Short focus end | Intermediate focal length position | Long focus end |
|---|---|---|---|
| f | 5.19 | 13.53 | 35.05 |
| F-Number | 3.82 | 4.92 | 5.71 |
| DA | 0.55 | 7.95 | 14.91 |
| DB | 18.52 | 5.70 | 0.48 |
| DC | 5.63 | 5.16 | 0.48 |
| DD | 1.00 | 6.89 | 9.83 |
| DE | 1.45 | 5.19 | 9.01 |
| DF | 8.11 | 4.37 | 0.55 |

Values according to the conditions in Example 2 are as follows:

The values used in the conditions of the Example 2:

Dw=2.80

Dt=3.50 b2t=−1.377 b2w=−0.482 b3t=−0.907 b3w=−0.497 f2=−10.640 f3=15.002

The values of the conditions of Example 2:

(T23w/Y')/(ft/fw)=0.852

(Ts3w/T2sw)=0.304

Dt/Dw=1.250 f2/Y'=2.533 f3/Y'=3.572 b2t/b2w=2.858 b3t/b3w=1.826

(b3t/b3w)/(b2t/b2w)=0.639

Accordingly, the numerical values according to the above-described conditions in Example 2 are within the conditions.

Figure 6:
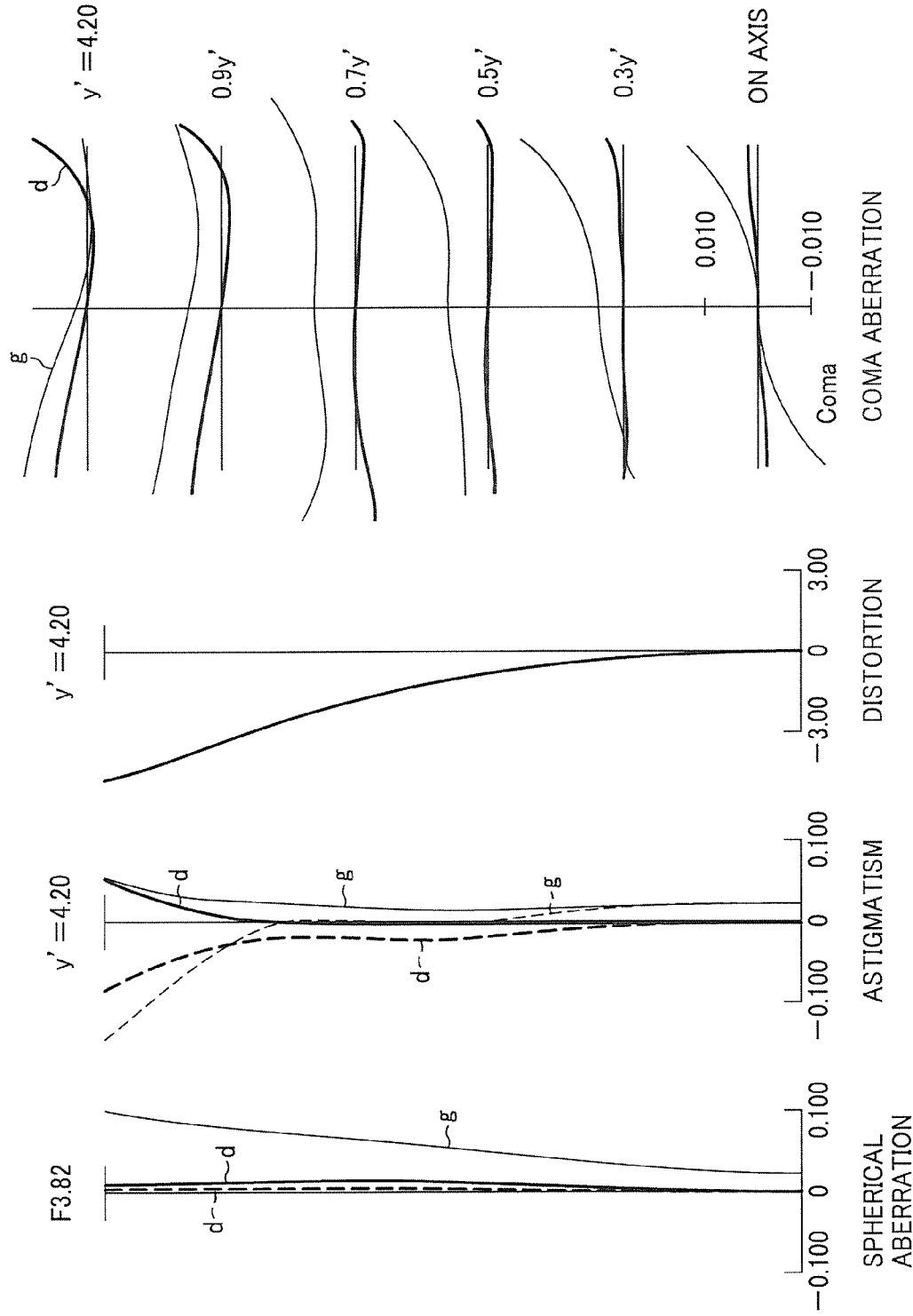
FIG. 6 is a view illustrating an aberration curve of a spherical aberration, astigmatism, distortion and coma aberration of the zoom lens according to Example 2 shown in FIG. 5 at a short focus end.
Figure 7:
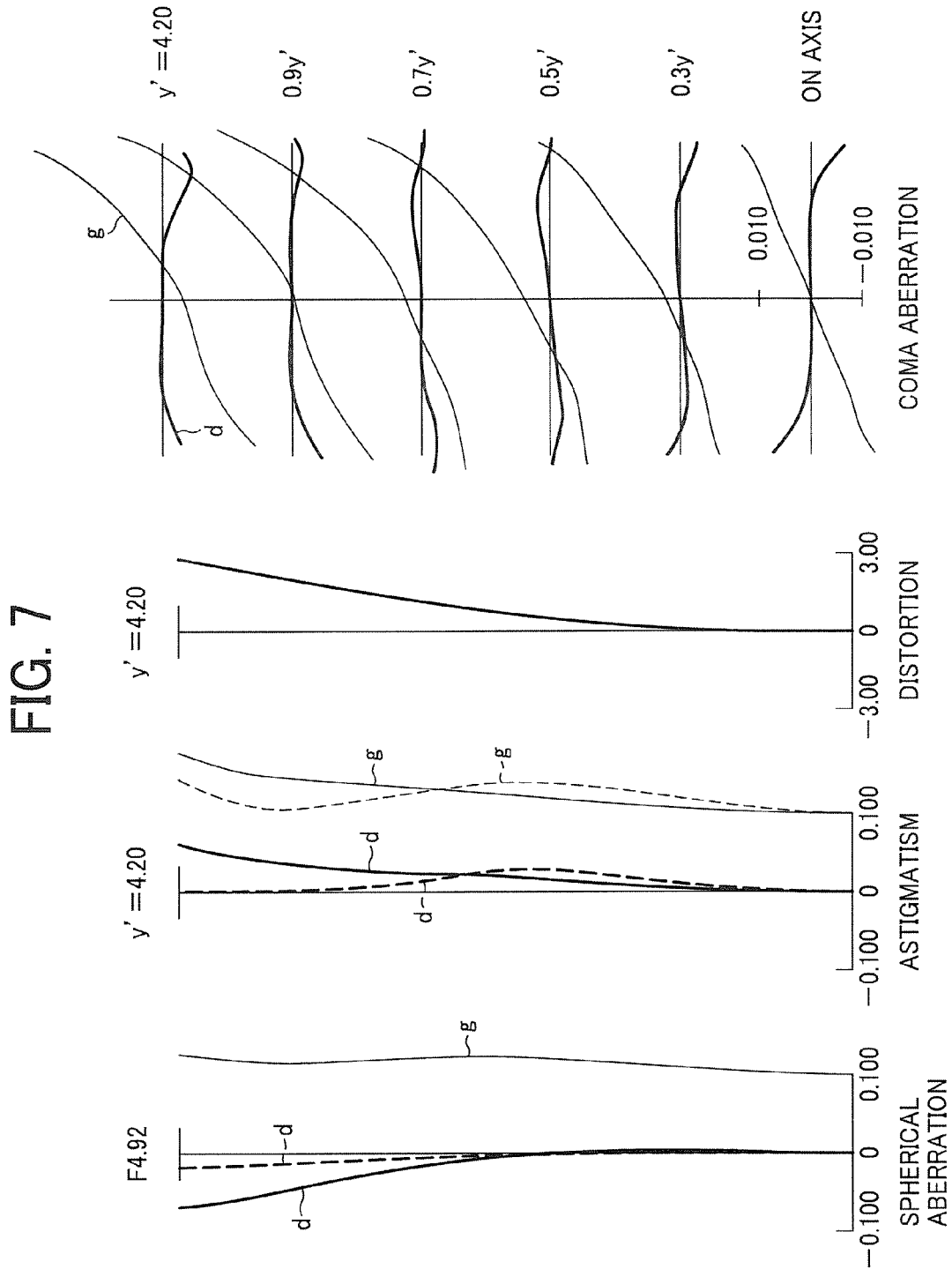
FIG. 7 is a view illustrating an aberration curve of a spherical aberration, astigmatism, distortion and coma aberration of the zoom lens according to Example 2 shown in FIG. 5 at an intermediate focal length position.
Figure 8:
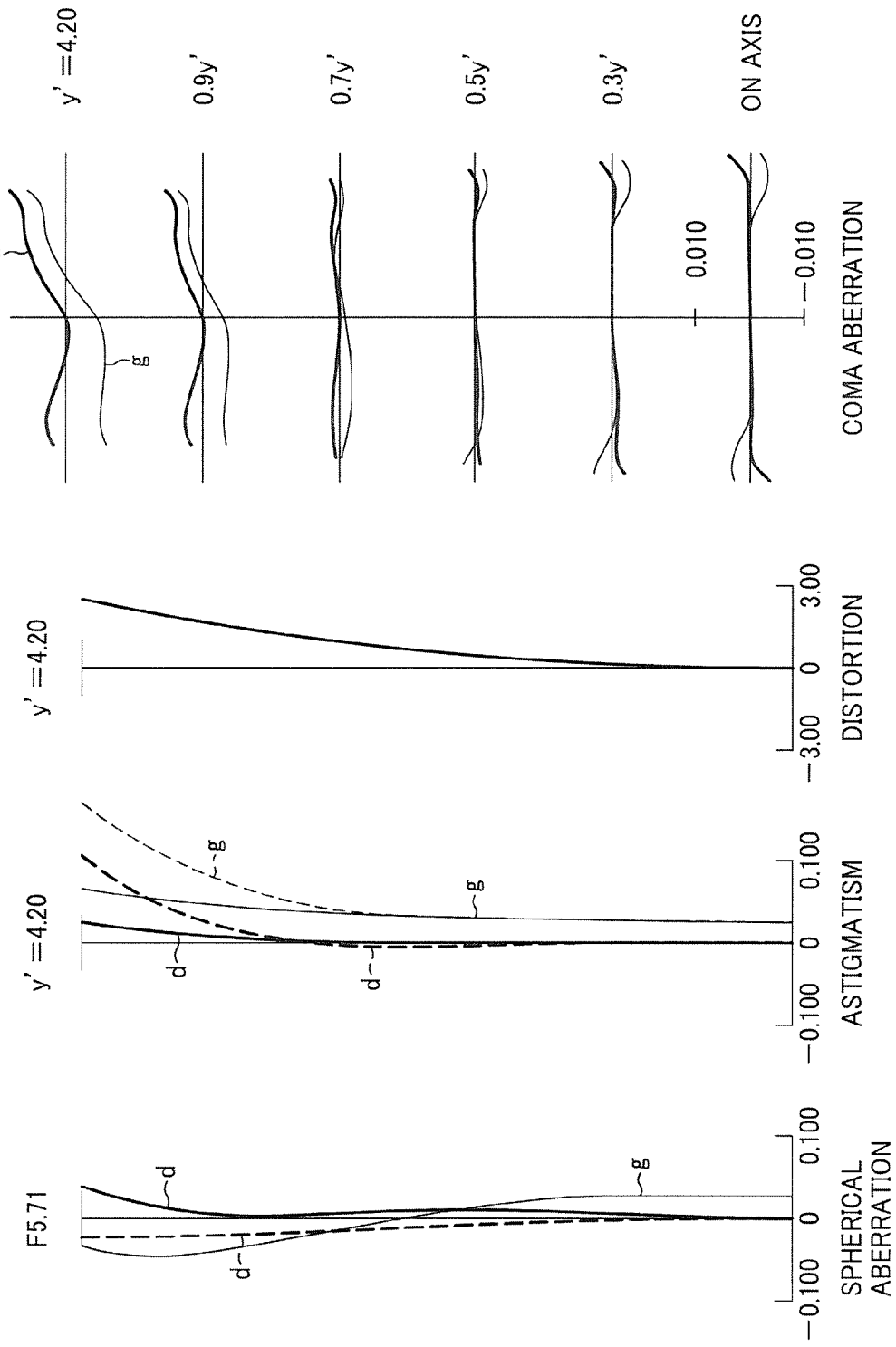
FIG. 8 is a view illustrating an aberration curve of a spherical aberration, astigmatism, distortion and coma aberration of the zoom lens according to Example 2 shown in FIG. 5 at a long focus end.

FIGS. 6 to 8 show aberration curves of spherical aberration, astigmatism, distortion, and coma aberration in the zoom lens according to Example 2 shown in FIG. 5. FIG. 6 shows the aberration curve at the short focus end (wide angle end), FIG. 7 shows the aberration curve at the intermediate focal length position, and FIG. 8 shows the aberration curve at the long focus end (telephoto end). In the spherical aberration curves, the broken line indicates a sine condition, in astigmatism curves, the solid line indicates a sagittal image plane, the broken line indicates a meridional image plane, the heavy line indicates a d-line, and the thin line indicates a g-line.

According to the aberration curves shown in FIGS. 6 to 8, it is found that in the zoom lens of Example 2 shown in FIG. 5, the aberration is sufficiently corrected or controlled.

Example 3

FIG. 9 shows a configuration of optical systems of the zoom lens according to Example 3 of the present invention. The positions of each of the lens groups in changing from a short focus end (WIDE) to a long focus end (TELE) through an intermediate focal length position (MEAN) are shown in FIG. 9. Movement loci of each of the lens groups in zooming are also schematically shown in FIG. 9.

The zoom lens shown in FIG. 9 includes a first lens L1, a second lens L2, a third lens L3, a fourth lens L4, a fifth lens L5, a sixth lens L6, a seventh lens L7, an eighth lens L8, a ninth lens L9, a $10^{th}$ lens L10, an $11^{th}$ lens L11, a $12^{th}$ lens L12, a prism PR, an aperture stop FA and the filter OF. In this case, the first lens L1, the prism PR, the second lens L2, and the third lens L3 constitute the first optical system G1, the fourth to sixth lenses L4 to L6 constitute the second optical system G2, the seventh to $10^{th}$ lenses L7 to L10 constitute the third optical system G3, the $11^{th}$ lens L11 singularly constitutes the fourth optical system G4 and the $12^{th}$ leas L12 singularly constitutes the fifth optical system G5. Each optical system is supported by an appropriate common base frame or the like and each optical system is operated integrally in zooming to change relative distances or intervals among the first optical system G1, the second optical system G2, the aperture stop FA, the third optical system G3, the fourth optical system G4, the fifth optical system G5 and the filter OF.

In FIG. 9, surface numbers of optical surfaces in the zoom lens are shown. Furthermore, each reference number in FIG. 9 is independently used in each example to avoid cumbersome description in the drawings due to increased reference numbers.

In FIG. 9, each optical element, which constitutes the optical system of the zoom lens, is disposed in series, for example, the first lens L1, the prism PR, the second lens L2, the third lens L3, the fourth lens L4, the fifth lens L5, the sixth lens L6, the aperture stop FA, the seventh lens L7, the eighth lens L8, the ninth lens L9, the $10^{th}$ lens L10, the $11^{th}$ lens L11, the $12^{th}$ lens L12, and the filter OF are arranged in series in order from the object side to image an image on a back side of the filter OF.

The first lens L1 is a negative meniscus lens which has an aspheric surface at the image side and a convex surface at the object side. The prism PR is used as a deflection optical element to deflect a light path. The prism PR reflects and deflects the light path, for example, by 90 degrees. The second lens L2 is a positive lens which has convex surfaces at both of the object side and the image side. The third lens L3 is a positive meniscus lens which has a convex surface at the object side. The first lens L1, the prism PR, the second lens L2, and the third lens L3 constitute the first optical system G1 having the positive focal length and are operated in a group in zooming. In this case, the first optical system G1 is not moved at a fixed position when zooming.

The fourth lens L4 is a negative lens which has a concave surface at both sides and where the concave surface at the image side is formed as an aspheric surface. The fifth lens L5 is a negative lens which has a concave surface at both sides and the sixth lens L6 is a positive lens which has a convex surface at both sides. The fifth lens L5 and the sixth lens L6 are closely attached to each other and integrally cemented to form a cemented lens formed by the two lenses. The fourth to sixth lenses L4 to L6 constitute the second optical system G2 having the negative focal length and are operated in a group when zooming.

The aperture stop FA is singularly operated when zooming. In this case, the aperture stop FA is not moved at a fixed position in zooming.

The seventh lens L7 is a positive meniscus lens which has an aspheric convex surface at an object side. The eighth lens L8 is a positive lens which has a convex surface at both sides and the ninth lens L9 is a negative lens which has a concave surface at both sides. The eighth lens L8 and the ninth lens L9 are closely attached to each other and integrally cemented to form a cemented lens formed by the two lenses. The $10^{th}$ lens L10 is a positive lens which has a convex surface at both sides and where the convex surface at the image side is formed as an aspheric surface. The above-described seventh to $10^{th}$ lenses L7 to L10 constitute the third optical system G3 having the positive focal length and are operated in a group when zooming.

The $11^{th}$ lens L11 is a negative meniscus lens which has an aspheric surface at the image side and formed in a convex shape toward the object side. The $11^{th}$ lens L11 singularly constitutes the fourth optical system G4 having the negative focal length and is operated in a group when zooming. In this case, the fourth optical system G4 is not moved at a fixed position when zooming.

The $12^{th}$ lens L12 is a positive lens which has a convex surface at both sides and where the convex surface at the object side is formed as an aspheric surface. The $12^{th}$ lens L12 singularly constitutes the fifth optical system G5 having the positive focal length and is operated in a group when zooming.

In changing magnification of the zoom lens between the short focus end (wide angle end) and the long focus end (telephoto end), the intervals between the optical elements DA, DB, DC, DD, DE and DF in the zoom lens are variable.

The interval DA is an interval between a surface of the first optical system G1 at the most image side of the first optical system G1, that is, the surface (9) of the third lens L3 at the image side and a surface of the second optical system G2 at the most object side, that is, a surface (10) of the fourth lens L4 at the object side. The interval DB is an interval between a surface of the second optical system G2 at the most image side of the second optical system G2, that is, the surface (14) of the sixth lens L6 at the image side and a surface (11) of the aperture stop FA. The interval DC is an interval between the surface (15) of the aperture stop FA and a surface of the third optical system G3 at the most object side of the third optical system G3, that is, the surface (16) of the seventh lens L7 at the object side. The interval DD is an interval between a surface of the third optical system G3 at the most image side of the third optical system G3, that is, the surface (22) of the 10$^{th}$ lens L10 at the image side and a surface of the fourth optical system G4 at the most object side, that is, a surface (23) of the 11$^{th}$ lens L11 at the object side. The interval DE is an interval between a surface of the fourth optical system G4 at the most image side of the fourth optical system G4, that is, the surface (24) of the 11$^{th}$ lens L11 at the image side and a surface of the fifth optical system G5 at the most object side, that is, a surface (25) of the 12$^{th}$ lens L12 at the object side. The interval DF is an interval between a surface of the fifth optical system G5 at the most image side of the fifth optical system G5, that is, the surface (26) of the 12$^{th}$ lens L12 at the image side and a surface (27) of the filter OF at the most object side.

When changing the magnification of the zoom lens from the wide angle end to the telephoto end, the second optical system G2, the third optical system G3, and the fifth optical system G5 are moved such that the interval DA between the first optical system G1 and the second optical system G2 is gradually increased, the interval DB between the second optical system G2 and the aperture stop FA is gradually decreased, the interval DC between the aperture stop FA and the third optical system G3 is gradually decreased, the interval DD between the third optical system G3 and the fourth optical system G4 is gradually increased, the interval DE between the fourth optical system G4 and the fifth optical system G5 is gradually increased, and the interval DF between the fifth optical system G5 and the filter OF is gradually decreased.

In the movement when changing the magnification of the zoom lens from the wide angle end to the telephoto end, the second optical system G2 is substantially monotonously moved toward the image side, the third optical system G3 is moved toward the object side, and the fifth optical system G5 is substantially monotonously moved to the image side.

In Example 3, the focal length f of the zoom lens and the F-value F vary, respectively, in ranges of f=5.20 to 34.98 and F=3.62 to 5.79. Optical properties of each optical element are shown in the following table.

TABLE 5

| Surface No. | R | D | Nd | vd | Remarks | Glass |
|---|---|---|---|---|---|---|
| 01 | 39.806 | 1.00 | 1.84666 | 23.77 | L1 | LTIH53 (OHARA) |
| 02* | 11.801 | 4.45 | | | | |
| 03 | ∞ | 8.00 | 1.88300 | 40.76 | PR | SLAH58 (OHARA) |
| 04 | ∞ | 8.00 | 1.88300 | 40.76 | PR | SLAH58 (OHARA) |
| 05 | ∞ | 0.20 | | | | |
| 06 | 48.889 | 2.74 | 1.49700 | 81.54 | L2 | SFPL51 (OHARA) |
| 07 | −21.564 | 0.20 | | | | |
| 08 | 16.264 | 2.11 | 1.51633 | 64.14 | L3 | SBSL7 (OHARA) |
| 09 | 275.365 | Variable (DA) | | | | |
| 10 | −78.694 | 1.00 | 1.80610 | 40.88 | L4 | LLAH53 (OHARA) |
| 11* | 8.945 | 2.36 | | | | |
| 12 | −10.272 | 2.84 | 1.48749 | 70.24 | L5 | SFSL5 (OHARA) |
| 13 | 16.939 | 1.56 | 1.84666 | 23.78 | L6 | STIH53 (OHARA) |
| 14 | −52.483 | Variable (DB) | | | | |
| 15 | Aperture stop | Variable (DC) | | | FA | |
| 16* | 10.218 | 3.00 | 1.73077 | 40.51 | L7 | LLAM69 (OHARA) |
| 17 | 134.829 | 3.54 | | | | |
| 18 | 12.000 | 3.38 | 1.56384 | 60.67 | L8 | SBAL41 (OHARA) |
| 19 | −6.424 | 1.00 | 1.80518 | 25.42 | L9 | STIH6 (OHARA) |
| 20 | 10.979 | 0.67 | | | | |
| 21 | 22.223 | 1.56 | 1.51633 | 64.06 | L10 | LBSL7 (OHARA) |
| 22* | −32.397 | Variable (DD) | | | | |
| 23 | 83.783 | 2.36 | 1.73077 | 40.51 | L11 | LLAM69 (OHARA) |
| 24* | 17.000 | Variable (DE) | | | | |
| 25* | 18.277 | 2.24 | 1.51633 | 64.06 | L12 | LBSL7 (OHARA) |
| 26 | −31.914 | Variable (DF) | | | | |
| 27 | ∞ | 0.80 | 1.50863 | 64.00 | OF | Filter |
| 28 | ∞ | | | | | |

In Table 5, an asterisk indicates that the surface is aspheric. That is, each of a second surface, an 11th surface, a 16th surface, a 22nd surface, 24th surface, and a 25th surface is aspheric and the parameters in the equation (9) for each aspheric surface are as follows.

Aspheric surface: the 2nd surface $K=-2.73941E-05$ $A_4=-5.56990E-07$ $A_6=5.77314E-09$ $A_8=4.10151E-11$ Aspheric surface: the 111 h surface $K=-5.23771E-06$ $A_4=1.27345E-06$ $A_6=6.12964E-08$ $A_8=-1.67148E-09$ Aspheric surface: the 16th surface
  K=−2.76178E−05
  $A_4$=1.03357E−06
  $A_6$=−2.95264E−08
  $A_8$=6.46288E−10

Aspheric surface: the 22nd surface
  K=1.77835E−04
  $A_4$=8.92306E−06
  $A_6$=−8.94269E−07
  $A_8$=1.85251E−08

Aspheric surface: the 24th surface
  K=6.56471E−05
  $A_4$=1.60998E−05
  $A_6$=−7.66122E−07
  $A_8$=1.46091E−08

Aspheric surface: the 25th surface
  K=−2.32383E−05
  $A_4$=2.50045E−05
  $A_6$=−1.03941E−06
  $A_8$=1.65508E−08

The interval DA between the first optical system G1 and the second optical system G2, the interval DB between the second optical system G2 and the aperture stop FA, the interval DC between the aperture stop FA and the third optical system G3, the interval DD between the third optical system G3 and the fourth optical system G4, the interval DE between the fourth optical system G4 and the fifth optical system G5, and the interval DF between the fifth optical system G5 and the filter OF are changed when zooming as shown in the following table.

TABLE 6

|   | Short focus end | Intermediate focal length position | Long focus end |
|---|---|---|---|
| f | 5.20 | 13.50 | 34.98 |
| F-Number | 3.62 | 5.48 | 5.79 |
| DA | 0.50 | 6.86 | 11.59 |
| DB | 11.69 | 5.23 | 0.50 |
| DC | 12.00 | 5.93 | 0.50 |
| DD | 1.00 | 7.07 | 12.50 |
| DE | 1.43 | 3.78 | 7.43 |
| DF | 6.50 | 4.15 | 0.50 |

Values according to the conditions in this Example 3 are as follows: The values used in the conditions of the Example 3:

Dw=2.50

Dt=3.80 b2t=−1.446 b2w=−0.554 b3t=−1.157 b3w=−0.568 f2=−9.967 f3=15.311

The values of the conditions of the Example 3;

(T23w/Y')/(ft/fw)=0.835

(Ts3w/T2sw)=1.035

Dt/Dw=1.520 f2/Y'=−2.873 f3/Y'=3.645 b2t/b2w=2.608 b3t/b3w=2.036

(b3t/b3w)/(b2t/b2w)=0.780

Accordingly, the numerical values according to the above-described conditions in Example 3 are within the conditions.

Figure 10:
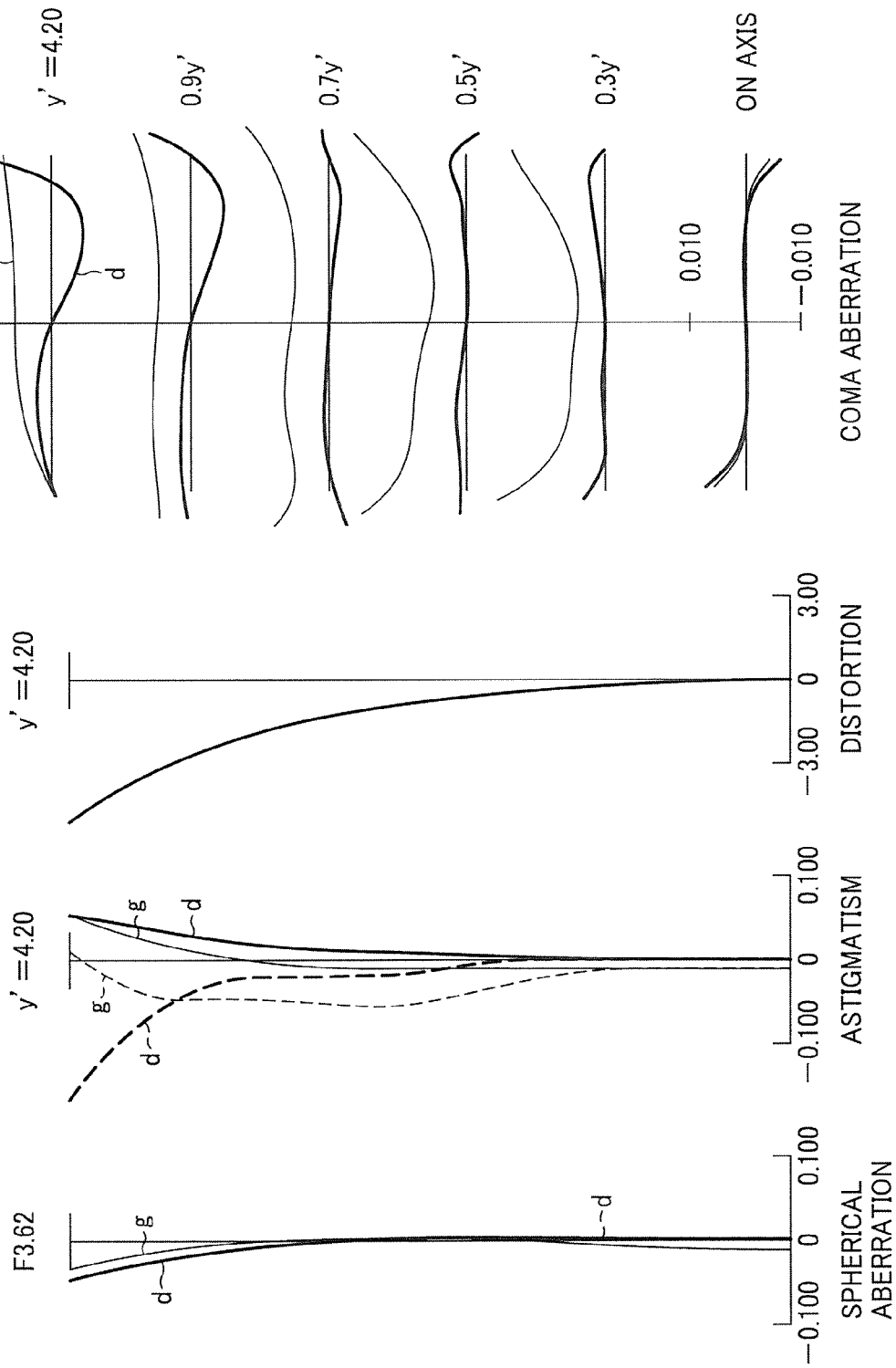
FIG. 10 is a view illustrating an aberration curve of a spherical aberration, astigmatism, distortion and coma aberration of the zoom lens according to Example 3 shown in FIG. 9 at a short focus end.
Figure 11:
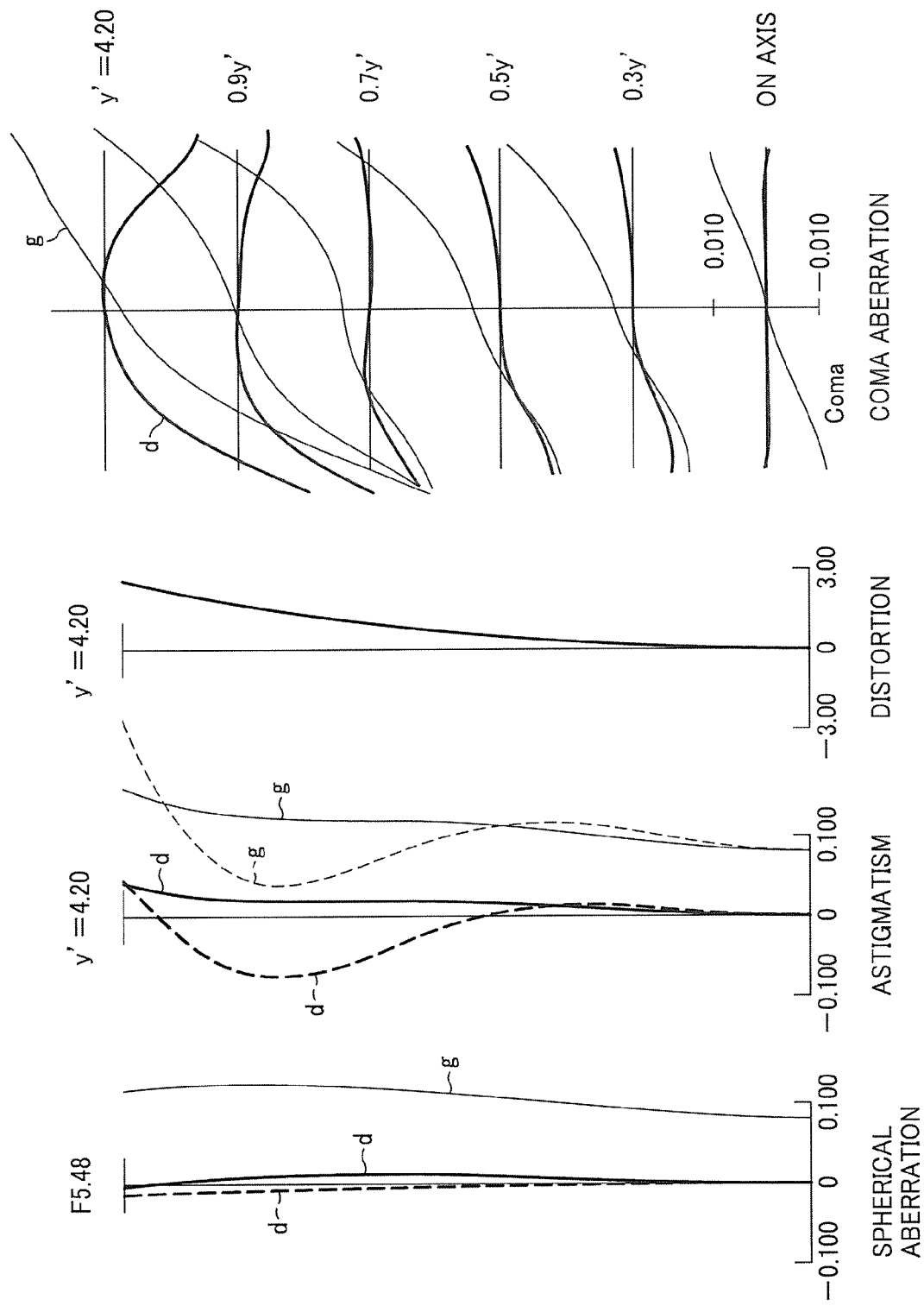
FIG. 11 is a view illustrating an aberration curve of a spherical aberration, astigmatism, distortion and coma aberration of the zoom lens according to Example 3 shown in FIG. 9 at an intermediate focal length position.
Figure 12:
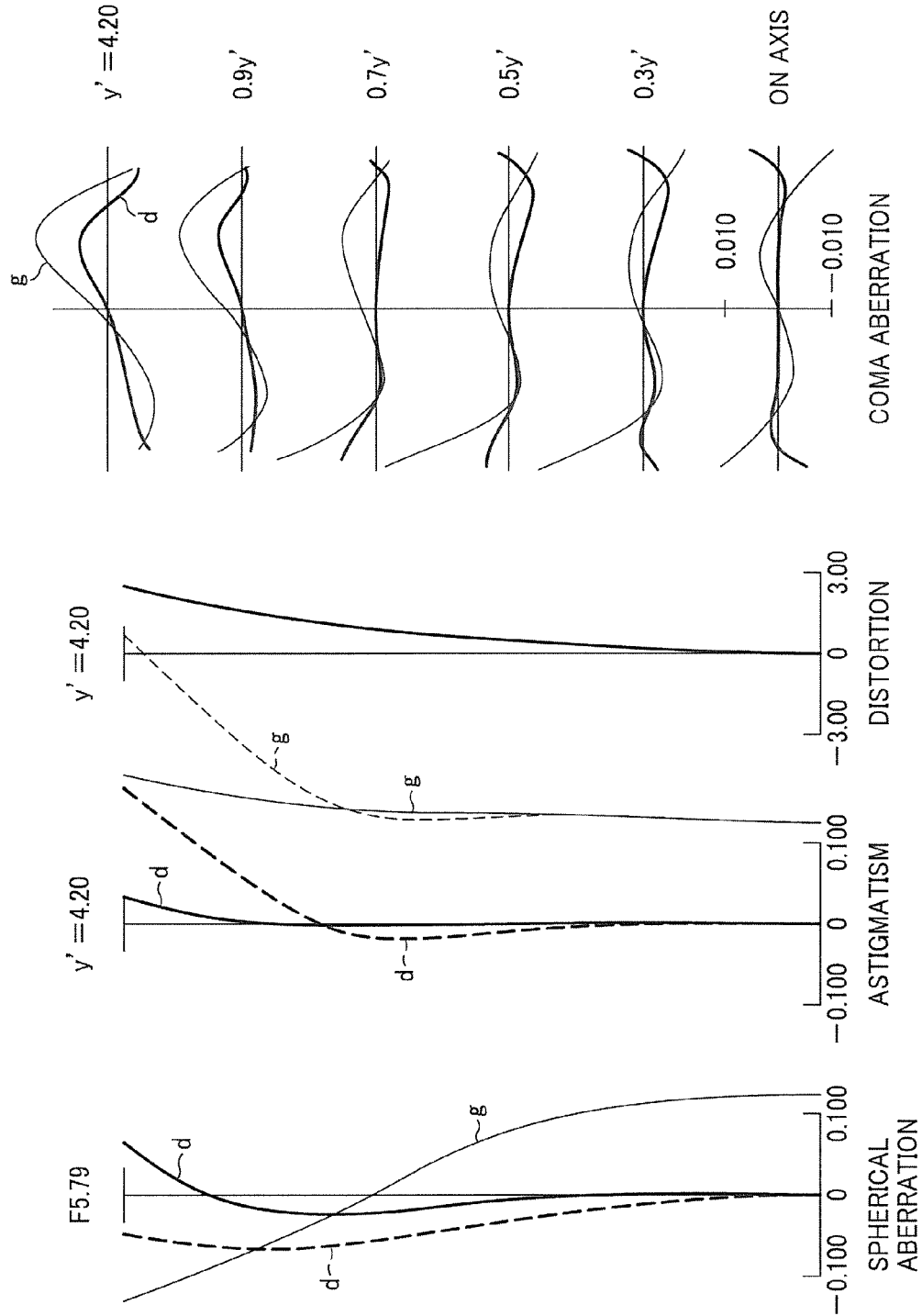
FIG. 12 is a view illustrating an aberration curve of a spherical aberration, astigmatism, distortion and coma aberration of the zoom lens according to Example 3 shown in FIG. 9 at a long focus end.

FIGS. 10 to 12 show aberration curves of spherical aberration, astigmatism, distortion, and coma aberration in the zoom lens according to Example 3 shown in FIG. 9. FIG. 10 shows the aberration curve at the short focus end (wide angle end), FIG. 11 shows the aberration curve at the intermediate focal length position, and FIG. 12 shows the aberration curve at the long focus end (telephoto end). In the spherical aberration curves, the broken line indicates sine condition, in astigmatism curves, the solid line indicates sagittal image plane, the broken line indicates meridional image plane, the heavy line indicates d-line, and the thin line indicates g-line.

According to the aberration curves shown in FIGS. 10 to 12, it is found that in the zoom lens of Example 3 shown in FIG. 9, the aberration is sufficiently corrected or controlled.

Example 4

FIG. 13 shows a configuration of optical systems of the zoom lens according to Example 3 of the present invention. The positions of each of the lens groups in changing from a short focus end (WIDE) to a long focus end (TELE) through an intermediate focal length position (MEAN) are shown in FIG. 13. Movement loci of each of the lens groups in zooming are also schematically shown in FIG. 13.

In this case, the zoom lens further includes a sixth optical system such as a sixth lens group.

The zoom lens shown in FIG. 13 includes a first lens L1, a second lens L2, a third lens L3, a fourth lens L4, a fifth lens L5, a sixth lens L6, a seventh lens L7, an eighth lens L8, a ninth lens L9, a $10^{th}$ lens L10, an $11^{th}$ lens L11, $12^{th}$ lens L12, a $13^{th}$ lens L13, a prism PR, an aperture stop FA and the filter OF.

In this case, the first lens L1, the prism PR, the second lens L2, and the third lens L3 constitute the first optical system G1, the fourth to sixth lenses L4 to L6 constitute the second optical system G2, the seventh to $10^{th}$ lenses L7 to L10 constitute the third optical system G3, the $11^{th}$ lens L11 singularly constitutes the fourth optical system G4, the $12^{th}$ lens L12 singularly constitutes the fifth optical system G5, and the $13^{th}$ lens L13 singularly constitutes the sixth optical system G6. Each optical system is supported by an appropriate common base frame or the like and each optical system is operated integrally in zooming to change relative distances or intervals among the first optical system G1, the second optical system G2, the aperture stop FA, the third optical system G3, the fourth optical system G4, the fifth optical system G5, the sixth optical system G6 and the filter OF.

In FIG. 13, surface numbers of optical surfaces in the zoom lens are shown. Furthermore, each reference number in FIG. 13 is independently used in each example to avoid cumbersome description in the drawings due to increased numbers of reference numbers.

In FIG. 13, each optical element, which constitutes the optical system of the zoom lens, is disposed in series, for example, the first lens L1, the prism PR, the second lens L2, the third lens L3, the fourth lens L4, the fifth lens L5, the sixth lens L6, the aperture stop FA, the seventh lens L7, the eighth lens L8, the ninth lens L9, the $10^{th}$ lens L10, the $11^{th}$ lens L11, the $12^{th}$ lens L12, the $13^{th}$ lens L13, and the filter OF are arranged in series in order from the object side to image an image on a back side of the filter OF.

The first lens L1 is a negative meniscus lens which has an aspheric surface at the image side and a convex surface at the object side. The prism PR is used as a deflection optical element to deflect a light path. The prism PR reflects and deflects the light path, for example, by 90 degrees. The second lens L2 is a positive lens which has convex surfaces at both of the object side and the image side. The third lens L3 is a positive meniscus lens which has a convex surface at the object side.

The first lens L1, the prism PR, the second lens L2, and the third lens L3 constitute the first optical system G1 having the positive focal length and are operated in a group in zooming. In this case, the first optical system G1 is not moved at a fixed position when zooming.

The fourth lens L4 is a negative lens which has a concave surface at both sides and where the concave surface at the image side is formed as an aspheric surface. The fifth lens L5 is a negative lens which has a concave surface at both sides and the sixth lens L6 is a positive lens which has a convex surface at both sides. The fifth lens L5 and the sixth lens L6 are closely attached to each other and integrally cemented to form a cemented lens formed by the two lenses. The fourth to sixth lenses L4 to L6 constitute the second optical system G2 having the negative focal length and are operated in a group when zooming.

The aperture stop FA is singularly operated when zooming. In this case, the aperture stop FA is not moved at a fixed position in zooming.

The seventh lens L7 is a positive lens which has a convex surface at both sides and where the convex surface at the object side is formed as an aspheric surface. The eighth lens L8 is a positive lens which has a convex surface at both sides and the ninth lens L9 is a negative lens which has a concave surface at both sides. The eighth lens L8 and the ninth lens L9 are closely attached to each other and integrally cemented to form a cemented lens formed by the two lenses. The $10^{th}$ lens L10 is a positive lens which has a convex surface at both sides and where the convex surface at the image side is formed as an aspheric surface. The above-described seventh to $10^{th}$ lenses L7 to L10 constitute the third optical system G3 having the positive focal length and are operated in a group when zooming.

The $11^{th}$ lens L11 is a negative lens which has a concave surface at both sides and where the concave surface at the image side is formed as an aspheric surface. The $11^{th}$ lens L11 singularly constitutes the fourth optical system G4 having the negative focal length and is operated in a group when zooming. In this case, the fourth optical system G4 remains still, that is, is not moved at a fixed position when zooming.

The $12^{th}$ lens L12 is a positive lens which has a convex surface at both sides and where the convex surface at the object side is formed as an aspheric surface. The $12^{th}$ lens L12 singularly constitutes the fifth optical system G5 having the positive focal length and is operated in a group when zooming.

The $13^{th}$ lens L13 is a negative meniscus lens which has an aspheric surface at the object side and formed in a convex form at the image side. The $12^{th}$ lens L12 singularly constitutes the fifth optical system G5 having the positive focal length and is operated in a group when zooming. The $13^{th}$ lens L13 singularly constitutes the sixth optical system having the negative focal length and is operated in a group. In this case, the sixth optical system is integrally provided on the filter OF and is not moved at a fixed position in zooming.

In changing magnification of the zoom lens between the short focus end (wide angle end) and the long focus end (telephoto end), the intervals between the optical elements DA, DB, DC, DD, DE and DF in the zoom lens are variable. The interval DA is an interval between a surface of the first optical system G1 at the most image side of the first optical system G1, that is, the surface (9) of the third lens L3 at the image side and a surface of the second optical system G2 at the most object side, that is, a surface (10) of the fourth lens L4 at the object side. The interval DB is an interval between a surface of the second optical system G2 at the most image side of the second optical system G2, that is, the surface (14) of the sixth lens L6 at the image side and a surface (15) of the aperture stop FA. The interval DC is an interval between the surface (15) of the aperture stop FA and a surface of the third optical system G3 at the most object side of the third optical system G3, that is, the surface (16) of the seventh lens L7 at the object side. The interval DD is an interval between a surface of the third optical system G3 at the most image side of the third optical system G3, that is, the surface (22) of the $10^{th}$ lens L10 at the image side and a surface of the fourth optical system G4 at the most object side, that is, a surface (23) of the $11^{th}$ lens L11 at the object side. The interval DE is an interval between a surface of the fourth optical system G4 at the most image side of the fourth optical system G4, that is, the surface (24) of the $11^{th}$ lens L11 at the image side and a surface of the fifth optical system G5 at the most object side, that is, a surface (25) of the $12^{th}$ lens L12 at the object side. The interval DF is an interval between a surface of the fifth optical system G5 at the most image side of the fifth optical system G5, that is, the surface (26) of the $12^{th}$ lens L12 at the image side and a surface (27) of the $13^{th}$ lens L13 at the object side.

When changing the magnification of the zoom lens from the wide angle end to the telephoto end, the second optical system G2, the third optical system G3, and the fifth optical system G5 are moved such that the interval DA between the first optical system G1 and the second optical system G2 is gradually increased, the interval DB between the second optical system G2 and the aperture stop FA is gradually decreased, the interval DC between the aperture stop FA and the third optical system G3 is gradually decreased, the interval DD between the third optical system G3 and the fourth optical system G4 is gradually increased, the interval DE between the fourth optical system G4 and the fifth optical system G5 is gradually increased, and the interval DF between the fifth optical system G5 and the sixth optical system is gradually decreased.

In the movement when changing the magnification of the zoom lens from the wide angle end to the telephoto end, the second optical system G2 is substantially monotonously moved toward the image side, the third optical system G3 is moved toward the object side, and the fifth optical system G5 is substantially monotonously moved to the image side.

In Example 4, the focal length f of the zoom lens and the F-value F vary, respectively, in ranges of f=5.21 to 35.01 and F=3.68 to 5.85. Optical properties of each optical element are shown in the following table.

TABLE 7

| Surface No. | R | D | Nd | vd | Remarks | Glass |
|---|---|---|---|---|---|---|
| 01 | 28.310 | 0.70 | 1.92286 | 18.90 | L1 | SNPH2 (OHARA) |
| 02* | 11.266 | 4.30 | | | | |
| 03 | ∞ | 8.00 | 1.88300 | 40.76 | PR | SLAH58 (OHARA) |
| 04 | ∞ | 8.00 | 1.88300 | 40.76 | PR | SLAH58 (OHARA) |
| 05 | ∞ | 0.10 | | | | |
| 06 | 85.851 | 2.72 | 1.51633 | 64.14 | L2 | SBSL7 (OHARA) |
| 07 | −17.035 | 0.10 | | | | |
| 08 | 16.205 | 2.25 | 1.64000 | 60.08 | L3 | SBSM81 (OHARA) |
| 09 | 910.382 | Variable (DA) | | | | |
| 10 | −31.869 | 0.80 | 2.00330 | 28.27 | L4 | LLAH79 (OHARA) |
| 11* | 9.202 | 2.95 | | | | |
| 12 | −7.462 | 1.07 | 1.58913 | 61.15 | L5 | LBAL35 (OHARA) |
| 13 | 35.368 | 1.24 | 1.92286 | 18.90 | L6 | SNPH2 (OHARA) |
| 14 | −16.733 | Variable (DB) | | | | |
| 15 | Aperture stop | Variable (DC) | | | FA | |
| 16* | 10.714 | 2.85 | 1.71700 | 47.93 | L7 | SLAM3 (OHARA) |
| 17 | −3109.413 | 4.33 | | | | |
| 18 | 11.550 | 3.02 | 1.61800 | 63.33 | L8 | SPHM52 (OHARA) |
| 19 | −8.690 | 0.80 | 1.90366 | 31.32 | L9 | TAFD25 (OHARA) |
| 20 | 8.589 | 0.45 | | | | |
| 21 | 8.822 | 2.40 | 1.48749 | 70.24 | L10 | SFSL5 (OHARA) |
| 22* | −19.307 | Variable (DO) | | | | |
| 23 | −104.231 | 0.80 | 1.92286 | 18.90 | L11 | SNPH2 (OHARA) |
| 24* | 16.112 | Variable (DE) | | | | |
| 25* | 21.611 | 3.00 | 1.48749 | 70.24 | L12 | SFSL5 (OHARA) |
| 26 | −10.120 | Variable (DF) | | | | |
| 27* | −10.321 | 0.80 | 1.77250 | 49.60 | L13 | SLAH66 (OHARA) |
| 28 | −12.645 | 0.10 | | | | |
| 29 | ∞ | 0.80 | 1.50863 | 64.00 | OF | Filter |
| 30 | ∞ | | | | | |

In Table 7, an asterisk indicates that the surface is aspheric. That is, each of a second surface, an 11th surface, a 16th surface, a 22nd surface, 24th surface, a 25th surface and a 27th surface is aspheric and the parameters in the equation (9) for each aspheric surface are as follows.

Aspheric surface: the 2nd surface
  $K=-2.71728E-06$
  $A_4=-3.58900E-07$
  $A_6=1.70392E-09$
  $A_8=4.11931E-13$ Aspheric surface: the 11th surface
  $K=-1.24369E-04$
  $A_4=1.17040E-06$
  $A_6=-9.36061E-08$
  $A_8=-1.94537E-09$ Aspheric surface: the 16th surface
  $K=-5.03986E-05$
  $A_4=1.88819E-07$
  $A_6=-4.04258E-09$
  $A_8=4.05202E-11$ Aspheric surface: the 22nd surface
  $K=2.35721E-04$
  $A_4=1.56156E-06$
  $A_6=-1.45635E-07$
  $A_8=2.75915E-09$ Aspheric surface: the 24th surface
  $K=3.77794E-04$
  $A_4=1.16807E-05$
  $A_6=6.58942E-07$
  $A_8=-4.47280E-08$ Aspheric surface: the 25th surface
  $K=1.70399E-04$
  $A_4=2.68367E-05$
  $A_6=-3.07464E-08$
  $A_8=1.09834E-08$ Aspheric surface: the 27th surface
  $K=3.59460E-04$
  $A_4=-5.08998E-05$
  $A_6=1.62131E-06$
  $A_8=0.00000E+00$ The interval DA between the first optical system G1 and the second optical system G2, the interval DB between the second optical system G2 and the aperture stop FA, the interval DC between the aperture stop FA and the third optical system G3, the interval DD between the third optical system G3 and the fourth optical system G4, the interval DE between the fourth optical system G4 and the fifth optical system G5, and the interval DF between the fifth optical system G5 and the sixth optical system G6 are changed when zooming as shown in the following table.

TABLE 8

| | Short focus end | Intermediate focal length position | Long focus end |
|---|---|---|---|
| f | 5.21 | 13.50 | 35.01 |
| F-Number | 3.58 | 5.69 | 5.85 |
| DA | 0.89 | 5.00 | 8.83 |
| DB | 8.57 | 4.46 | 0.63 |
| DC | 11.19 | 5.75 | 0.50 |
| DD | 5.42 | 10.86 | 16.11 |
| DE | 1.00 | 3.35 | 3.48 |
| DF | 3.02 | 0.67 | 0.54 |

Values according to the conditions in this Example 4 are as follows: The values used in the conditions of the Example 4:

Dw=2.50

Dt=3.60 b2t=−1.550 b2w=0.62 b3t=−1.328 b3w=−0.627 f2=−7.001 f3=13.908

The values of the conditions of the Example 4:

(T23w/Y')/(ft/fw)=0.700

(Ts3w/T2sw)=1.306

Dt/Dw=1.440 f2/Y'=−1.667 f3/Y'=3.311 b2t/b2w=2.757 b3t/b3w=2.119

(b3t/b3w)/(b2t/b2w)=0.768

Accordingly, the numerical values according to the above-described conditions in Example 4 are within the conditions.

Figure 14:
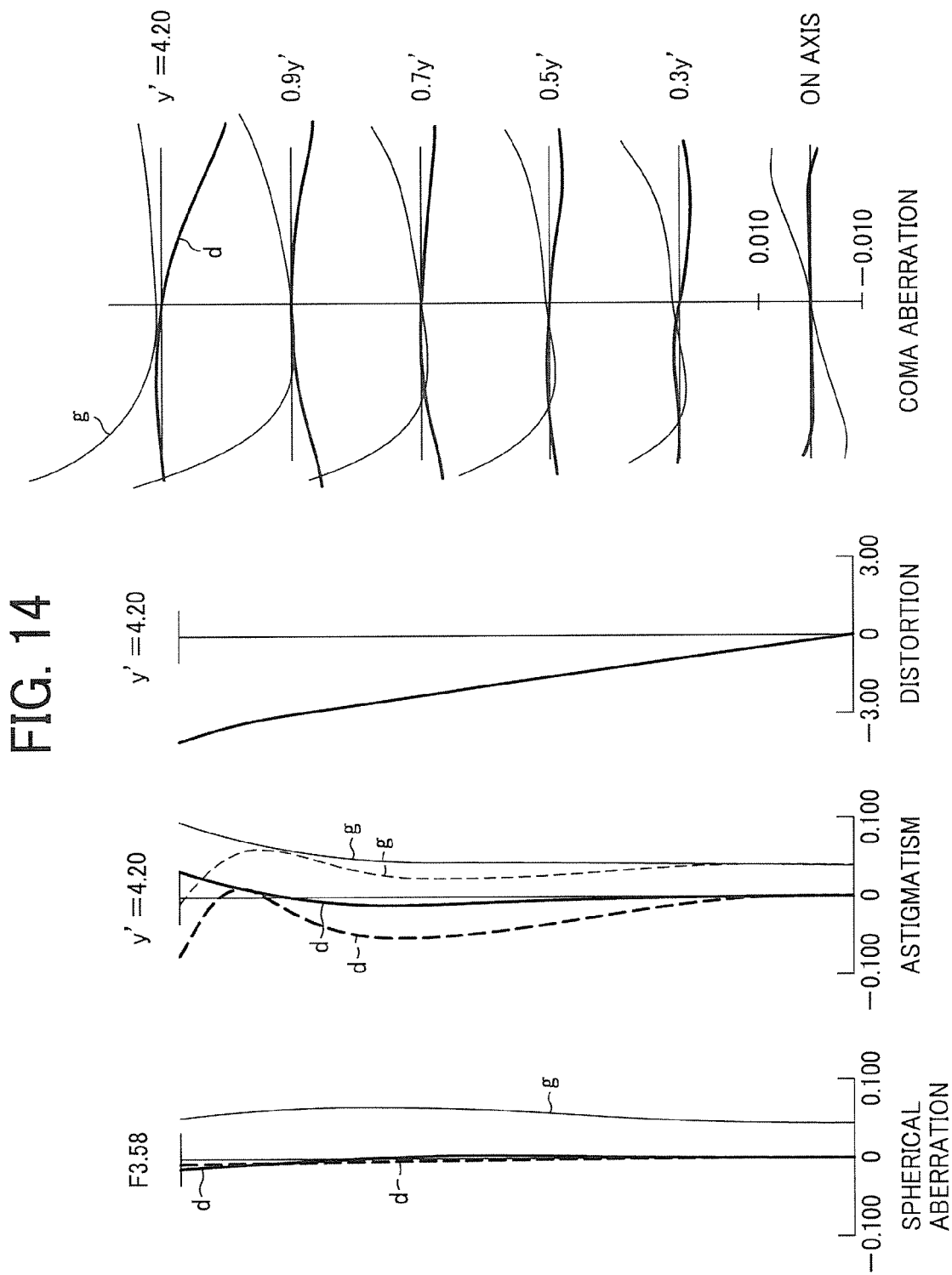
FIG. 14 is a view illustrating an aberration curve of a spherical aberration, astigmatism, distortion and coma aberration of the zoom lens according to Example 4 shown in FIG. 13 at a short focus end.
Figure 15:
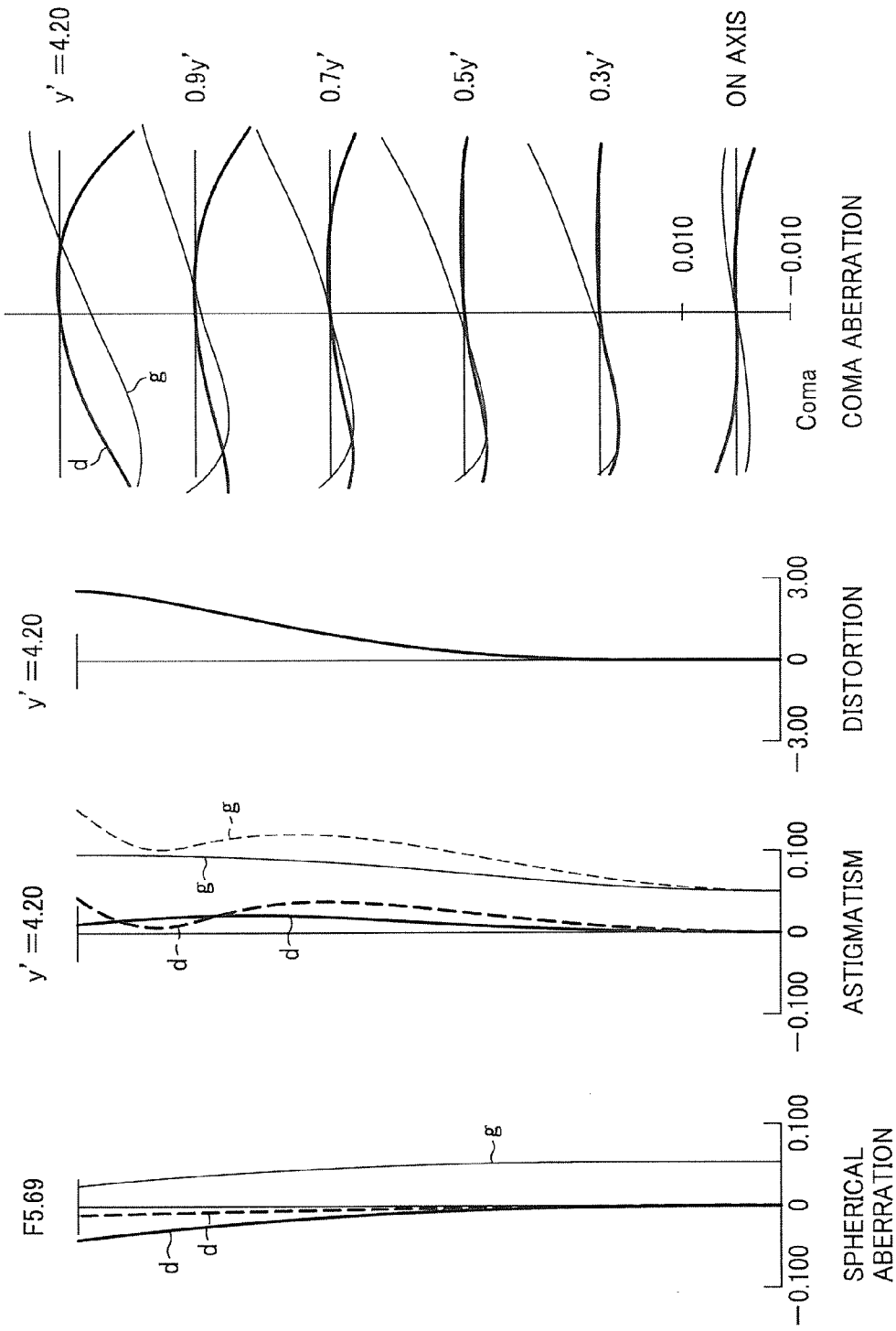
FIG. 15 is a view illustrating an aberration curve of a spherical aberration, astigmatism, distortion and coma aberration of the zoom lens according to Example 4 shown in FIG. 13 at an intermediate focal length position.
Figure 16:
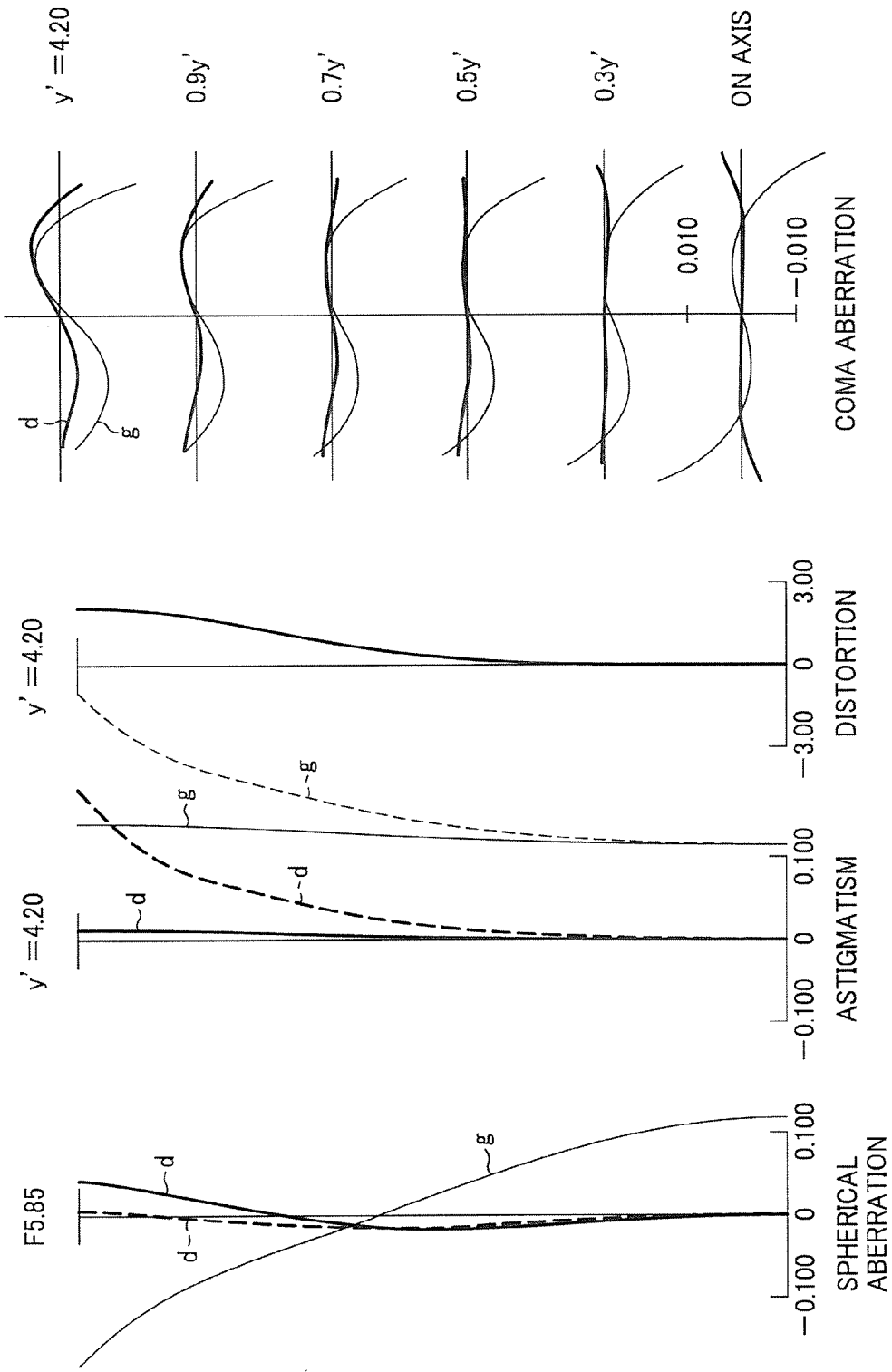
FIG. 16 is a view illustrating an aberration curve of a spherical aberration, astigmatism, distortion and coma aberration of the zoom lens according to Example 4 shown in FIG. 13 at a long focus end.

FIGS. 14 to 16 show aberration curves of spherical aberration, astigmatism, distortion, and coma aberration in the zoom lens according to Example 4 shown in FIG. 13. FIG. 14 shows the aberration curve at the short focus end (wide angle end), FIG. 15 shows the aberration curve at the intermediate focal length position, and FIG. 16 shows the aberration curve at the long focus end (telephoto end). In the spherical aberration curves, the broken line indicates a sine condition, in astigmatism curves, the solid line indicates a sagittal image plane, the broken line indicates a meridional image plane, the heavy line indicates a d-line, and the thin line indicates a g-line.

According to the aberration curves shown in FIGS. 14 to 16, it is found that in the zoom lens of Example 4 shown in FIG. 13, the aberration is sufficiently corrected or controlled.

Second Embodiment

Next, a zoom lens according to a second embodiment of the present invention will be explained in detail as Examples 5 to 10 with reference to the drawings.

Figure 17:
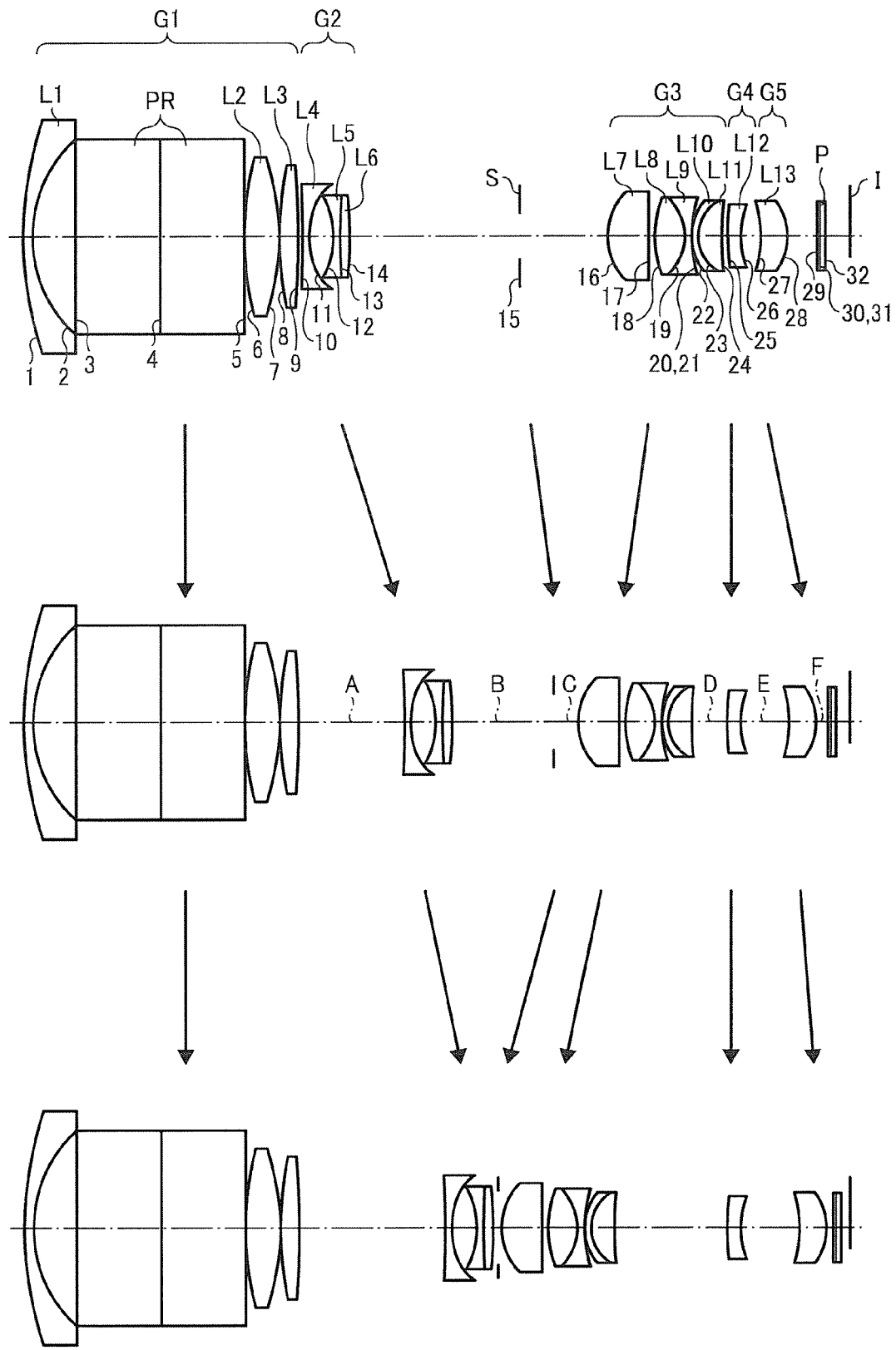
FIG. 17 is a sectional view schematically illustrating configurations of an optical system in a zoom lens according to Example 5 of the first embodiment of the present invention along an optical axis of the zoom lens.

FIGS. 17 and 21 show sectional views of the configuration of the zoom lens according to the second embodiment. FIG. 17 shows a configuration of the zoom lens of Example 5, FIG. 21 shows a configuration of the zoom lens of Example 6.

The zoom lens according to Example 5 includes five lens groups, that is, "positive, negative, positive, negative, and positive" lens groups G1 to G5. In the zoom lens, the second lens group G2 serves as a so-called variator which has a function to mainly change the magnification of the zoom lens. The third lens group G3 and the lens groups thereafter are also configured to have the function to change the magnification of the zoom lens so that the burden of the second lens group on the magnification change is reduced and the degree of freedom to correct the aberration is ensured even though the correction for the aberration becomes difficult with the high variable magnification ratio. The fifth lens group serves as a so-called compensator to correct positional variation of an imaging surface with changing the magnification and the fourth lens group has a function to perform focusing with the movement of an object point. The first lens group G1 and the fourth lens group G4 are fixed when changing the magnification of the zoom lens, that is, are not moved so that a large size lens barrel unit can be prevented as well as a wide angle and high variable magnification ratio being achieved even when number of the optical elements of the lens groups are comparatively large.

According to the zoom lens of the second embodiment of the present invention, as shown in the following examples (Examples 5 and 6), a zoom lens which has a small size body and where the aberration is sufficiently corrected can be provided. Therefore, by use of the above zoom lens, an imaging apparatus, a camera and a personal data assistant each having a small size body and high performance can be provided.

Due to the small size of the body, energy-saving can be achieved by downsizing the elements and reducing the number of elements.

The second embodiment of the present invention will be explained with two specific examples of the zoom lens, as follows.

In the following examples as shown in FIG. 17, the zoom lens may include an optical element which is disposed at an image side of the fifth lens group G5 and is formed in a parallel plate form. The optical element may be, for example, an optical filter such as an optical low-pass filter, an infrared cut filter or the like, or a cover glass (seal glass) of a light-receiving element such as a CCD sensor, a transparent parallel plate equivalent to the above elements or the like, which is referred as to a parallel plate P.

FIG. 17 shows the configuration of the zoom lens according to Example 5 and zooming movement loci when changing magnification from a wide angle end to a telephoto end through an intermediate focal length position.

In FIG. 17, the zoom lens includes the first lens group G1 having a positive refractive power, the second lens group G2 having a negative refractive power, the third lens group G3 having a positive refractive power, the fourth lens group G4 having a negative refractive power, and the fifth lens group G5 having a positive refractive power. The zoom lens further includes an aperture stop S between the second lens group and the third lens group and the parallel plate is disposed at a back side of the fifth lens group G5, that is, the image side thereof.

When changing the magnification of the zoom lens from the wide angle end to the telephoto end, an interval (A) between the first lens group G1 and the second lens group G2 is increased, an interval (B+C), between the second lens group G2 and the third lens group G3 is decreased, an interval (D) between the third lens group G3 and the fourth lens group G4 is increased, an interval (E) between the fourth lens group G4 and the fifth lens group G5 is increased, and an interval (F) between the fifth lens group G5 and the parallel plate P is decreased.

In the second embodiment of the present invention, the first lens group G1 and the fourth leas group G4 remain still, that is, are not moved in a fixed state in zooming.

The first lens group G1 includes a negative meniscus lens L1 having a convex surface at the object side, a prism PR, and two positive lenses L2, L3 in order from the object side.

The second lens group G2 has a negative lens L4 having aspheric surfaces at both sides and a cemented lens in which a negative lens L5 having a concave surface at both sides and a positive lens L6 having a convex surface at both sides are closely attached to each other to form a cemented lens in order from the object side.

The aperture stop S is disposed between the second lens group G2 and the third lens group G3 and is configured to move toward the image side when changing the magnification of the zoom lens.

The third lens group G3 includes a positive meniscus lens L7 having aspheric surfaces at both sides, a cemented lens which is formed of a positive lens L8 having a convex surface at both sides and a negative lens L9 having a concave surface at both sides, and a cemented lens which is formed of a negative meniscus lens L10 and a positive meniscus lens L11 having an aspheric surface at the image side, in order from the object side. In the positive meniscus lens L7, the aspheric surface having a stronger convex surface than the other is directed to the object side.

The fourth lens group G4 includes a negative meniscus lens L12 having a convex surface at the object side and an aspheric surface at the image side.

The fifth lens group G5 includes a positive meniscus lens L13 having aspheric surfaces at both sides.

According to the configuration of the zoom lens in this embodiment, the chromatic aberration and other aberrations of magnification can be effectively corrected even when the high variable magnification ratio of 10.1 is applied.

In the second embodiment, as shown by Examples 5 and 6 in FIGS. 17 and 21, the parallel plate P is disposed between the fifth lens group G5 and the imaging surface I. Here, the parallel plate P corresponds to the optical element, for example, an optical filter such as a low-pass filter which is configured to cut a spatial frequency corresponding to an excess of the limit resolution of a solid-state image sensing device such as a CCD or the like disposed at an imaging surface I, or a cover glass which is configured to protect the image sensing device.

Third Embodiment

Next, a third embodiment of the present invention will be explained with reference to FIGS. 25, 29, 33, and 37.

In FIGS. 25, 29, 33 and 37, although the basic configurations are in common, some elements in an imaging optical system are different and are respectively shown in Examples 7, 8, 9, and 10 in section.

The zoom lens according to the third embodiment will be specifically explained as Example 7 shown in FIG. 25 hereinbelow.

The zoom lens according to the third embodiment of the present invention includes six lens groups, that is, "positive, negative, positive, negative, positive and positive or negative" lens groups G1 to G6. In the zoom lens, the second lens group G2 serves as a so-called variator, which has a function to mainly change the magnification of the zoom lens. The third lens group G3 and the lens groups thereafter are also configured to have the function to change the magnification of the zoom lens so that the burden of the second lens group on the magnification change is reduced and the degrees of freedom to correct the aberration is ensured even though the correction for the aberration becomes difficult with the high variable magnification ratio. The fifth lens group serves as a so-called compensator to correct positional variation of the imaging surface with changing the magnification and has a function to perform focusing with the improvement of an object point. The first lens group G1, the aperture stop S, the fourth lens group G4, and the sixth lens group G5 are fixed when changing the magnification of the zoom lens, that is, are not moved so that a large size lens barrel unit can be prevented as well as a wide angle and high variable magnification ratio being achieved even when number of the optical elements of the lens groups are comparatively large.

Figure 25:
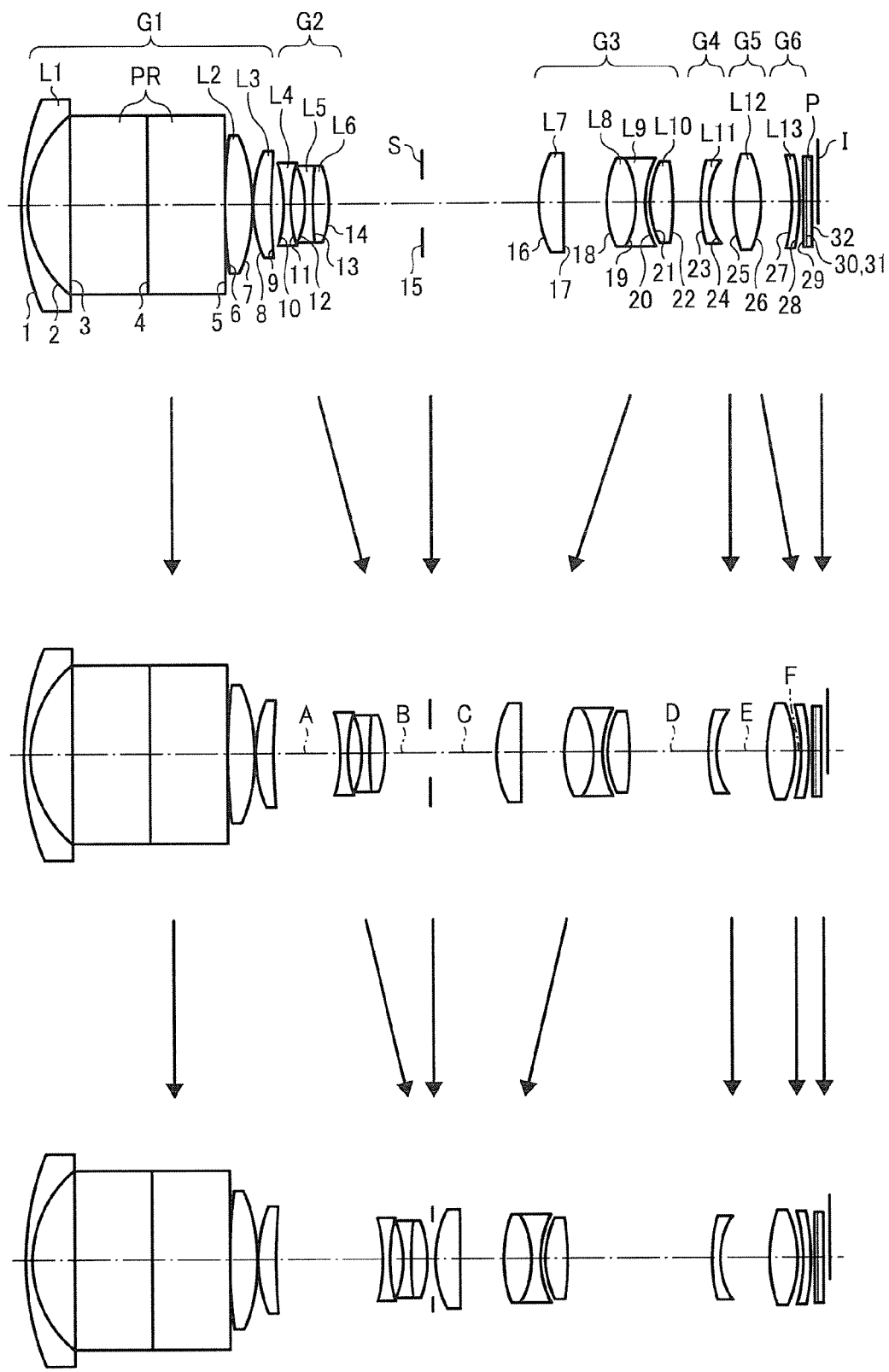
FIG. 25 is a sectional view schematically illustrating configurations of an optical system in a zoom lens according to Example 7 of the present invention.

FIG. 25 is a sectional view showing configurations of Example 7 of the third embodiment of the present invention and zooming movement loci in zooming from a wide-angle end to a telephoto end through a certain intermediate focal length position.

The zoom lens according to the third embodiment includes the first lens group G1 having a positive refractive power, the second lens group G2 having a negative refractive power, the third lens group G3 having a positive refractive power, the fourth lens group G4 having a negative refractive power, the fifth lens group G5 having a positive refractive power, the sixth lens group G6 having a negative refractive power, and the aperture stop S disposed between the second lens group G2 and the third lens group G3 in order from the object side along an optical axis of the zoom lens.

When changing the magnification of the zoom lens from the wide angle end to the telephoto end, an interval (A) between the first lens group G1 and the second lens group G2 is increased, an interval (B+C), between the second lens group G2 and the third lens group G3 is decreased, an interval (D) between the third lens group G3 and the fourth lens group G4 is increased, an interval (E) between the fourth lens group G4 and the fifth lens group G5 is increased, and an interval (F) between the fifth lens group G5 and the sixth lens group G6 is decreased.

In the third embodiment of the present invention, each of the first lens group G1, the aperture stop S, the fourth lens group G4 and the sixth lens group G6 is not moved in a fixed state in zooming. The first lens group G1 includes a negative meniscus lens L1 having a convex surface at the object side and an aspheric surface at the image side, a prism PR, and two positive lenses L2, L3 in order from the object side.

The second lens group G2 has a negative lens L4 which has a concave surface at both sides and where the concave surface at the image side is formed as an aspheric surface and a cemented lens in which a negative lens L5 having a concave surface at both sides and a positive lens L6 having a convex surface at both sides are closely attached to each other to form a cemented lens in order from the object side.

The aperture stop S is disposed between the second lens group G2 and the third lens group G3.

The third lens group G3 includes a positive meniscus lens L7 which has an aspheric surface at the object side and where a stronger convex surface than the other is directed to the object side, a cemented lens which is formed of a positive lens L8 having a convex surface at both sides and a negative lens L9 having a concave surface at both sides, and a positive lens L10 having a convex surface at both sides.

The fourth lens group G4 includes a negative meniscus lens L11 having a convex surface at the object side and an aspheric surface at the image side.

The fifth lens group G5 includes a positive meniscus lens L12 which has a convex surface at both sides and where the convex surface at the object side is formed as an aspheric surface.

The sixth lens group G6 includes a negative meniscus lens L13 having an aspheric surface at the object side and a convex surface at the image side.

In the third embodiment, as shown by Examples 7 and 10, the parallel plate P is disposed between the sixth lens group G6 and the imaging surface I. Here, the parallel plate P corresponds to the optical element, for example, an optical filter such as a low-pass filter which is configured to cut a spatial frequency corresponding to excess of limit resolution of a solid-state image sensing device such as a CCD or the like disposed at an imaging surface I, or a cover glass which is configured to protect the image sensing device.

The zoom lens according to the second embodiment of the present invention includes a first lens group having a positive refractive power, the first lens group not moving when changing a magnification of the zoom lens, a second lens group having a negative refractive power, a third lens group having a positive refractive power, a fourth lens group having a negative refractive power, the fourth lens group G4 not moving when changing the magnification of the zoom lens and a fifth lens group G5 having a positive refractive power, the first to fifth lens groups arranged along an optical axis of the zoom lens in order from an object side. When changing the magnification of the zoom lens from a wide angle end to a telephoto end, at least the second lens group G2, the third lens group G3, and the fifth lens group G5 are moved to perform the magnification. The third lens group G3 has at least two cemented surface. Accordingly, if the zoom lens is applied in a digital camera or the like, the thin body in a direction of the optical axis and the small size body can be achieved. The third lens group G3 has at least two cemented surfaces so that the chromatic aberration of magnification, which is a problem in a conventional zoom lens having high variable magnification ratio, can be effectively corrected. Here, the first lens group G1 may have a reflection optical element to bend a light path.

According to the zoom lens of the second embodiment, the following condition is preferably satisfied:

$$0.5 < \frac{f1}{\sqrt{fw \times ft}} < 2 \quad (10)$$

where f1 is a focal length of the first lens group, fw is a focal length of the zoom lens at the wide angle end, and ft is a focal length of the zoom lens at the telephoto end. By satisfying the above condition (10), the focal length of the first lens group G1 may be appropriately set. If the value is more than the lower limit of the condition (10), the refractive power of the first lens group can be prevented from being too large and the occurrence of the aberration can be prevented. If the value is less than the upper limit of the condition (10), the positive refractive power of the first lens group can be appropriately ensured so that the entire length of the zoom lens can be shortened.

In the zoom lens according to the second embodiment of the present invention, the following condition is preferably satisfied:

$$-1.0 < \frac{f2}{\sqrt{fw \times ft}} < -0.3 \quad (11)$$

where f2 is a focal length of the second lens group, fw is a focal length of the zoom lens at the wide angle end, and a focal length of the zoom lens at the telephoto end.

By satisfying the above condition (11), the focal length of the second lens group can be appropriately set. If the value is more than the lower limit of the condition (11), the negative refractive power of the second lens group can be appropriately maintained and the movement amount of the second lens group can be reduced to obtain a desired zoom ratio so that the entire length of the zoom lens can be shortened. If the value is less than the upper limit of the condition (11), too large a refractive power of the second lens group can be prevented so that the occurrence of the aberration of the second lens group can be controlled.

The zoom lens according to the second embodiment of the present invention may include an aperture stop configured to move when changing the magnification of the zoom. In this case, the chromatic coma aberration can be appropriately corrected.

In the zoom lens according to the second embodiment of the present invention, it is preferable that at least the second lens group and thereafter toward the image side each have at least one aspheric surface. In this case, the variation of the aberration with the magnification change can be appropriately corrected.

In the zoom lens according to the second embodiment, focusing may be performed with the fourth lens group which is not moved in changing the magnification of the zoom lens.

In the zoom lens according to the second embodiment, it is possible to achieve a magnification rate of 5 or more.

The zoom lens according to the second embodiment of the present invention may be applied to an imaging apparatus in combination with an image pickup device. In this case, the imaging apparatus having the above advantageous effects of the zoom lens can be provided.

By using the zoom lens as an imaging optical system in a camera, the camera having the above advantageous effects can be achieved.

By using the zoom lens according to the second embodiment as an imaging optical system in a personal data assistant, the personal data assistant having the above advantageous effects can be provided.

Next, operations of the third embodiment will be explained.

The zoom lens according to the third embodiment is configured to lead light from an object to an imaging surface including opposite long sides and opposite short sides and includes a first lens group having a positive refractive power, the first lens group remaining still when changing a magnification of the zoom lens, a second lens group having a negative refractive power, a third lens group having a positive refractive power, a fourth lens group having a negative refractive power, the fourth lens group remaining still when changing the magnification of the zoom lens, a fifth lens group having a positive refractive power and a sixth lens group having a positive or negative refractive power, the first to sixth lens groups being arranged along an optical axis of the zoom lens in order from an object side. When changing the magnification of the zoom lens from a wide angle end to a telephoto end, at least the second lens group, the third lens group, and the fifth lens group are moved to perform the magnification. The first lens group has a reflection optical element to bend a light path. The light path is bent along a longitudinal direction of the imaging surface by the reflection optical element.

Accordingly, in a case where the zoom lens is used in a digital camera, or the like, it can be possible to reduce the thickness of the camera in the optical axis direction of the camera. The imaging surface may be an image pickup surface or a light-receiving surface of the image pickup device of the imaging apparatus such as the camera. In the zoom lens using the reflection optical element, since the first lens group is fixed in relation to the imaging surface, in order to achieve a high variable magnification ratio, a large entire length of the optical system is required. However, if the light path is bent along a short-side direction of the imaging surface, the camera using the zoom lens is formed in a vertically-long form so that it is difficult to downsize the zoom lens, the camera, and the like. On the other hand, in the zoom lens according to the third embodiment of the present invention, since the light path is bent along the longitudinal direction, a lens barrel unit in which the zoom lens is provided is disposed in a lateral direction of the camera so that it is possible to downsize the camera.

In the zoom lens according to this embodiment, the following condition is preferably satisfied:

$$0.5 < fw/Y' < 1.4 \qquad (12)$$

where fw is a focal length of the zoom lens at the wide angle end, and Y' is a maximum image height of the zoom lens.

By satisfying the above condition (12), a wide angle of view can be achieved by the zoom lens.

In the zoom lens, the following condition is preferably satisfied:

$$0.15 < Lr1/Lr2 < 0.22 \qquad (13)$$

where Lr1 is a distance between a surface on the most object side of the lens groups in the zoom lens and a reflection surface of the reflection optical element on the optical axis of the zoom lens, and Lr2 is a distance between the reflection surface and an imaging surface or an image pickup surface on the optical axis of the zoom lens. By satisfying the above condition (13), it is possible to optimize balance of the camera size and the aberration correction to achieve the wide angle of view. If the value is less than the lower limit of the condition (13), the entire length of the camera becomes large and therefore it becomes difficult to reduce the camera size in the lateral direction of the camera. If the value is more than the upper limit of the condition (13), the size of the first lens group becomes large and therefore it becomes difficult to downsize the camera in thickness.

In the zoom lens according to this embodiment, the following condition is preferably satisfied:

$$3 < Lg1/fw < 7 \qquad (14)$$

where Lg1 is a thickness of the first lens group in a direction of the optical axis of the zoom lens, and fw is a focal length of the zoom lens at the wide angle end. In this case, it is possible to optimize a balance of the camera size and the aberration correction to achieve the wide angle of view. If the value is less than the lower limit of the condition (14), the power of each optical element is too large and therefore it becomes difficult to correct the aberration. If the value is more than the upper limit of the condition (14), the size of the first lens group is increased so that it is difficult to downsize the camera in thickness.

In the zoom lens according to this embodiment, the following condition is preferably satisfied:

$$1 < Lr2/fT < 3 \qquad (15)$$

where fT is a focal length of the zoom lens at the telephoto end and Lr2 is a distance between a reflection surface of the reflection optical element and an imaging surface on the optical axis of the zoom lens. In this case, it is possible to optimize a balance of the camera size and the aberration correction of the zoom lens with high variable magnification ratio. If the value is less than the lower limit of the condition (15), the power of each optical element becomes too large so that it becomes difficult to correct the aberration. If the value is more than the upper limit of the condition (15), the size of the zoom lens is increased so that the downsizing of the camera in thickness cannot be achieved.

In the zoom lens according this embodiment, the following condition is preferably satisfied:

$$2 < |fL1/fw| < 5 \qquad (16)$$

where fL1 is a composite focal length of at least one optical element disposed on the object side of the reflection optical element and fw is a focal length of the zoom lens at the wide angle end. In this case, it is possible to optimize a balance of the camera size and the aberration correction to achieve a wide angle of view. If the value is less than the lower limit of the condition (16), the power of each optical element becomes too large so that it becomes difficult to correct the aberration. If the value is more than the upper limit of the condition (15), the size of the zoom lens is increased so that the downsizing of the camera in thickness cannot be achieved.

The zoom lens according this embodiment may include an aperture stop, and the following condition is preferably satisfied:

$$0.3 < Tap/T < 0.7 \qquad (17)$$

where Tap is a distance between a surface on the most object side of the zoom lens and the aperture stop on the optical axis of the zoom lens and T is an entire length of the zoom lens, for example, a distance between the surface on the most object side and the imaging surface, along the optical axis of the zoom lens. In this case, it is possible to set the condition concerning the position of the aperture stop. If the value is less than the lower limit of the condition (16), the power of each optical element after the aperture stop becomes too large so that it becomes difficult to correct the aberration. If the value is more than the upper limit of the condition (15), the size of the first lens group is increased so that the downsizing of the camera cannot be achieved.

In a case where an imaging apparatus includes an image pickup device and the zoom lens according to this embodiment, the imaging apparatus having the above advantageous effects of the zoom lens can be provided.

In a case where a camera includes the zoom lens according to this embodiment as an imaging optical system, the camera having the above advantageous effects of the zoom lens can be provided.

In a case where a personal data assistant include an imaging optical system in a camera function and the imaging optical system is the zoom lens according to this embodiment, the personal data assistant having the above advantageous effects can be provided.

Various examples of the zoom lens according to the second embodiment of the present invention will be explained in detail based on the specific examples with reference to FIGS. 17 and 21 as Examples 5 and 6, respectively, FIGS. 17 and 21 show in section the configurations of the zoom lens and movement loci of the lens groups in changing the magnification of the zoom lens.

As described below, the aberration in the zoom lens of the following examples is sufficiently corrected. Due to the configurations of the zoom lens according to this embodiment, the wide half angle of view of 38 degrees, the variable magnification ratio of 5 or more, the small size body, and excellent performance for high resolution corresponding to $5 \times 10^6$ to $10^7$ pixels can be achieved, as shown in the following examples.

Reference numbers used hereinafter denote as follows:
f: total focal length of the lens system
F (F No.): F-number (F value)
ω: half field of angle (degree)
R: curvature radius A, B, C, D, E, F: variable interval
Nd: refractive index
vd: Abbe number
K: conic constant of aspheric surface
$A_4$: fourth order aspheric coefficient
$A_6$: sixth order aspheric coefficient
$A_8$: eighth order aspheric coefficient
$A_{10}$: tenth order aspheric coefficient In this regard, the aspheric surfaces used in the following examples are defined by the following equation:

$$X = \frac{CH^2}{1+\sqrt{1-(1+K)C^2H^2}} + A_4 \cdot H^4 + A_6 \cdot H^6 + A_8 \cdot H^8 + A_{10} \cdot H^{10}$$

(18)

where C is an inverse of a paraxial curvature radius (paraxial curvature), and H is a height from an optical axis of the zoom lens.

In the following drawings, aberration curves of spherical aberration, astigmatism, distortion, and coma aberration are shown. In the spherical aberration curves, the broken line indicates a sine condition, in astigmatism curves, the solid line indicates a sagittal image plane, the broken line indicates a meridional image plane, the heavy line indicates a d-line (587.56 nm), and the thin line indicates a g-line (435.83 nm).

In the following examples, the same reference numbers are used. Although unit "mm" of length such as focal length, curvature radius, surface interval, or the like is generally used, the optical system is not limited thereto and may be proportionally enlarged or minimized because the same optical performance can be obtained.

Example 5

FIG. 17 is a sectional view showing the configuration of the zoom lens according to Example 5 of the second embodiment of the present invention.

Configurations of the zoom lens of Example 5 at the wide angle end, at the intermediate focal length position, and at the telephoto end are shown in the upper side, in the middle, and in the lower side of FIG. 17, respectively.

Since the lens configurations are described above, those are omitted in the following descriptions.

When changing the magnification of the zoom lens from the wide angle end (short focus end) to the telephoto end (long focus end), an interval (A) between the first lens group G1 and the second lens group G2 is increased, an interval (B+C) between the second lens group G2 and the third lens group G3 is decreased, an interval (D) between the third lens group G3 and the fourth lens group G4 is increased, and an interval (E) between the fourth lens group G4 and the fifth lens group G5 is increased.

In changing magnification of the zoom lens between the wide angle end and the telephoto end, the intervals between the optical elements A, B, C, D, E and F in the zoom lens are variable. The interval A is an interval between a surface of the first optical system G1 at the most image side of the first optical system G1, that is, the surface (9) of the third lens L3 at the image side and a surface (10) of the second optical system G2 at the most object side. The interval B is an interval between a surface of the second optical system G2 at the most image side of the second optical system G2, that is, the surface (14) of the sixth lens L6 at the image side and the aperture stop S. The interval C is an interval between the aperture stop S and a surface (16) of the third optical system G3 at the most object side of the third optical system G3. The interval D is an interval between a surface of the third optical system G3 at the most image side of the third optical system G3, that is, the surface (24) of the 11$^{th}$ lens L11 at the image side and a surface of the fourth optical system G4 at the most object side, that is, a surface (25) of the 12$^{th}$ lens L12 at the object side. The interval E is an interval between a surface of the fourth optical system G4 at the most image side of the fourth optical system G4, that is, the surface (26) of the 12$^{th}$ lens L12 at the image side and a surface of the fifth optical system G5 at the most object side, that is, a surface (27) of the 13$^{th}$ lens L13 at the object side. The interval F is an interval between a surface of the fifth optical system G5 at the most image side of the fifth optical system G5, that is, the surface (28) and a surface of the optical filter at the object side.

In Example 5, with changing the focal length from the wide angle end to the telephoto end, the focal length f of the zoom lens, the F-number FNo, and the half angle of view ω are respectively changed as follows.

Focal length f of the zoom lens: 5.2-52.46

FNo (F-number): 3.50-5.30

Half angle of view ω: 38.9-4.58

The properties of each optical surface are shown in the following table (Table 9).

TABLE 9

| Surface No. | R | D | Nd | vd |
|---|---|---|---|---|
| 1 | 44.95792 | 1.40000 | 2.00330 | 28.27 |
| 2 | 18.19123 | 5.55487 | | |
| 3 | ∞ | 11.14295 | 1.92286 | 18.90 |
| 4 | ∞ | 11.14295 | 1.92286 | 18.90 |
| 5 | ∞ | 0.10000 | | |
| 6 | 42.90852 | 4.64526 | 1.49700 | 81.54 |
| 7 | −35.50750 | 0.10000 | | |
| 8 | 40.99892 | 2.48547 | 1.60300 | 65.44 |
| 9G | −306.68404 | Variable (A) | | |
| 10 | −49.71461 | 0.80000 | 1.49700 | 81.54 |
| 11 | 11.26080 | 3.41169 | | |
| 12 | −9.34227 | 0.80000 | 1.49700 | 81.54 |
| 13 | 147.19076 | 1.23588 | 1.92286 | 18.90 |
| 14G | −45.10958 | Variable (B) | | |
| 15G | ∞ (Aperture stop) | Variable (C) | | |
| 16 | 8.79196 | 5.37097 | 1.48749 | 70.24 |
| 17 | 143.92676 | 0.85963 | | |
| 18 | 14.53706 | 4.04747 | 1.49700 | 81.54 |
| 19 | −6.95171 | 0.80000 | 1.78590 | 44.20 |
| 20 | 17.97317 | 0.00000 | | |
| 21 | 17.97317 | 0.10194 | | |
| 22 | 8.23791 | 0.80076 | 1.80400 | 46.57 |
| 23 | 5.79925 | 3.12722 | 1.58913 | 61.15 |
| 24G | 642.44812 | Variable (D) | | |
| 25 | 31.31937 | 1.76501 | 1.74320 | 49.29 |
| 26G | 11.95705 | Variable (E) | | |
| 27 | −12.08678 | 3.50000 | 1.49700 | 81.54 |
| 28G | −7.25904 | Variable (F) | | |
| 29 | ∞ | 0.30000 | 1.52300 | 58.00 |
| 30 | ∞ | 0.10000 | | |
| 31 | ∞ | 0.50000 | 1.50000 | 64.00 |
| 32 | ∞ | | | |

In Table 9, each of a 10th surface, an 11th surface, a 16th surface, a 17th surface, a 24th surface, a 26th surface, a 27th surface, and a 28th surface is aspheric and the parameters in the equation (18) for each aspheric surface are as follows.

Aspheric surface; the 10th surface

K=0.000000

$A_4$=1.449910E−04

$A_6=1.720900E-06$ $A_8=-2.943860E-08$ $A_{10}=3.977810E-10$

Aspheric surface: the 11th surface

K=0.000000

$A_4=2.864370E-05$ $A_6=-3.837370E-06$ $A_8=-1.006410E-07$ $A_{10}=3.355980E-09$

Aspheric surface: the 16th surface

K=0.000000

$A_4=5.069080E-06$ $A_6=1.438890E-08$ $A_8=-1.007560E-08$ $A_{10}=2.118830E-10$

Aspheric surface: the 17th surface

K=0.000000

$A_4=-1.510860E-05$ $A_6=-1.211030E-06$ $A_8=-1.666590E-08$ $A_{10}=-1.507840E-10$

Aspheric surface: the 24th surface

K=0.000000

$A_4=5.407590E-04$ $A_6=3.325480E-06$ $A_8=3.846210E-08$ $A_{10}=9.466660E-10$

Aspheric surface: the 26th surface

K=0.000000

$A_4=-6.584630E-05$ $A_6=5.465910E-06$ $A_8=4.646620E-08$ $A_{10}=6.650220E-09$

Aspheric surface: the 27th surface

K=0.000000

$A_4=-3.624090E-04$ $A_6=3.250060E-05$ $A_8=6.245630E-07$ $A_{10}=-2.931100E-08$

Aspheric surface: the 28th surface

K=0.000000

$A_4=3.902200E-04$ $A_6=1.416010E-05$ $A_8=6.486340E-07$ $A_{10}=-1.940390E-08$

A variable interval A between the first lens group G1 and the second lens group G2, a variable interval B between the second lens group G2 and the aperture stop S, a variable interval C between the aperture stop S and the third lens group G3, a variable interval D between the third lens group G3 and the fourth lens group G4, a variable interval E between the fourth lens group G4 and the fifth lens group G5, a variable interval F between the fifth lens group G5 and the parallel plate P are changed in zooming as shown in the following table (Table 10).

TABLE 10

|   | Wide-angle end | Intermediate focal length position | Telephoto end |
|---|---|---|---|
| A | 0.70000 | 14.37866 | 19.74336 |
| B | 23.13449 | 13.72404 | 0.70000 |
| C | 11.75905 | 3.43101 | 0.55000 |
| D | 0.80663 | 4.86646 | 15.40681 |
| E | 2.81618 | 6.42695 | 8.06503 |
| F | 3.99341 | 1.72324 | 0.70770 |

The values of the parameters according to the conditions in Example 5 are as follows.

(Values Corresponding to Conditions)

f1=29.27 f2=−11.50 fw=5.2 ft=52.46

$$\frac{f1}{\sqrt{fw \times ft}} = 1.78 \qquad \text{condition (10)}$$

$$\frac{f2}{\sqrt{fw \times ft}} = -0.70 \qquad \text{condition (11)}$$

Accordingly, the numerical values according to the above-described conditions (10) and (11) in Example 5 are within the conditions.

Figure 18:
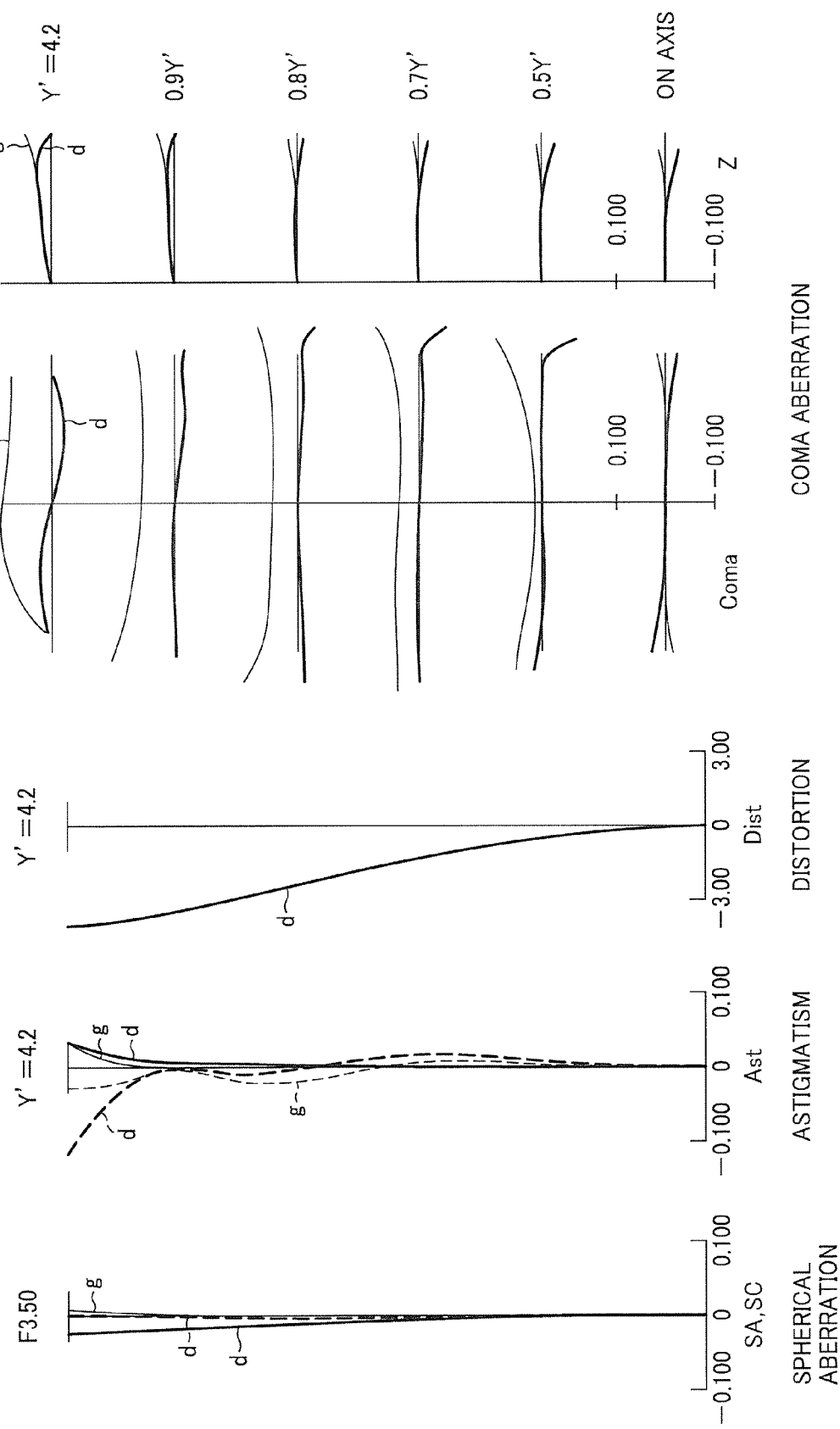
FIG. 18 is a view illustrating an aberration curve of a spherical aberration, astigmatism, distortion and coma aberration of the zoom lens according to Example 5 shown in FIG. 17 at a short focus end.
Figure 19:
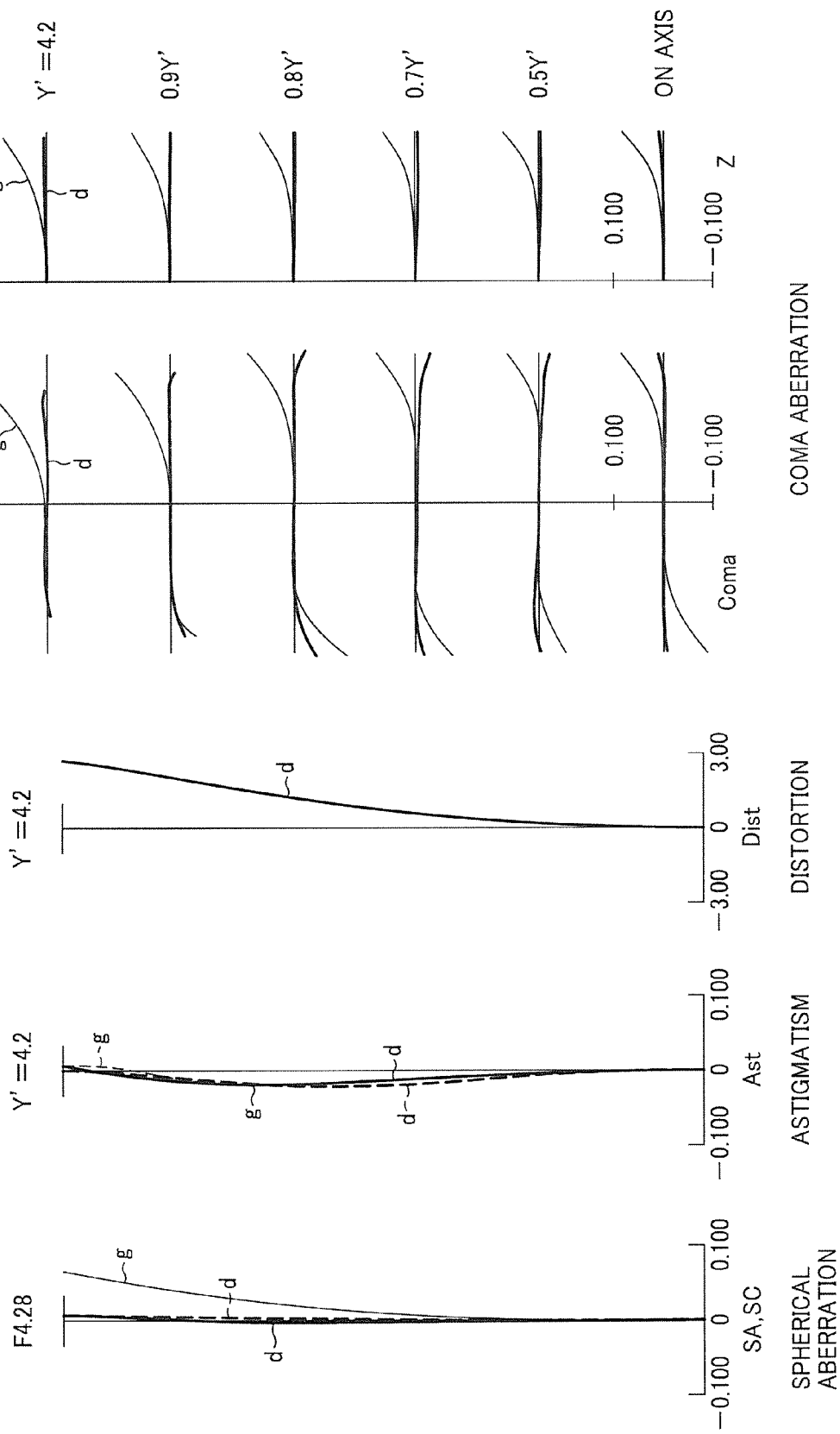
FIG. 19 is a view illustrating an aberration curve of a spherical aberration, astigmatism, distortion and coma aberration of the zoom lens according to Example 5 shown in FIG. 17 at an intermediate focal length position.
Figure 20:
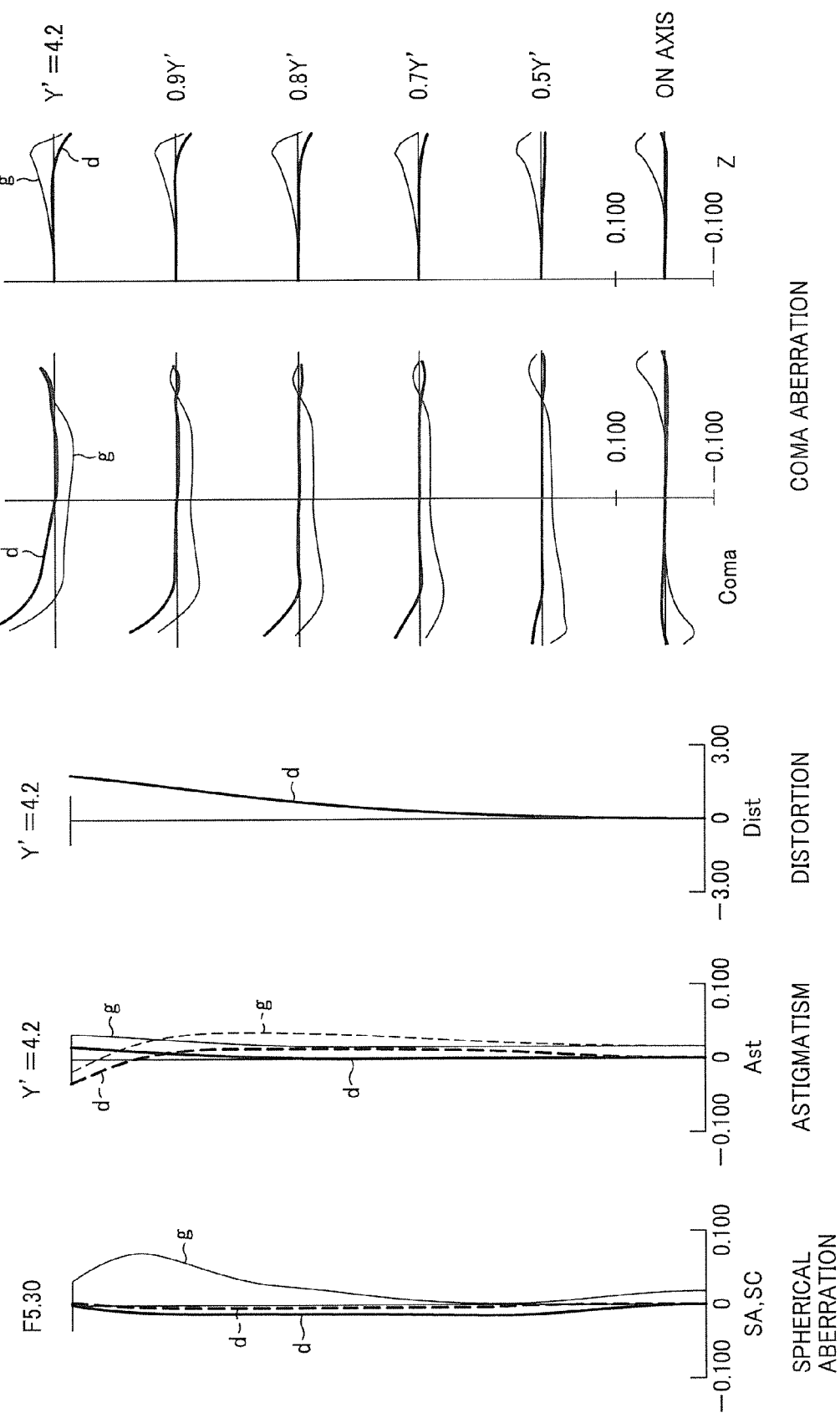
FIG. 20 is a view illustrating an aberration curve of a spherical aberration, astigmatism, distortion and coma aberration of the zoom lens according to Example 5 shown in FIG. 17 at a long focus end.

FIGS. 18 to 20 show aberration curves of spherical aberration, astigmatism, distortion, and coma aberration in the zoom lens according to Example 5 shown in FIG. 17. FIG. 18 shows the aberration curve at the wide angle end, FIG. 19 shows the aberration curve at the intermediate focal length position, and FIG. 20 shows the aberration curve at the telephoto end. In the spherical aberration curves, the broken line indicates a sine condition, and in astigmatism curves, the solid line indicates a sagittal image plane, the broken line indicates a meridional image plane.

According to the aberration curves shown in FIGS. 18 to 20, it is found that in the zoom lens of Example 5 shown in FIG. 17, the aberration is sufficiently corrected or controlled.

Due to the above configurations, in the zoom lens having five lens groups of positive-negative-positive-negative-positive lens groups, it is possible to appropriately correct the various aberrations and to provide a zoom lens which has a sufficiently small size and high performance while achieving the wide half angle of view of 38 degrees or more and the F-number FNo of 3.5 or less at the short focus end.

Example 6

FIG. 21 is a sectional view showing configurations of Example 6 and zooming movement loci in zooming from a wide angle end to a telephoto end through a certain intermediate focal length position.

The zoom lens includes the first lens group G1 having a positive refractive power, the second lens group G2 having a negative refractive power, the third lens group G3 having a positive refractive power, the fourth lens group G4 having a negative refractive power, and the fifth lens group G5 having a positive refractive power. The zoom lens further includes an aperture stop S between the second lens group and the third lens group.

When changing the magnification of the zoom lens from the wide angle end to the telephoto end, an interval (A) between the first lens group G1 and the second lens group G2 is increased an interval (B+C) between the second lens group G2 and the third lens group G3 is decreased, an interval (D) between the third lens group G3 and the fourth lens group G4 is increased, an interval (E) between the fourth lens group G4 and the fifth lens group G5 is increased, and an interval (F) between the fifth lens group G5 and the parallel plate P is decreased.

In Example 6, the first lens group G1 and the fourth lens group G4 are not moved in a fixed state in zooming.

The first lens group G1 includes a negative meniscus lens L1 having a convex surface at the object side, a prism PR, and two positive lenses L2, L3 in order from the object side.

The second lens group G2 has a negative lens L4 having aspheric surfaces at both sides and a cemented lens in which a negative lens L5 having a concave surface at both sides and a positive lens L6 having a convex surface at both sides are closely attached to each other to form a cemented lens in order from the object side.

The aperture stop S is disposed between the second lens group G2 and the third lens group G3 and is configured to move toward the image side when changing the magnification of the zoom lens.

The third lens group G3 includes a positive meniscus lens L7 having aspheric surfaces at both sides, a cemented lens which is formed by a positive lens L8 having a convex surface at both sides and a negative lens L9 having a concave surface at both sides, and a cemented lens which is formed by a negative meniscus lens L10 and a positive meniscus lens L11 having an aspheric surface at the image side, in order from the object side.

The fourth lens group G4 includes a negative meniscus lens L12 having a convex surface at the object side and an aspheric surface at the image side.

The fifth lens group G6 includes a positive meniscus lens L13 having aspheric surfaces at both sides.

In Example 6, with changing the focal length from the wide angle end to the telephoto end, the focal length f of the zoom lens, the F-number FNo, and the half angle of view ω are respectively changed as follows.

Focal length f of the zoom lens: 5.2-52.46 mm

FNo (F-number): 3.50-5.28

Half angle of view: 38.9-4.58

The properties of each optical surface are shown in the following table (Table 11).

TABLE 11

| Surface No. | R | D | Nd | νd |
|---|---|---|---|---|
| 1 | 45.44447 | 1.40000 | 2.00330 | 28.27 |
| 2 | 18.52295 | 5.58515 | | |
| 3 | ∞ | 11.26822 | 1.92286 | 18.90 |
| 4 | ∞ | 11.26822 | 1.92286 | 18.90 |
| 5 | ∞ | 0.10000 | | |
| 6 | 42.39953 | 4.73728 | 1.49700 | 81.54 |
| 7 | −35.60337 | 0.10000 | | |
| 8 | 38.18565 | 2.45785 | 1.60300 | 65.44 |
| 9G | −2519.99255 | Variable (A) | | |
| 10 | −50.86147 | 0.80000 | 1.49700 | 81.54 |
| 11 | 10.98019 | 3.46346 | | |
| 12 | −9.11946 | 0.80000 | 1.49700 | 81.54 |
| 13 | 263.17588 | 1.22924 | 1.92286 | 18.90 |
| 14G | −40.13952 | Variable (B) | | |
| 15G | 0.00000 | Variable (C) | | |
| 16 | 8.80095 | 5.35627 | 1.48749 | 70.24 |
| 17 | 188.97641 | 0.80757 | | |
| 18 | 14.99885 | 4.04394 | 1.49700 | 81.54 |
| 19 | −6.91983 | 0.80000 | 1.78590 | 44.20 |
| 20 | 18.21225 | 0.00000 | | |
| 21 | 18.21225 | 0.19013 | | |
| 22 | 8.19502 | 0.80000 | 1.80400 | 46.57 |
| 23 | 5.82912 | 3.14711 | 1.58913 | 61.15 |
| 24G | 1294.77163 | Variable (D) | | |
| 25 | 34.63553 | 1.63261 | 1.74320 | 49.29 |
| 26G | 12.18727 | Variable (E) | | |
| 27 | −13.24964 | 3.44828 | 1.49700 | 81.54 |
| 28G | −7.54523 | Variable (F) | | |
| 29 | ∞ | 0.30000 | 1.52300 | 58.00 |
| 30 | ∞ | 0.10000 | | |
| 31 | ∞ | 0.50000 | 1.50000 | 64.00 |
| 32 | ∞ | | | |

In Table 11, each of a 10th surface, an 11th surface, a 16th surface, a 17th surface, a 24th surface, a 26th surface, a 27th surface, and a 28th surface is aspheric and the parameters in the equation (18) for each aspheric surface are as follows.

Aspheric surface: the 10th surface $K=0.00000E+00$ $A_4=1.439630E-04$ $A_6=1.538730E-06$ $A_8=-2.395260E-08$ $A_{10}=3.838090E-10$ Aspheric surface: the 11th surface $K=0.00000E+00$ $A_4=1.712430E-05$ $A_6=3.725930E-06$ $A_8=1.083730E-07$ $A_{10}=3.775690E-09$ Aspheric surface: the 16th surface $K=0.00000E+00$ $A_4=-2.680710E-06$ $A_6=6.003040E-08$ $A_8=-1.010940E-08$ $A_{10}=1992350E-10$ Aspheric surface: the 17th surface

K=0.00000E+00

$A_4$=−1.276190E−05

$A_6$=−1.201450E−06

$A_8$=−1.590580E−08

$A_{10}$=−2.483700E−10

Aspheric surface: the 24th surface

K=0.00000E+00

$A_4$=5.412620E−04

$A_6$=3.506740E−06

$A_8$=3.839610E−08

$A_{10}$=−5.639540E−10

Aspheric surface: the 26th surface

K=000000E+00

$A_4$=−6.846690E−05

$A_6$=5.731070E−06

$A_8$=−4.983040E−08

$A_{10}$=8.913470E−09

Aspheric surface: the 27th surface

K=0.00000E+00

$A_4$=−3.541520E−04

$A_6$=3.170650E−05

$A_8$=5.801420E−07

$A_{10}$=−2.597480E−08

Aspheric surface: the 28th surface

K=0.00000E+00

$A_4$=3.922150E−04

$A_6$=1.290590E−05

$A_8$=7.421130E−07

$A_{10}$=−2.069480E−08

A variable interval A between the first lens group G1 and the second lens group G2, a variable interval B between the second lens group G2 and the aperture stop S, a variable interval C between the aperture stop S and the third lens group G3, a variable interval D between the third lens group G3 and the fourth lens group G4, a variable interval E between the fourth lens group G4 and the fifth lens group G5, a variable interval F between the fifth lens group G5 and the parallel plate P are changed in zooming as shown in the following table (Table 12).

TABLE 12

|   | Wide-angle end | Intermediate focal length position | Telephoto end |
|---|---|---|---|
| A | 0.70000 | 14.51205 | 19.90799 |
| B | 23.06270 | 13.65072 | 0.70000 |
| C | 11.83274 | 3.41268 | 0.55000 |
| D | 0.89104 | 4.91104 | 16.32850 |
| E | 3.19236 | 6.68222 | 8.37879 |
| F | 3.99544 | 1.72530 | 0.70975 |

The values of the parameters according to the conditions (10) to (11) in Example 6 are as follows.

(Values Corresponding to Conditions)

f1=29.63 f2=−11.4 fw=5.2 ft=52.46

$$\frac{f1}{\sqrt{fw \times ft}} = 1.79 \qquad \text{condition (10)}$$

$$\frac{f2}{\sqrt{fw \times ft}} = -0.69 \qquad \text{condition (11)}$$

Accordingly, the numerical values according to the above-described conditions (10) and (11) in Example 6 are within the conditions.

Figure 22:
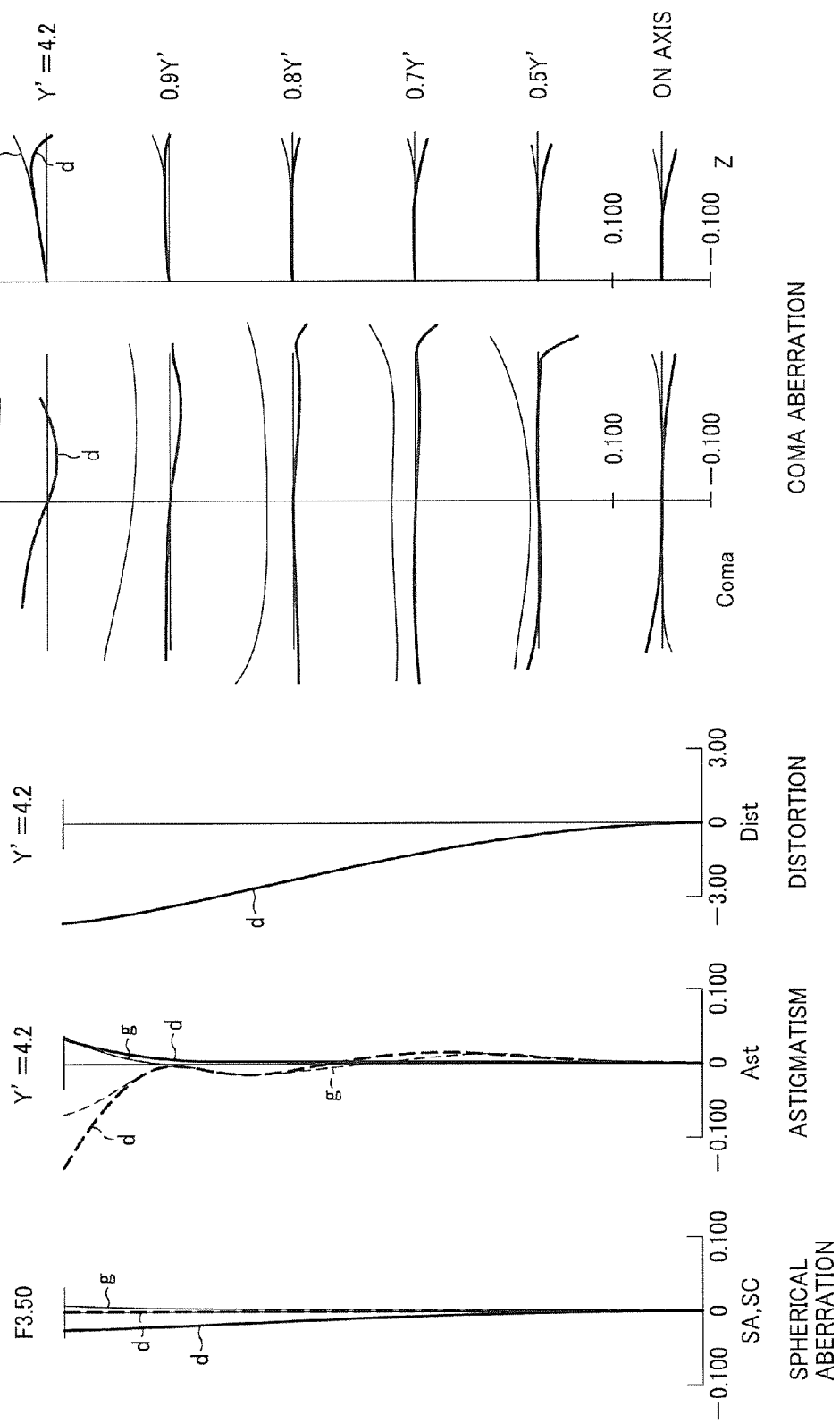
FIG. 22 is a view illustrating an aberration curve of a spherical aberration, astigmatism, distortion and coma aberration of the zoom lens according to Example 6 at a short focus end.
Figure 23:
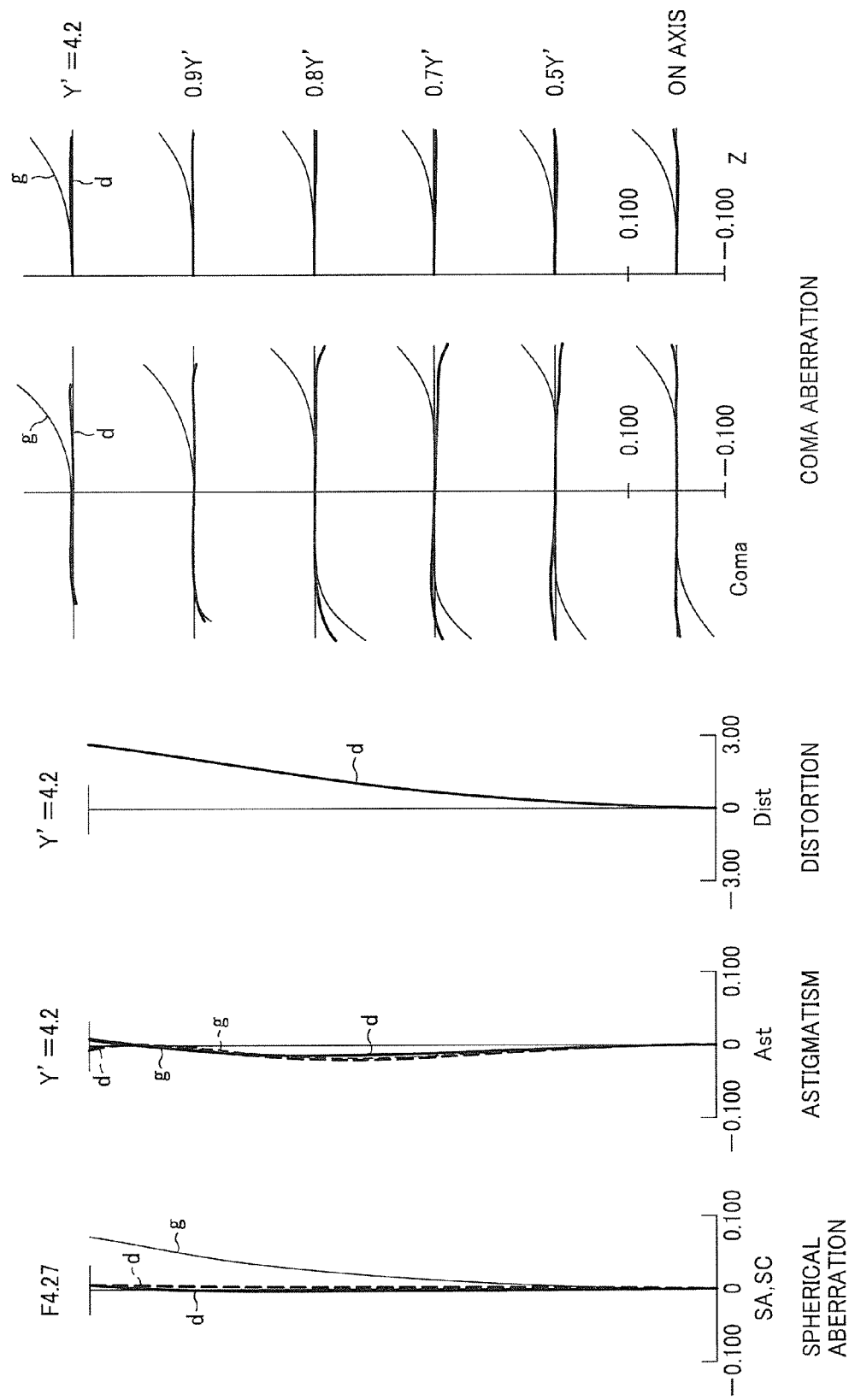
FIG. 23 is a view illustrating an aberration curve of a spherical aberration, astigmatism, distortion and coma aberration of the zoom lens according to Example 6 at an intermediate focal length position.
Figure 24:
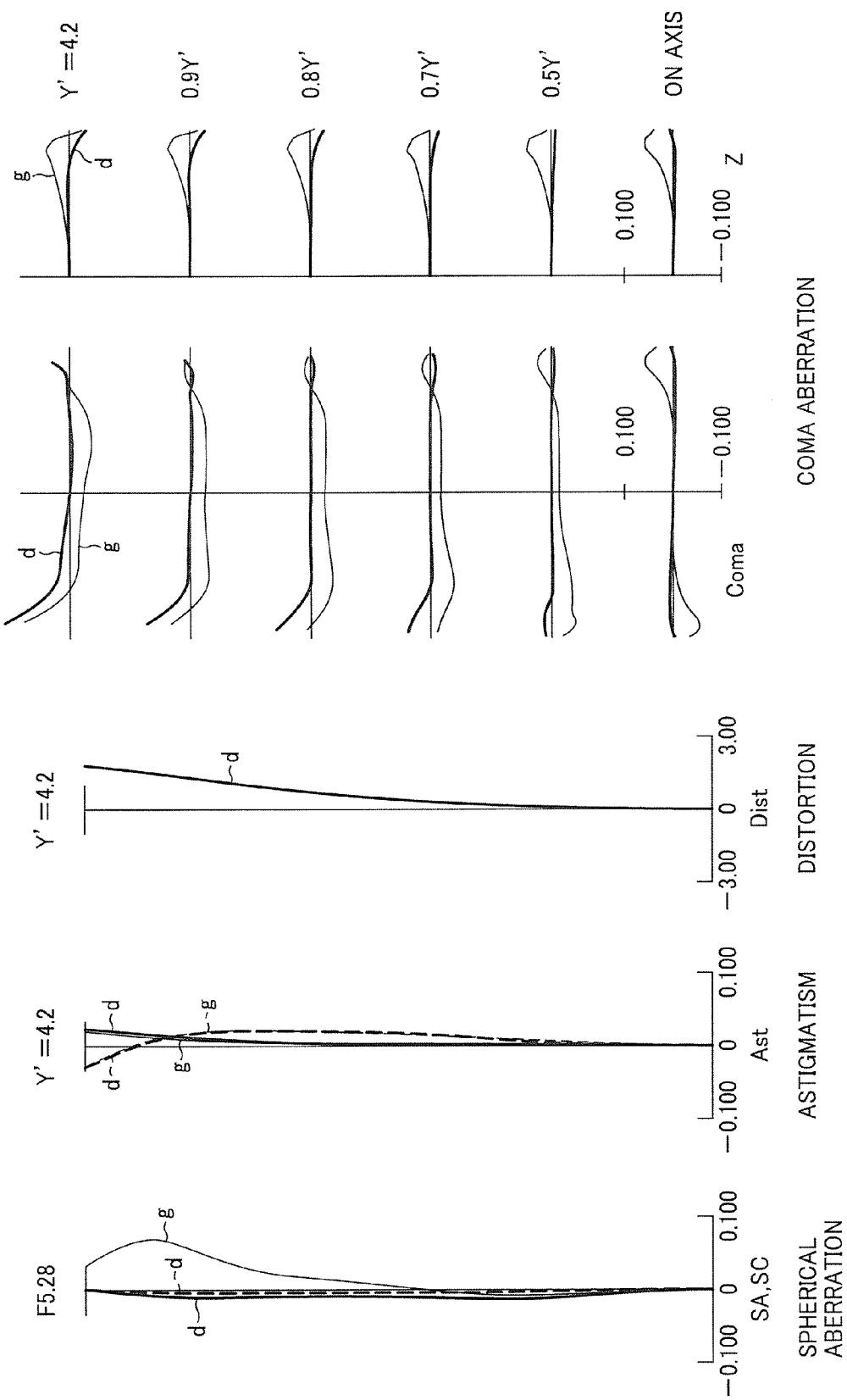
FIG. 24 is a view illustrating an aberration curve of a spherical aberration, astigmatism, distortion and coma aberration of the zoom lens according to Example 6 at a long focus end.

FIGS. 22 to 24 show aberration curves of spherical aberration, astigmatism, distortion, and coma aberration in the zoom lens according to Example 6 shown in FIG. 21. FIG. 22 shows the aberration curve at the wide angle end, FIG. 23 shows the aberration curve at the intermediate focal length position, and FIG. 24 shows the aberration curve at the telephoto end. In the spherical aberration curves, the broken line indicates a sine condition, and in astigmatism curves, the solid line indicates a sagittal image plane, the broken line indicates a meridional image plane.

According to the aberration curves shown in FIGS. 22 to 24, it is found that in the zoom lens of Example 6 shown in FIG. 21, the aberration is sufficiently corrected or controlled.

Due to the above configurations, in the zoom lens having five lens groups of positive-negative-positive-negative-positive lens groups, it is possible to appropriately correct the various aberration and to provide a zoom lens which has a sufficiently small size and high performance while achieving the wide half angle of view of 38 degrees or more and the F-number FNo of 3.5 or less at the short focus end.

Even though the high variable magnification ratio of 10.1 is achieved, the chromatic aberration and the like can be appropriately corrected.

With respect to the third embodiment of the present invention, specific examples of the zoom lens according to the third embodiment will be explained with reference to FIGS. 25, 29, 33, and 37

In the following examples, as shown by Example 7 in FIG. 25, the zoom lens may include an optical element which is disposed at an image side of the sixth lens group G6 and is formed in a parallel plate form. The optical element may be, for example, an optical filter such as an optical low-pass filter, an infrared cut filter or the like, or a cover glass (seal glass) of a light-receiving element such as a CCD sensor, a transparent parallel plate equivalent to the above elements or the like, which is referred as to a parallel plate P.

Example 7

FIG. 25 is a sectional view showing configurations of Example 7 of the third embodiment of the present invention and zooming movement loci in zooming from a wide angle end to a telephoto end through a certain intermediate focal length position.

The zoom lens includes the first lens group G1 having a positive refractive power, the second lens group G2 having a negative refractive power, the third lens group G3 having a positive refractive power, the fourth lens group G4 having a negative refractive power, the fifth lens group G5 having a positive refractive power, and the sixth lens group G6 having a negative refractive power. The zoom lens further includes an aperture stop S between the second lens group and the third lens group.

When changing the magnification of the zoom lens from the wide angle end to the telephoto end, an interval (A) between the first lens group G1 and the second lens group G2 is increased, an interval (B+C) between the second lens group G2 and the third lens group G3 is decreased, an interval (D) between the third lens group G3 and the fourth lens group G4 is increased, an interval (E) between the fourth lens group G4 and the fifth lens group G5 is increased, and an interval (F) between the fifth lens group G5 and the sixth lens group G6 is decreased.

In Example 7, the first lens group G1, the aperture stop S, the fourth lens group G4 and the sixth lens group G6 are not moved in a fixed state in zooming.

The first lens group G1 includes a negative meniscus lens L1 having a convex surface at the object side and an aspheric surface at the image side, a prism PR, and two positive lenses L2, L3 in order from the object side.

The second lens group G2 has a negative lens L4 which has a concave surface at both sides and where the concave surface at the image side is formed as an aspheric surface and a cemented lens in which a negative lens L5 having a concave surface at both sides and a positive lens L6 having a convex surface at both sides are closely attached to each other to form a cemented lens in order from the object side.

The aperture stop S is disposed between the second lens group G2 and the third lens group G3.

The third lens group G3 includes a positive meniscus lens L7 which has an aspheric surface at the object side and where the stronger convex surface than the other is directed to the object, a cemented lens which is formed by a positive lens L8 having a convex surface at both sides and a negative lens L9 having a concave surface at both sides, and a positive lens having L10 having a convex surface at both sides, in order from the object side.

The fourth lens group G4 includes a negative meniscus lens L11 having a convex surface at the object side and an aspheric surface at the image side.

The fifth lens group G5 includes a positive meniscus lens L12 which has a convex surface at both sides and where the convex surface at the object side is formed as an aspheric surface.

The sixth lens group G6 includes a positive meniscus lens L13 having an aspheric surface at the object side and a convex surface at the image side.

As shown by Example 7, the parallel plate P is disposed between the sixth lens group G6 and the imaging surface I. Here, the parallel plate P corresponds to the optical element, for example, an optical filter such as a low-pass filter which is configured to cut a spatial frequency corresponding to an excess of the limit resolution of a solid-state image sensing device such as a CCD or the like disposed at an imaging surface I, or a cover glass which is configured to protect the image sensing device.

In Example 7, with changing the focal length from the wide angle end to the telephoto end, the focal length f of the zoom lens, the F-number FNo, and the half angle of view ω are respectively changed as follows.

Focal length f of the zoom lens: 5.2-35.0 mm

FNo (F-number): 3.41-5.91

Half angle of view ω: 38.9-6.8

The properties of each optical surface are shown in the following table (Table 13).

TABLE 13

| Surface No. | R | D | Nd | vd |
|---|---|---|---|---|
| 1 | 28.71520 | 0.70000 | 1.92286 | 18.90 |
| 2 | 10.60780 | 4.30000 | | |
| 3 | ∞ | 8.00000 | 1.88300 | 40.76 |
| 4 | ∞ | 8.00000 | 1.88300 | 40.76 |
| 5 | ∞ | 0.10000 | | |
| 6 | 71.87173 | 2.64346 | 1.51633 | 64.14 |
| 7 | −16.44232 | 0.10000 | | |
| 8 | 16.69061 | 1.85042 | 1.64000 | 60.08 |
| 9 | 70.74017 | Variable (A) | | |
| 10 | −18.06772 | 0.80000 | 2.00330 | 28.27 |
| 11 | 13.70265 | 1.34310 | | |
| 12 | −8.40441 | 0.80000 | 1.58913 | 61.15 |
| 13 | 35.84699 | 1.37144 | 1.92286 | 18.90 |
| 14 | −14.82566 | Variable (B) | | |
| 15 | ∞ (Aperture stop) | Variable (C) | | |
| 16 | 10.40018 | 2.55979 | 1.71700 | 47.93 |
| 17 | 695.19360 | 4.38175 | | |
| 18 | 10.62658 | 3.03220 | 1.61800 | 63.33 |
| 19 | −8.68306 | 0.80000 | 1.90366 | 31.32 |
| 20 | 7.41539 | 0.47196 | | |
| 21 | 7.95016 | 2.41954 | 1.48749 | 70.24 |
| 22 | −28.32715 | Variable (D) | | |
| 23 | 21.13305 | 0.80000 | 1.92286 | 18.90 |
| 24 | 10.38558 | Variable (E) | | |
| 25 | 20.33524 | 3.00000 | 1.48749 | 70.24 |
| 26 | −11.38514 | Variable (F) | | |
| 27 | −12.24222 | 0.80000 | 1.77250 | 49.60 |
| 28 | −20.52607 | 0.37154 | | |
| 29 | ∞ | 0.30000 | 1.52300 | 58.00 |
| 30 | ∞ | 0.10000 | | |
| 31 | ∞ | 0.50000 | 1.50000 | 64.00 |
| 32 | ∞ | | | |

In Table 13, each of a second surface, an 11th surface, a 16th surface, a 22nd surface, a 24th surface, a 25th surface, and a 27th surface is aspheric and the parameters in the equation (18) for each aspheric surface are as follows.

Aspheric surface; the 2nd surface $K=0.00000E+00$ $A_4=-3.94417E-05$ $A_6=-4.97773E-07$ $A_8=4.02699E-09$ $A_{10}=-5.50352E-11$ Aspheric surface: the 11th surface $K=0.00000E+00$ $A_4=-9.62647E-05$ $A_6=5.51477E-07$ $A_8=-7.04684E-08$ $A_{10}=1.55863E-09$ Aspheric surface: the 16th surface $K=0.00000E+00$ $A_4=-4.74120E-05$ $A_6=1.07836E-07$ $A_8=-5.65417E-09$ $A_{10}=6.42398E-11$ Aspheric surface: the 22nd surface $K=0.00000E+00$ $A_4=1.93283E-04$ $A_6=1.97214E-06$ $A_8=-2.90612E-07$ $A_{10}=5.81603E-00$ Aspheric surface, the 24th surface $K=0.00000E+00$ $A_4=3.10126E-04$ $A_6=3.13472E-06$ $A_8=8.92131E-07$ $A_{10}=-3.31098E-08$ Aspheric surface: the 25th surface $K=0.00000E+00$ $A_4=1.54388E-04$ $A_6=1.44637E-05$ $A_8=4.02382E-08$ $A_{10}=9.54432E-09$ Aspheric surface: the 27th surface $K=0.00000E+00$ $A_4=5.46346E-04$ $A_6=-2.99878E-05$ $A_8=6.59274E-07$ A variable interval A between the first lens group G1 and the second lens group G2, a variable interval B between the second lens group G2 and the aperture stop S, a variable interval C between the aperture stop S and the third lens group G3, a variable interval D between the third lens group G3 and the fourth lens group G4, a variable interval E between the fourth lens group G4 and the fifth lens group G5, a variable interval F between the fifth lens group G5 and the sixth lens group G6 are changed in zooming as shown in the following table (Table 14).

TABLE 14

|   | Wide-angle end | Intermediate focal length position | Telephoto end |
|---|---|---|---|
| A | 1.174 | 6.241 | 10.769 |
| B | 10.164 | 5.098 | 0.569 |
| C | 12.128 | 6.705 | 0.500 |
| D | 2.688 | 8.111 | 14.316 |
| E | 2.410 | 5.032 | 5.150 |
| F | 3.228 | 0.606 | 0.488 |

The values of the parameters according to the conditions (12) to (17) in Example 7 are as follows.

(Values Corresponding to Conditions)

fw=5.2 fT=35

Y'=4.2

Lr1=13

Lr2=69

Lg1=25.7 fL1=−18.57

T=82

Tap=41.3

Condition (12); fw/Y'=1.24

Condition (13): Lr1/Lr2=0.19

Condition (14): Lg1/fw=4.94

Condition (15): Lr2/ft=1.97

Condition (16): |fL1/fw|=3.57

Condition (17): Tap/T=0.5

Accordingly, the numerical values according to the above-described conditions (12) and (17) shown in FIG. 25 as Example 7 are within the conditions.

Figure 26:
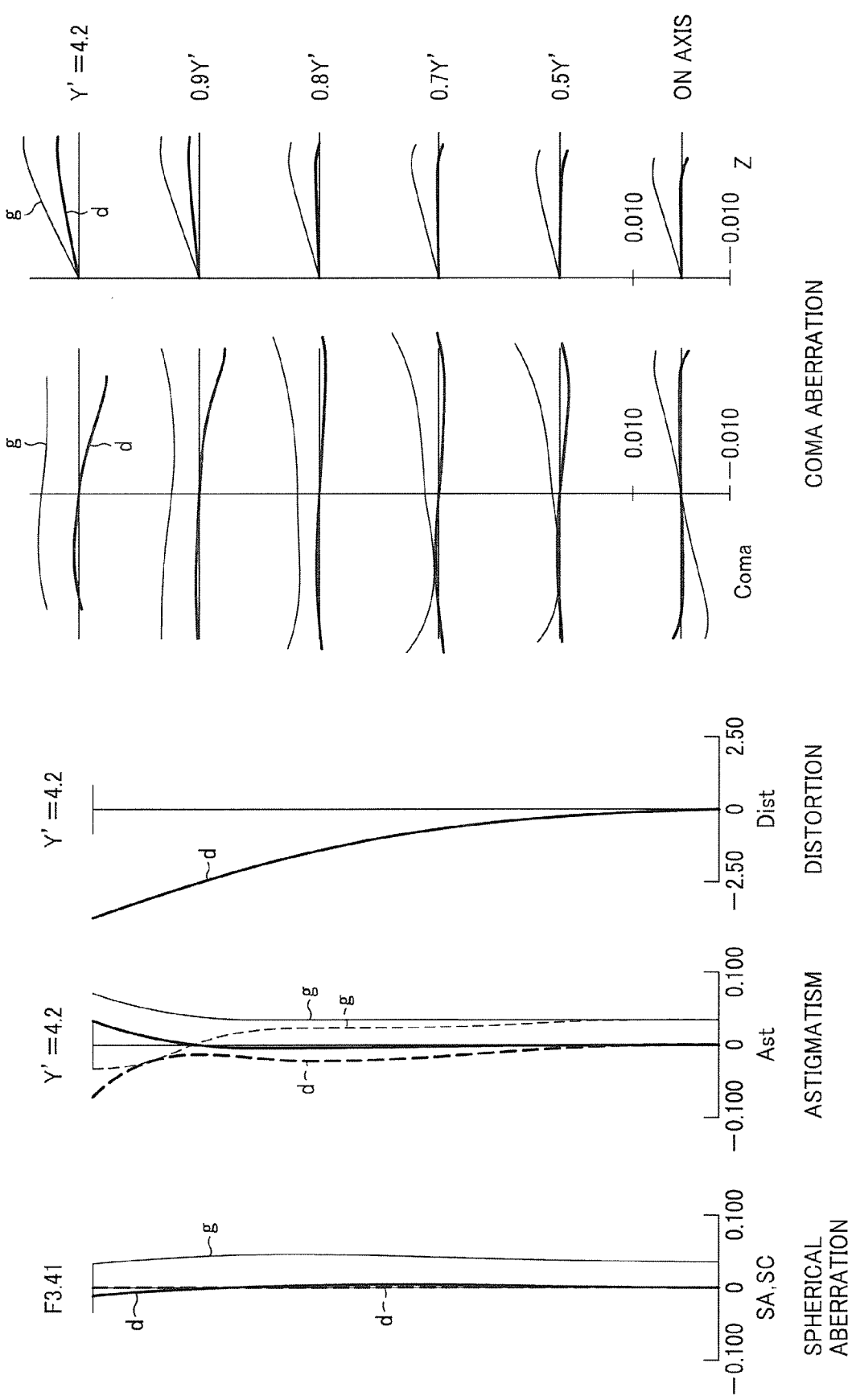
FIG. 26 is a view illustrating an aberration curve of a spherical aberration, astigmatism, distortion and coma aberration of the zoom lens according to Example 7 at a short focus end.
Figure 27:
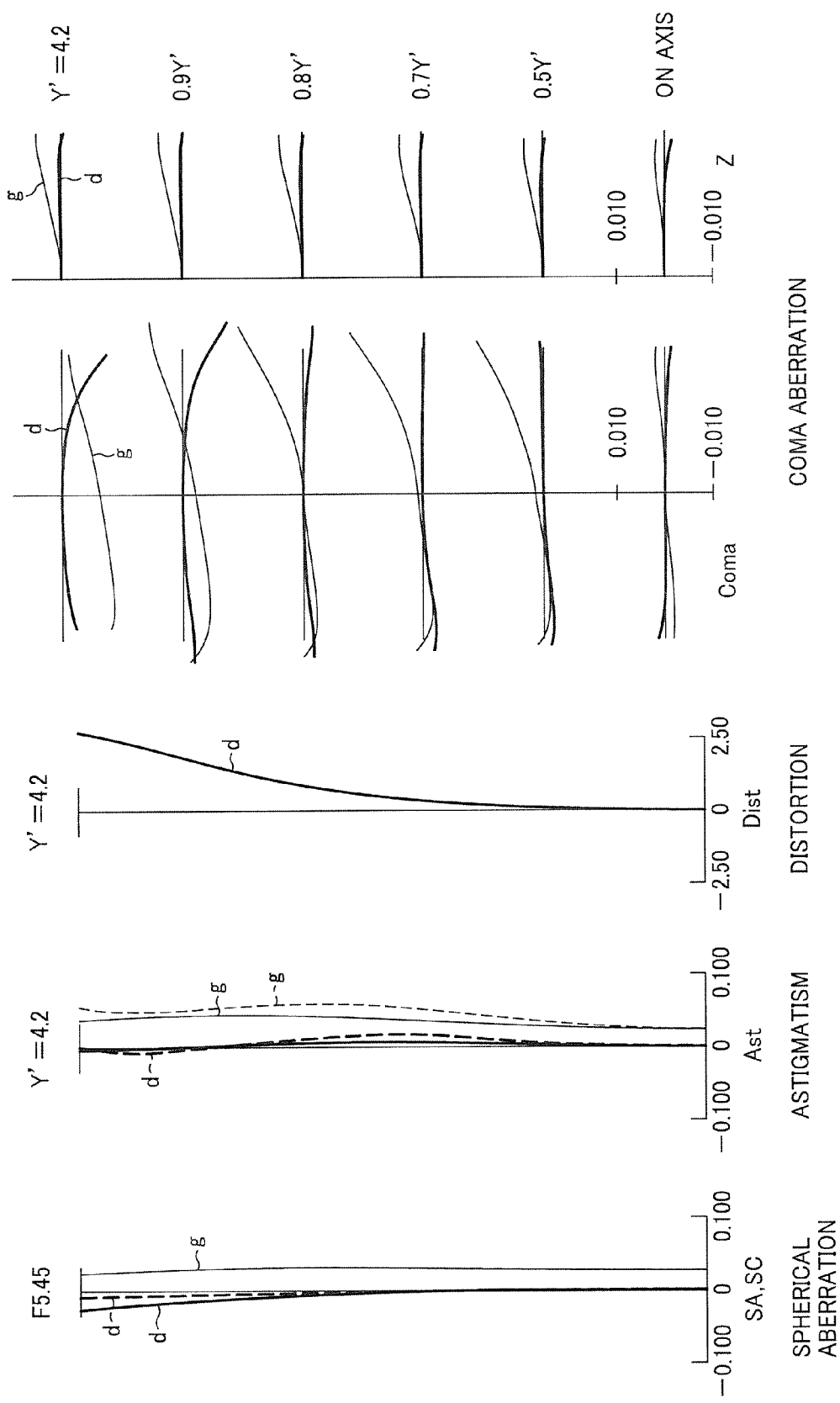
FIG. 27 is a view illustrating an aberration curve of a spherical aberration, astigmatism, distortion and coma aberration of the zoom lens according to Example 7 at an intermediate focal length position.
Figure 28:
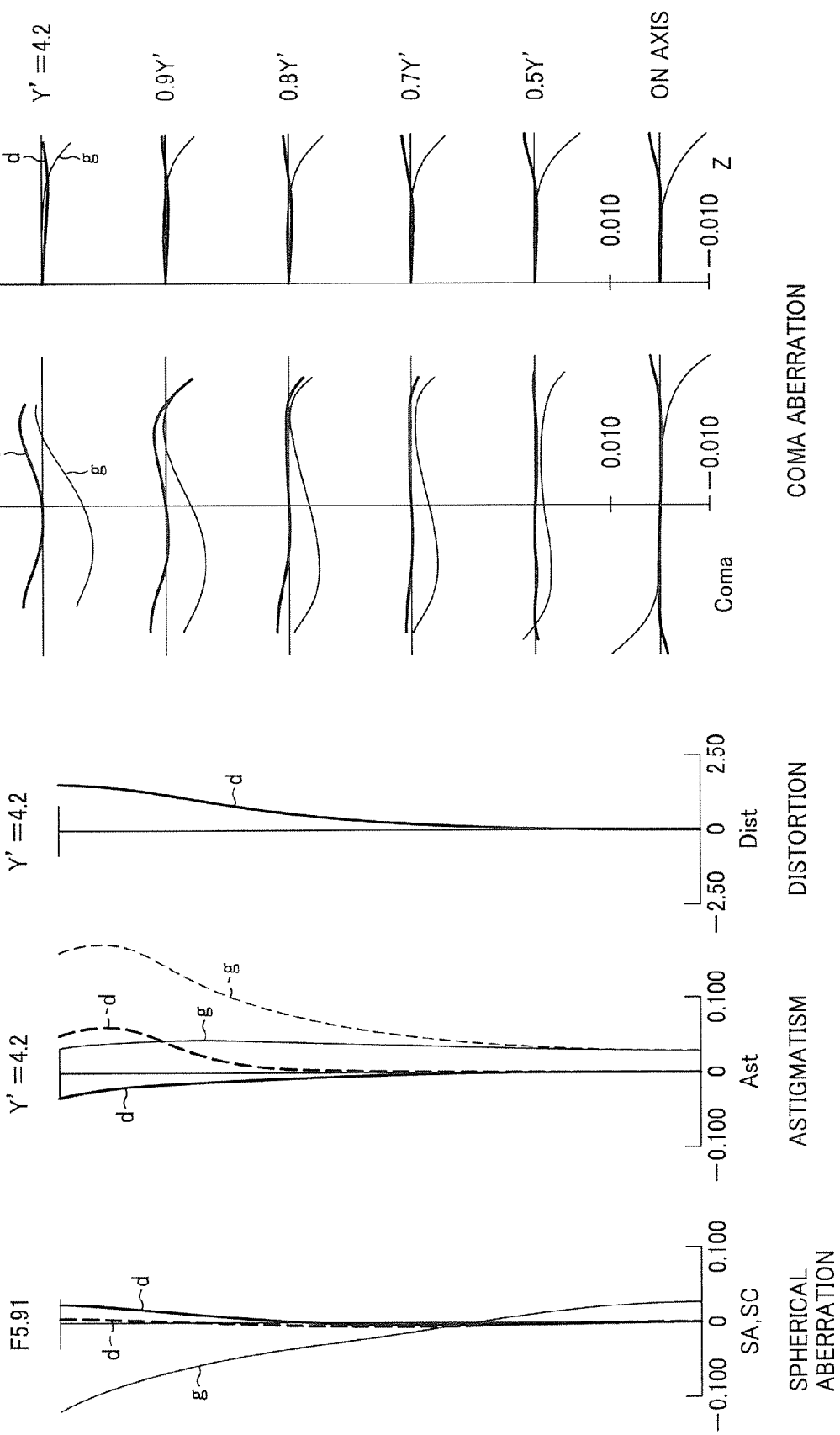
FIG. 28 is a view illustrating an aberration curve of a spherical aberration, astigmatism, distortion and coma aberration of the zoom lens according to Example 7 at a long focus end.

FIGS. 26 to 28 show aberration curves of spherical aberration, astigmatism, distortion, and coma aberration in the zoom lens according to Example 7 shown in FIG. 25. FIG. 26 shows the aberration curve at the wide angle end, FIG. 27 shows the aberration curve at the intermediate focal length position, and FIG. 28 shows the aberration curve at the telephoto end. In the spherical aberration curves, the broken line indicates a sine condition, and in astigmatism curves, the solid line indicates a sagittal image plane, the broken line indicates a meridional image plane.

According to the aberration curves shown in FIGS. 26 to 28, it is found that in the zoom lens of Example 7 shown in FIG. 25, the aberration is sufficiently corrected or controlled.

Due to the above configurations, in the zoom lens having six lens groups of positive-negative-positive-negative positive-negative lens groups, it is possible to appropriately correct the various aberration and to provide the zoom lens, which has a sufficient small size and high performance while achieving the wide half angle of view of 38 degrees or more and the F-number FNo of 3.6 or less at the short focus end.

According to Example 7, the zoom lens can be appropriately applied to a digital camera having a small size body and high performance and therefore a zoom lens having wide half angle of view of 38 degrees or more, high variable magnification ratio of 5 or more and high performance corresponding to high resolution for an image pickup device having $5\times10^6$ to $10^7$ pixels can be provided.

Example 8

Next, the zoom lens according to Example 8 will be explained with reference to FIG. 29.

Figure 29:
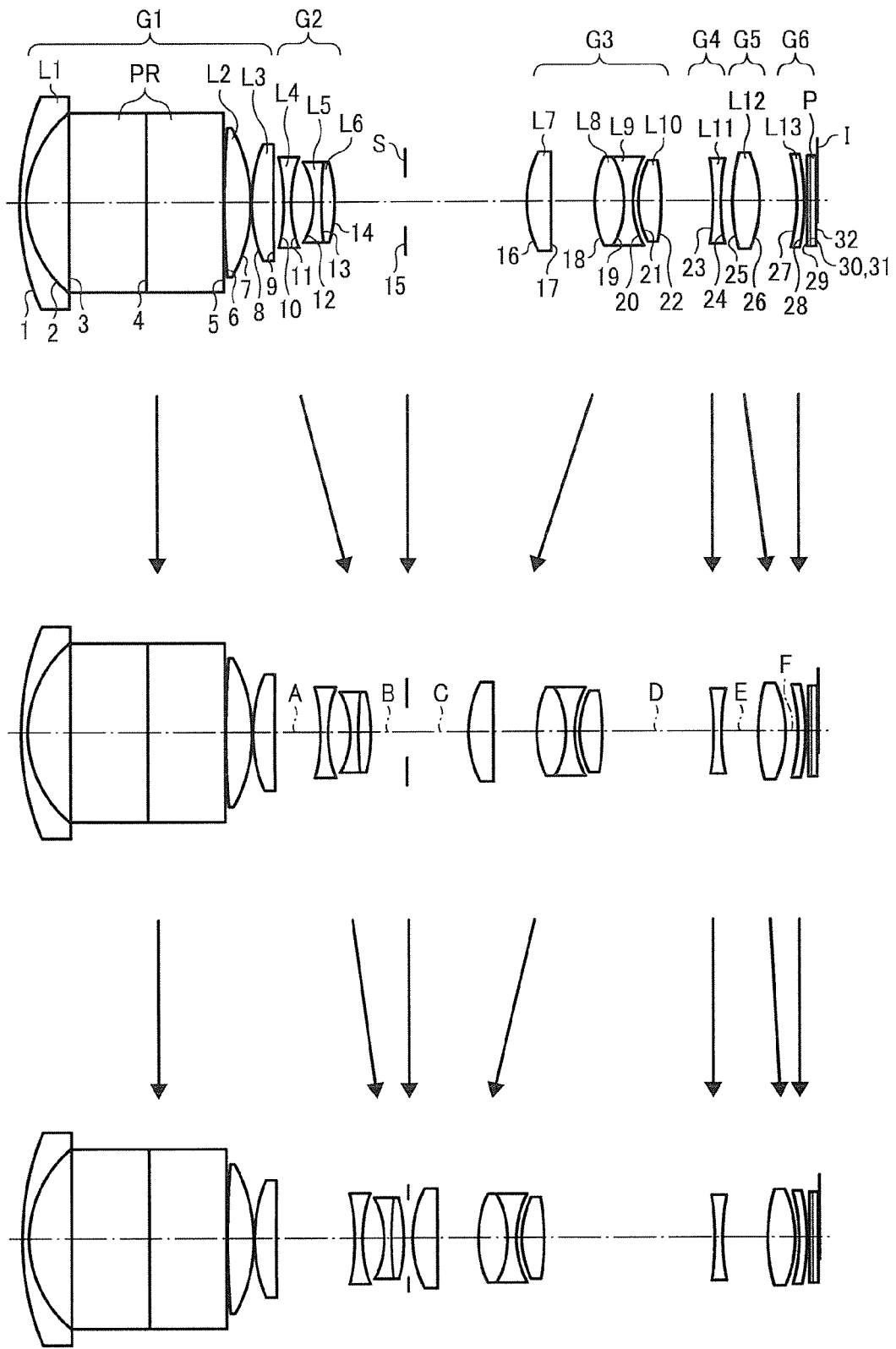
FIG. 29 is a sectional view schematically illustrating configurations of an optical system in a zoom lens according to Example 8 of the present invention.

FIG. 29 is a sectional view showing configurations of Example 8 of the third embodiment of the present invention and zooming movement loci in zooming from a wide angle end to a telephoto end through a certain intermediate focal length position.

The zoom lens includes the first lens group G1 having a positive refractive power, the second lens group G2 having a negative refractive power, the third lens group G3 having a positive refractive power, the fourth lens group G4 having a negative refractive power, the fifth lens group G5 having a positive refractive power, and the sixth lens group G6. The zoom lens further includes an aperture stop S between the second lens group.

When changing the magnification of the zoom lens from the wide angle end to the telephoto end, an interval (A) between the first lens group G1 and the second lens group G2 is increased, an interval (B+C) between the second lens group G2 and the third lens group G3 is decreased, an interval (D) between the third lens group G3 and the fourth lens group G4 is increased, an interval (E) between the fourth lens group G4 and the fifth lens group G5 is increased, and an interval (F) between the fifth lens group G5 and the sixth lens group G6 is decreased.

In Example 8, the first lens group G1, the aperture stop S, the fourth lens group G4 and the sixth lens group G6 are not moved in a fixed state in zooming.

The first lens group G1 includes a negative meniscus lens L1 having a convex surface at the object side and an aspheric surface at the image side, a prism PR, and two positive lenses L2, L3 in order from the object side.

The second lens group G2 has a negative lens L4 which has a concave surface at both sides and where the concave surface at the image side is formed as an aspheric surface and a cemented lens in which a negative lens L5 having a concave surface at both sides and a positive lens L6 having a convex surface at both sides are closely attached to each other to form a cemented lens in order from the object side.

The aperture stop S is disposed between the second lens group G2 and the third lens group G3.

The third lens group G3 includes a positive meniscus lens L7 which has a convex surface at both sides and where the stronger convex surface than the other is directed to the object side and is formed as an aspheric surface, a cemented lens which is formed by a positive lens L8 having a convex surface at both sides and a negative lens L9 having a concave surface at both sides, and a positive lens L10 having a convex surface at both sides, in order from the object side.

The fourth lens group G4 includes a negative meniscus lens L11 which has concave surfaces at the object side and the concave surface at the image side is formed as an aspheric surface.

The fifth lens group G5 includes a positive lens L12 which has a convex surface at both sides and where the convex surface at the object side is formed as an aspheric surface.

The sixth lens group G6 includes a negative meniscus lens L13 having an aspheric surface at the object side and a convex surface at the image side.

As shown by Example 8, the parallel plate P is disposed between the sixth lens group G6 and the imaging surface I. Here, the parallel plate P corresponds to the optical element, for example, an optical filter such as a low-pass filter which is configured to out a spatial frequency corresponding to excess of limit resolution of a solid-state image sensing device such as a COD or the like disposed at an imaging surface I, or a cover glass which is configured to protect the image sensing device.

In Example 8, with changing the focal length from the wide angle end to the telephoto end, the focal length f of the zoom lens, the F-number FNo, and the half angle of view ω are respectively changed as follows.

Focal length f of the zoom lens: 5.23-35.0 mm

FNo (F-number): 3.33-5.99

Half angle of view ω: 38.9-6.8

The properties of each optical surface are shown in the following table (Table 15).

TABLE 15

| Surface No. | R | D | Nd | vd |
|---|---|---|---|---|
| 1 | 24.29547 | 0.70000 | 1.92286 | 18.90 |
| 2 | 9.75657 | 4.29950 | | |
| 3 | ∞ | 8.00000 | 1.88300 | 40.76 |
| 4 | ∞ | 8.00000 | 1.88300 | 40.76 |
| 5 | ∞ | 0.10000 | | |
| 6 | 200.55230 | 2.42139 | 1.51633 | 64.14 |
| 7 | −14.69376 | 0.10000 | | |
| 8 | 15.42392 | 2.12568 | 1.64000 | 60.08 |
| 9 | 496.30189 | Variable (A) | | |
| 10 | −20.83647 | 0.80000 | 2.00330 | 28.27 |
| 11 | 11.05282 | 2.25137 | | |
| 12 | −7.66956 | 0.80022 | 1.58913 | 61.15 |
| 13 | 41.04884 | 1.22166 | 1.92286 | 18.90 |
| 14 | −14.90628 | Variable (B) | | |
| 15 | ∞ (Aperture stop) | Variable (C) | | |
| 16 | 10.68546 | 2.66245 | 1.71700 | 47.93 |
| 17 | −926.63252 | 4.14070 | | |
| 18 | 11.96583 | 3.20000 | 1.61800 | 63.33 |
| 19 | −8.48903 | 0.80000 | 1.90366 | 31.32 |
| 20 | 8.29429 | 0.42399 | | |
| 21 | 8.50827 | 2.57944 | 1.48749 | 70.24 |
| 22 | −22.42544 | Variable (D) | | |
| 23 | −32.79524 | 0.80000 | 1.92286 | 18.90 |
| 24 | 36.06477 | Variable (E) | | |
| 25 | 20.95609 | 3.00000 | 1.48749 | 70.24 |
| 26 | −10.32363 | Variable (F) | | |
| 27 | −14.44984 | 0.80000 | 1.77250 | 49.60 |
| 28 | −22.23806 | 0.11068 | | |
| 29 | ∞ | 0.30000 | 1.52300 | 58.00 |
| 30 | ∞ | 0.10000 | | |
| 31 | ∞ | 0.50000 | 1.50000 | 64.00 |
| 32 | ∞ | | | |

In Table 15, each of a second surface, an 11th surface, a 16th surface, a 22nd surface, a 24th surface, a 25th surface, and a 27th surface is aspheric and the parameters in the equation (18) for each aspheric surface are as follows.

Aspheric surface: the 2nd surface $K=0.00000E+00$ $A_4=-2.35463E-05$ $A_6=7.98971E-07$ $A_8=8.43797E-09$ $A_{10}=-1.02004E-10$ Aspheric surface: the 11th surface $K=0.00000E+00$ $A_4=-1.22211E-04$ $A_6=-6.95451E-08$ $A_8=2.75080E-05$ $A_{10}=-7.03527E-10$ Aspheric surface: the 16th surface $K=0.00000E+00$ $A_4=4.53961E-06$ $A_6=1.71251E-07$ $A_8=-4.14722E-09$ $A_{10}=4.77677E-11$ Aspheric surface: the 22nd surface

K=0.00000E+00

$A_4$=2.10011E−04

$A_6$=2.54274E−06

$A_8$=1.70205E−07

$A_{10}$=2.68822E−09

Aspheric surface: the 24th surface

K=0.00000E+00

$A_4$=3.15812E−04

$A_6$=2.37810E−06

$A_8$=6.93382E−07

$A_{10}$=−2.86333E−08

Aspheric surface: the 25th surface

K=0.00000E+00

$A_4$=1.47734E−04

$A_6$=1.57338E−05

$A_8$=−1.57764E−07

$A_{10}$=−8.67412E−09

Aspheric surface: the 27th surface

K=0.00000E+00

$A_4$=3.25997E−04

$A_6$=5.01278E−05

$A_8$=1.45864E−06

A variable interval A between the first lens group G1 and the second lens group G2, a variable interval B between the second lens group G2 and the aperture stop S, a variable interval C between the aperture stop S and the third lens group G3, a variable interval D between the third lens group G3 and the fourth lens group G4, a variable interval E between the fourth lens group G4 and the fifth lens group G5, a variable interval F between the fifth lens group G5 and the sixth lens group G6 are changed in zooming as shown in the following table (Table 16).

TABLE 16

|   | Wide-angle end | Intermediate focal length position | Telephoto end |
| --- | --- | --- | --- |
| A | 0.968 | 4.567 | 8.035 |
| B | 7.573 | 3.973 | 0.506 |
| C | 12.508 | 6.489 | 0.500 |
| D | 5.119 | 11.138 | 17.127 |
| E | 1.000 | 3.848 | 4.653 |
| F | 3.982 | 1.133 | 0.329 |

The values of the parameters according to the conditions (12) to (17) in Example 8 are as follows.

(Values Corresponding to Conditions)

fw=5.2 fT=35

Y'=4.2

Lr1=13

Lr2=68.5

Lg1=25.75 fL1=−18.08

Condition (12): fw/Y'=1.24

Condition (13): Lr1/Lr2=0.19

Condition (14): Lg1/fw=4.95

Condition (15): Lr2/ft=1.96

Condition (16): fL1/fw=3.48

Condition (17): Tap/T=0.48

Accordingly, the numerical values according to the above-described conditions (12) and (17) shown in FIG. 25 as Example 8 are within the conditions.

Figure 30:
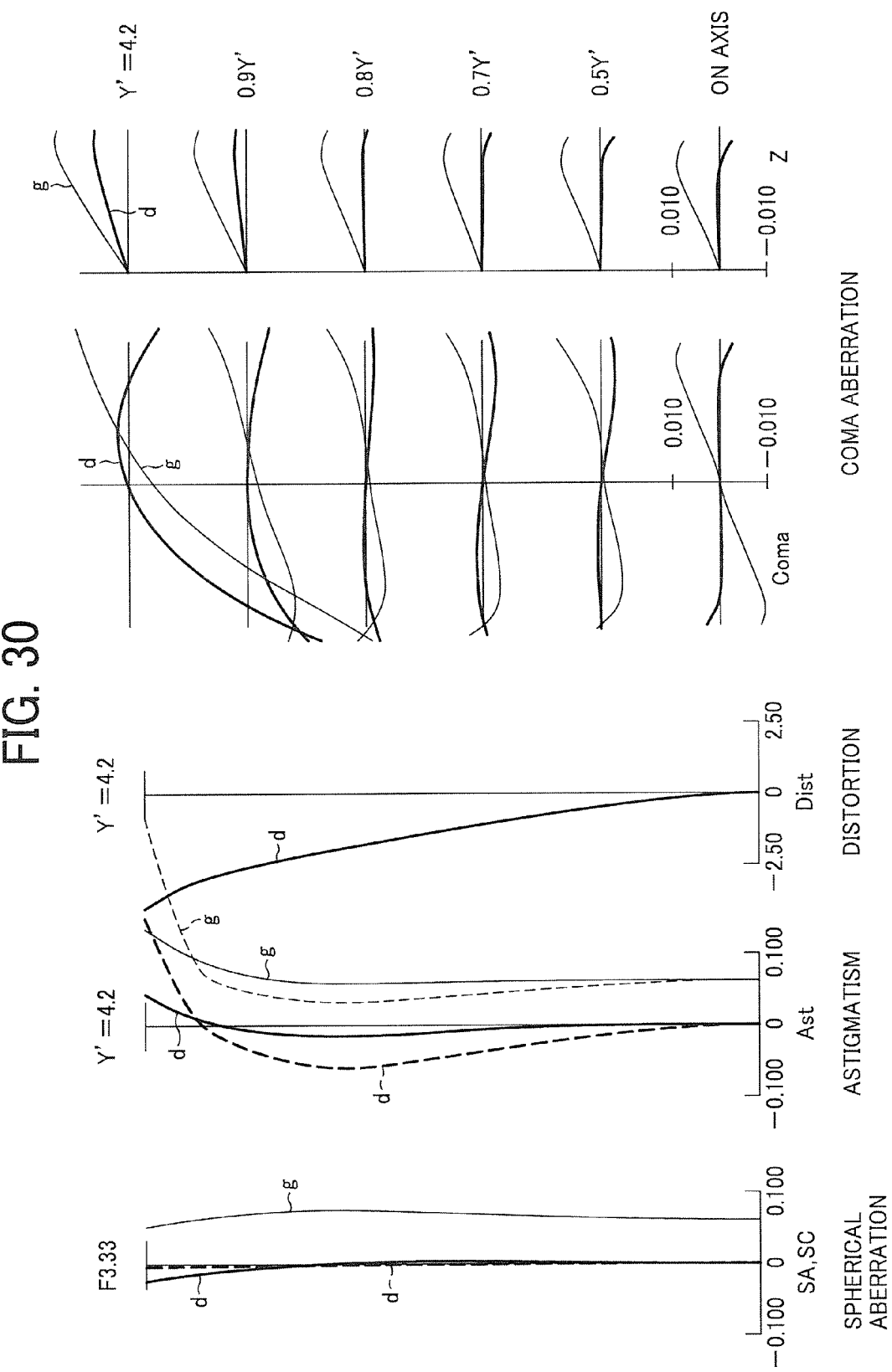
FIG. 30 is a view illustrating an aberration curve of a spherical aberration, astigmatism, distortion and coma aberration of the zoom lens according to Example 8 at a short focus end.
Figure 31:
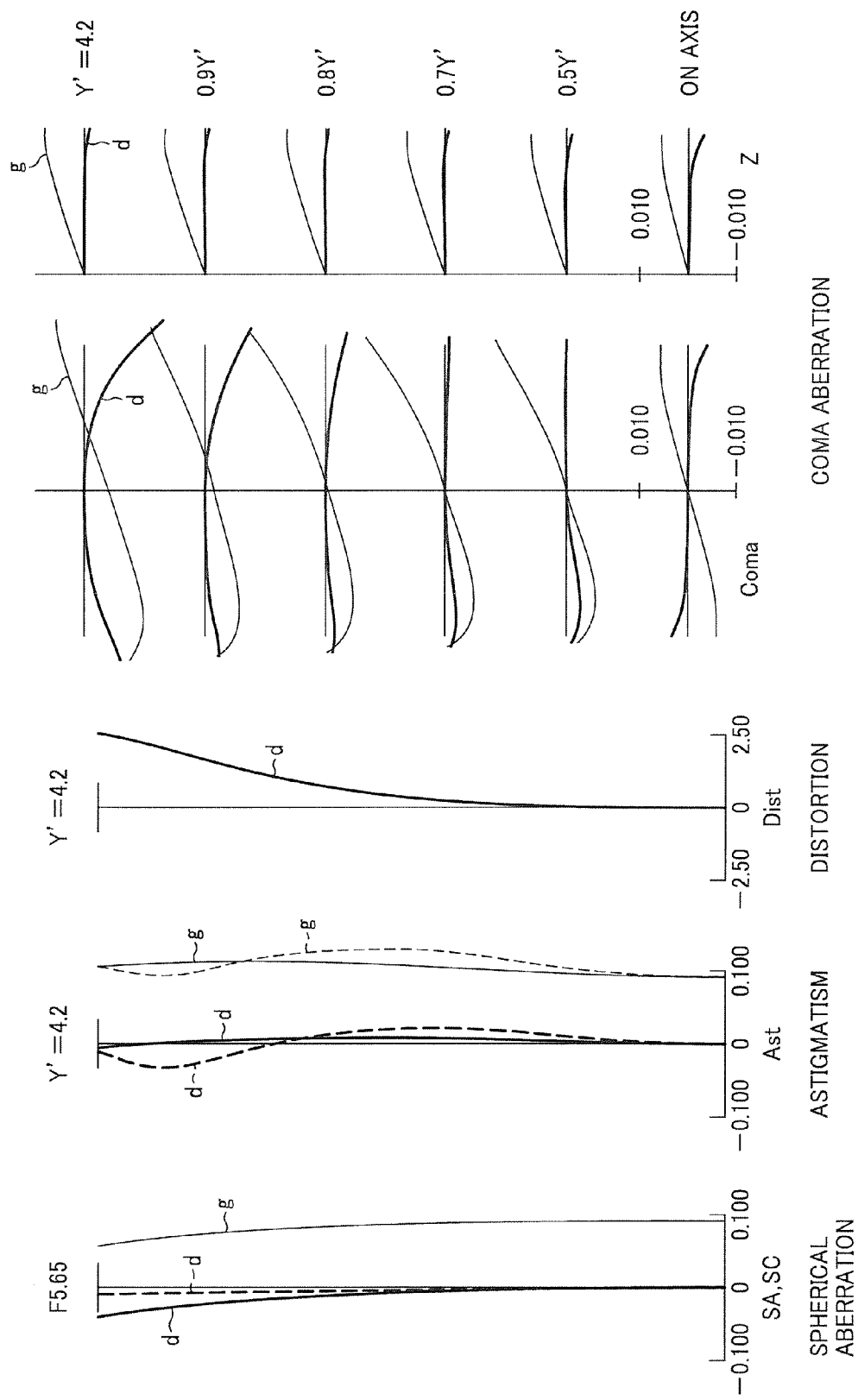
FIG. 31 is a view illustrating an aberration curve of a spherical aberration, astigmatism, distortion and coma aberration of the zoom lens according to Example 8 at an intermediate focal length position.
Figure 32:
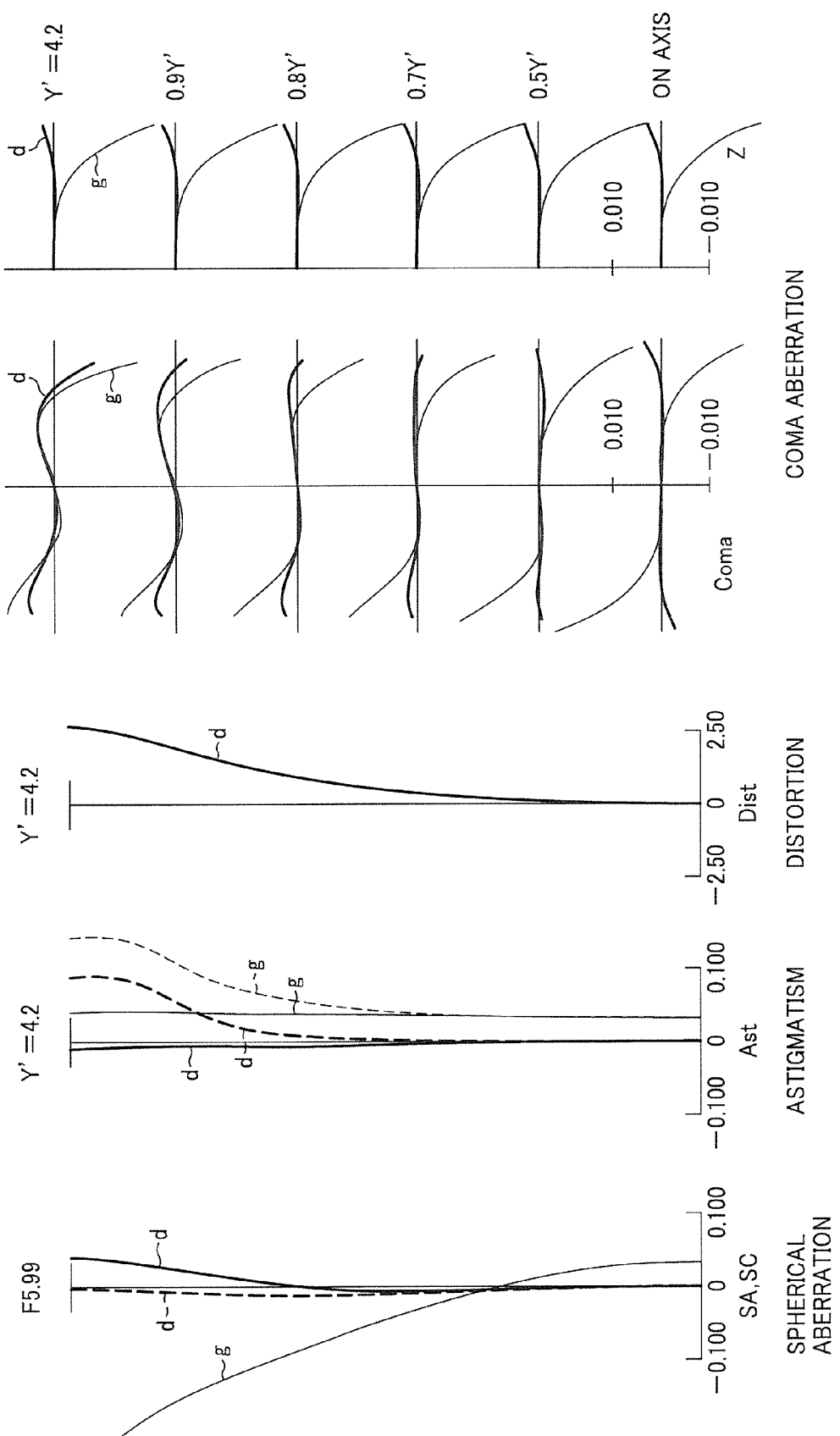
FIG. 32 is a view illustrating an aberration curve of a spherical aberration, astigmatism, distortion and coma aberration of the zoom lens according to Example 8 at a long focus end.

FIGS. 30 to 32 show aberration curves of spherical aberration, astigmatism, distortion, and coma aberration in the zoom lens according to Example 8 shown in FIG. 29. FIG. 30 shows the aberration curve at the wide angle end, FIG. 31 shows the aberration curve at the intermediate focal length position, and FIG. 32 shows the aberration curve at the telephoto end. In the spherical aberration curves, the broken line indicates a sine condition, and in astigmatism curves, the solid line indicates a sagittal image plane, the broken line indicates a meridional image plane.

According to the aberration curves shown in FIGS. 30 to 32, it is found that in the zoom lens of Example 8 shown in FIG. 29, the aberration is sufficiently corrected or controlled.

Due to the above configurations, in the zoom lens having six lens groups of positive-negative-positive negative-positive-negative lens groups, it is possible to appropriately correct the various aberration and to provide the zoom lens, which has a sufficient small size and high performance while achieving the wide half angle of view of 38 degrees or more and the F-number FNo of 3.5 or less at the short focus end.

According to above Example 8, the zoom lens can be appropriately applied to a digital camera having a small size body and high performance and therefore a zoom lens having a wide half angle of view of 88 degrees or more, high variable magnification ratio of 5 or more and high performance corresponding to high resolution for an image pickup device having $5\times10^6$ to $10^7$ pixels can be provided.

Example 9

Next, the zoom lens according to Example 9 will be explained with reference to FIG. 33.

Figure 33:
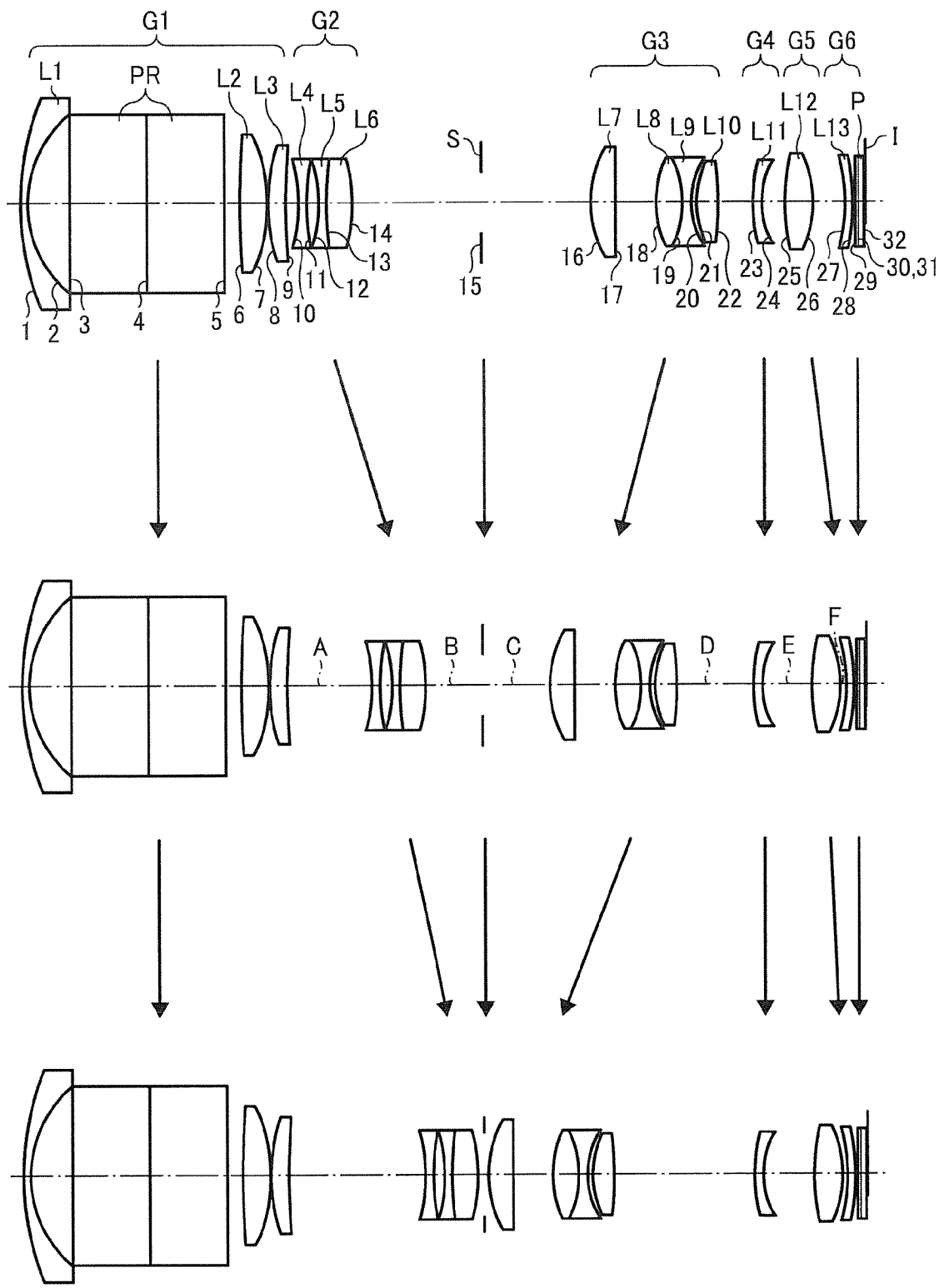
FIG. 33 is a sectional view schematically illustrating configurations of an optical system in a zoom lens according to Example 9 of the present invention.

FIG. 33 is a sectional view showing configurations of Example 9 of the third embodiment of the present invention and zooming movement loci in zooming from a wide angle end to a telephoto end through a certain intermediate focal length position.

The zoom lens includes the first lens group G1 having a positive refractive power, the second lens group G2 having a negative refractive power, the third lens group G3 having a positive refractive power, the fourth lens group G4 having a negative refractive power, the fifth lens group G5 having a positive refractive power, and the sixth lens group G6 having a negative refractive power. The zoom lens further includes an aperture stop between the second lens group and the third lens group.

When changing the magnification of the zoom lens from the wide angle end to the telephoto end, an interval (A) between the first lens group G1 and the second lens group G2 is increased, an interval (B+C) between the second lens group G2 and the third lens group G3 is decreased, an interval (D) between the third lens group G3 and the fourth lens group G4 is increased, an interval (E) between the fourth lens group G4 and the fifth lens group G5 is increased, and an interval (F) between the fifth lens group G5 and the sixth lens group G6 is decreased.

In Example 9, the first lens group G1, the aperture stop S, the fourth lens group G4 and the sixth lens group G6 are not moved in a fixed state in zooming.

The first lens group G1 includes a negative meniscus lens L1 having a convex surface at the object side and an aspheric surface at the image side, a prism PR, and two positive lenses L2, L3 in order from the object side.

The second lens group G2 has a negative lens L4 which has a concave surface at both sides and where the concave surface at the image side is formed as an aspheric surface and a cemented lens in which a negative lens L5 having a concave surface at both sides and a positive lens L6 having a convex surface at both sides are closely attached to each other to form a cemented lens in order from the object side.

The aperture stop S is disposed between the second lens group G2 and the third lens group G3.

The third lens group G3 includes a positive meniscus lens L7 which has a convex surface at both sides and where the stronger convex surface than the other is directed toward the object side and is formed as an aspheric surface, a cemented lens which is formed by a positive lens L8 having a convex surface at both sides and a negative lens L9 having a concave surface at both sides, and a positive lens having L10 having a convex surface at both sides, in order from the object side.

The fourth lens group G4 includes a negative meniscus lens L11 which has a convex surface at the object side and an aspheric surface at the image side.

The fifth lens group G5 includes a positive lens L12 which has a convex surface at both sides and where the convex surface at the object side is formed as an aspheric surface.

The sixth lens group G6 includes a negative meniscus lens L13 having an aspheric surface at the object side and a convex surface at the image side.

As shown by Example 9, the parallel plate P is disposed between the sixth lens group G6 and the imaging surface I. Here, the parallel plate P corresponds to the optical element, for example, an optical filter such as a low-pass filter which is configured to cut a spatial frequency corresponding to excess of limit resolution of a solid-state image sensing device such as a CCD or the like disposed at an imaging surface I, or a cover glass which is configured to protect the image sensing device.

In Example 9, with changing the focal length from the wide angle end to the telephoto end, the focal length f of the zoom lens, the F-number FNo, and the half angle of view ω are respectively changed as follows.

Focal length f of the zoom lens: 5.2-35.0 mm

FNo (F-number): 3.39-5.80

Half angle of view ω: 38.9-6.8

The properties of each optical surface are shown in the following table (Table 17).

TABLE 17

| Surface No. | R | D | Nd | νd |
|---|---|---|---|---|
| 1 | 32.03396 | 0.69892 | 1.92286 | 18.90 |
| 2 | 10.76472 | 4.30259 | | |
| 3 | ∞ | 8.00000 | 1.88300 | 40.76 |
| 4 | ∞ | 8.00000 | 1.88300 | 40.76 |
| 5 | ∞ | 1.75841 | | |

TABLE 17-continued

| Surface No. | R | D | Nd | νd |
|---|---|---|---|---|
| 6 | 115.94523 | 2.93171 | 1.51633 | 64.14 |
| 7 | −16.97664 | 0.09982 | | |
| 8 | 18.09178 | 1.82222 | 1.64000 | 60.08 |
| 9 | 47.88622 | Variable (A) | | |
| 10 | −18.80287 | 0.80040 | 2.00330 | 28.27 |
| 11 | 17.51536 | 1.31481 | | |
| 12 | −10.84426 | 0.80000 | 1.58913 | 61.15 |
| 13 | 30.97094 | 2.75616 | 1.92286 | 18.90 |
| 14 | −19.18998 | Variable (B) | | |
| 15 | ∞ (Aperture stop) | Variable (C) | | |
| 16 | 10.41903 | 2.52085 | 1.71700 | 47.93 |
| 17 | 464.64637 | 4.42532 | | |
| 18 | 9.76213 | 2.75103 | 1.61800 | 63.33 |
| 19 | −9.30396 | 0.80000 | 1.90366 | 31.32 |
| 20 | 6.70577 | 0.55354 | | |
| 21 | 7.65800 | 2.14226 | 1.48749 | 70.24 |
| 22 | −40.70216 | Variable (D) | | |
| 23 | 20.37002 | 0.79978 | 1.92286 | 18.90 |
| 24 | 9.00942 | Variable (E) | | |
| 25 | 30.29651 | 2.99986 | 1.48749 | 70.24 |
| 26 | −9.79500 | Variable (F) | | |
| 27 | −12.24779 | 0.80451 | 1.77250 | 49.60 |
| 28 | −16.18715 | 0.10004 | | |
| 29 | ∞ | 0.30000 | 1.52300 | 58.00 |
| 30 | ∞ | 0.10000 | | |
| 31 | ∞ | 0.50000 | 1.50000 | 64.00 |
| 32 | ∞ | | | |

In Table 17, each of a second surface, an 11th surface, a 16th surface, a 22nd surface, a 24th surface, a 25th surface, and a 27th surface is aspheric and the parameters in the equation (18) for each aspheric surface are as follows.

Aspheric surface: the 2nd surface $K=0.00000E+00$ $A_4=-4.00372E-05$ $A_6=5.29555E-07$ $A_8=5.09620E-09$ $A_{10}=-6.84250E-11$ Aspheric surface: the 11th surface $K=0.00000E+00$ $A_4=-4.18732E-05$ $A_6=8.80211E-07$ $A_8=-8.86591E-08$ $A_{10}=2.43942E-09$ Aspheric surface: the 16th surface $K=0.00000E+00$ $A_4=-4.08532E-05$ $A_6=5.83588E-08$ $A_8=-6.04882E-09$ $A_{10}=6.61854E-11$ Aspheric surface: the 22nd surface $K=0.00000E+00$ $A_4=1.02687E-04$ $A_6=-5.99383E-07$ $A_8 = -3.0147E-07$ $A_{10} = 4.04148E-09$ Aspheric surface: the 24th surface $K = 0.00000E+00$ $A_4 = 3.91184E-04$ $A_6 = 6.74675E-06$ $A_8 = 1.26729E-06$ $A_{10} = -5.59803E-08$ Aspheric surface: the 25th surface $K = 0.00000E+00$ $A_4 = 1.84460E-04$ $A_6 = 1.50591E-05$ $A_8 = 2.64295E-07$ $A_{10} = -1.77378E-08$ Aspheric surface: the 27th surface $K = 0.00000E+00$ $A_4 = 7.14836E-04$ $A_6 = -5.38187E-05$ $A_8 = 1.24153E-06$ A variable interval A between the first lens group G1 and the second lens group G2, a variable interval B between the second lens group G2 and the aperture stop S, a variable interval C between the aperture stop S and the third lens group G3, a variable interval D between the third lens group G3 and the fourth lens group G4, a variable interval E between the fourth lens group G4 and the fifth lens group G5, a variable interval F between the fifth lens group G5 and the sixth lens group G6 are changed in zooming as shown in the following table (Table 18).

TABLE 18

|   | Wide-angle end | Intermediate focal length position | Telephoto end |
|---|---|---|---|
| A | 1.30888 | 8.95756 | 14.52007 |
| B | 13.77021 | 6.12143 | 0.55838 |
| C | 11.76575 | 7.50884 | 0.50038 |
| D | 3.57353 | 7.83025 | 14.83876 |
| E | 2.67224 | 5.71149 | 5.82142 |
| F | 3.55702 | 0.51762 | 0.40777 |

The values of the parameters according to the conditions (12) to (17) in Example 9 are as follows.

(Values Corresponding to Conditions)

fw=5.2 fT=35

Y'=4.2

Lr1=13

Lr2=75.7

Lg1=27.61 fL1=−17.85

T=88.7

Tap=48.4

Condition (12): fw/Y'=1.24

Condition (13): Lr1/Lr2=0.17

Condition (14): Lg1/fw=5.31

Condition (15): Lr2/ft=2.16

Condition (16): |fL1/fw|=3.43

Condition (17): Tap/T=0.55

Accordingly, the numerical values according to the above-described conditions (12) and (17) shown in FIG. 33 as Example 9 are within the conditions.

Figure 34:
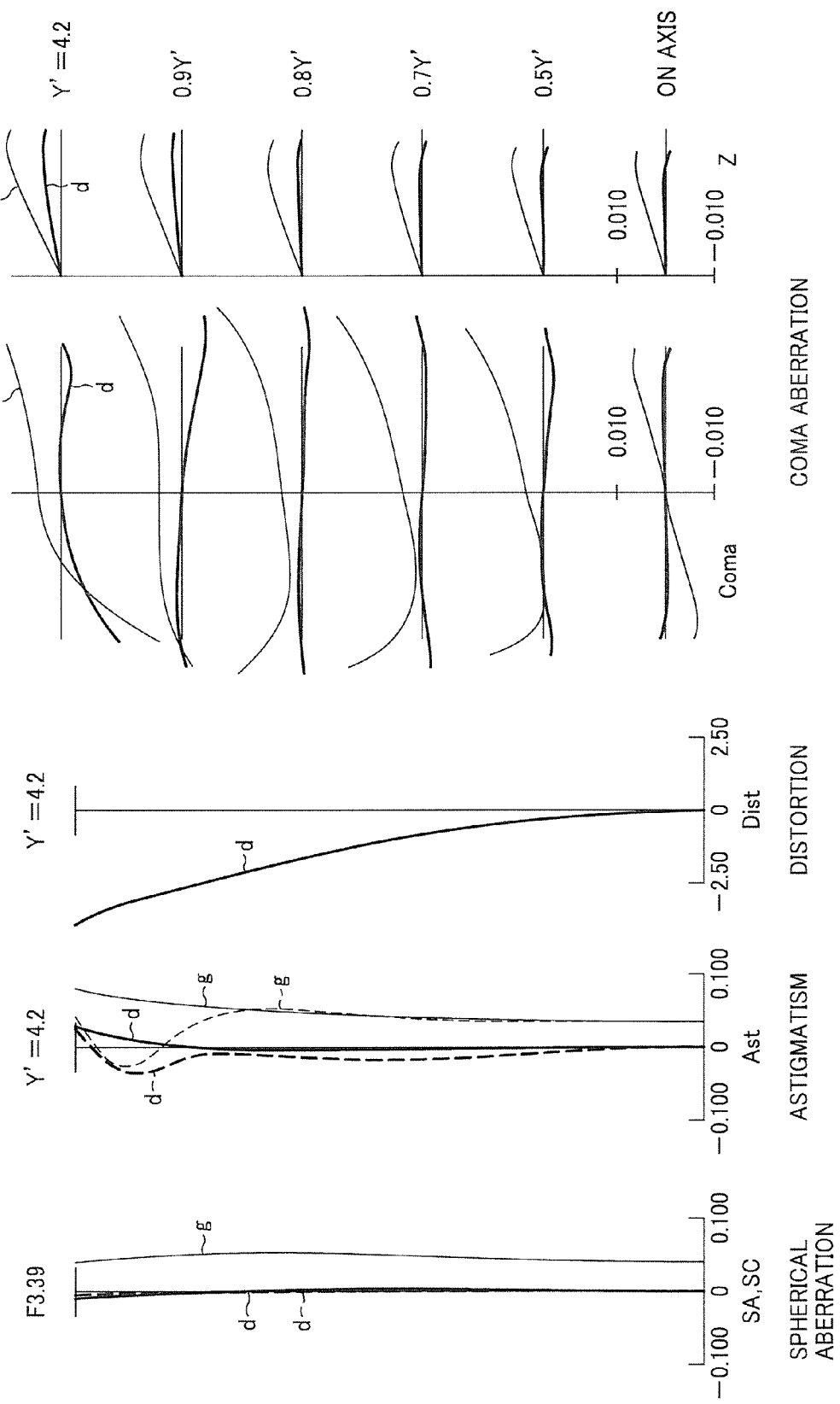
FIG. 34 is a view illustrating an aberration curve of a spherical aberration, astigmatism, distortion and coma aberration of the zoom lens according to Example 9 at a short focus end.
Figure 35:
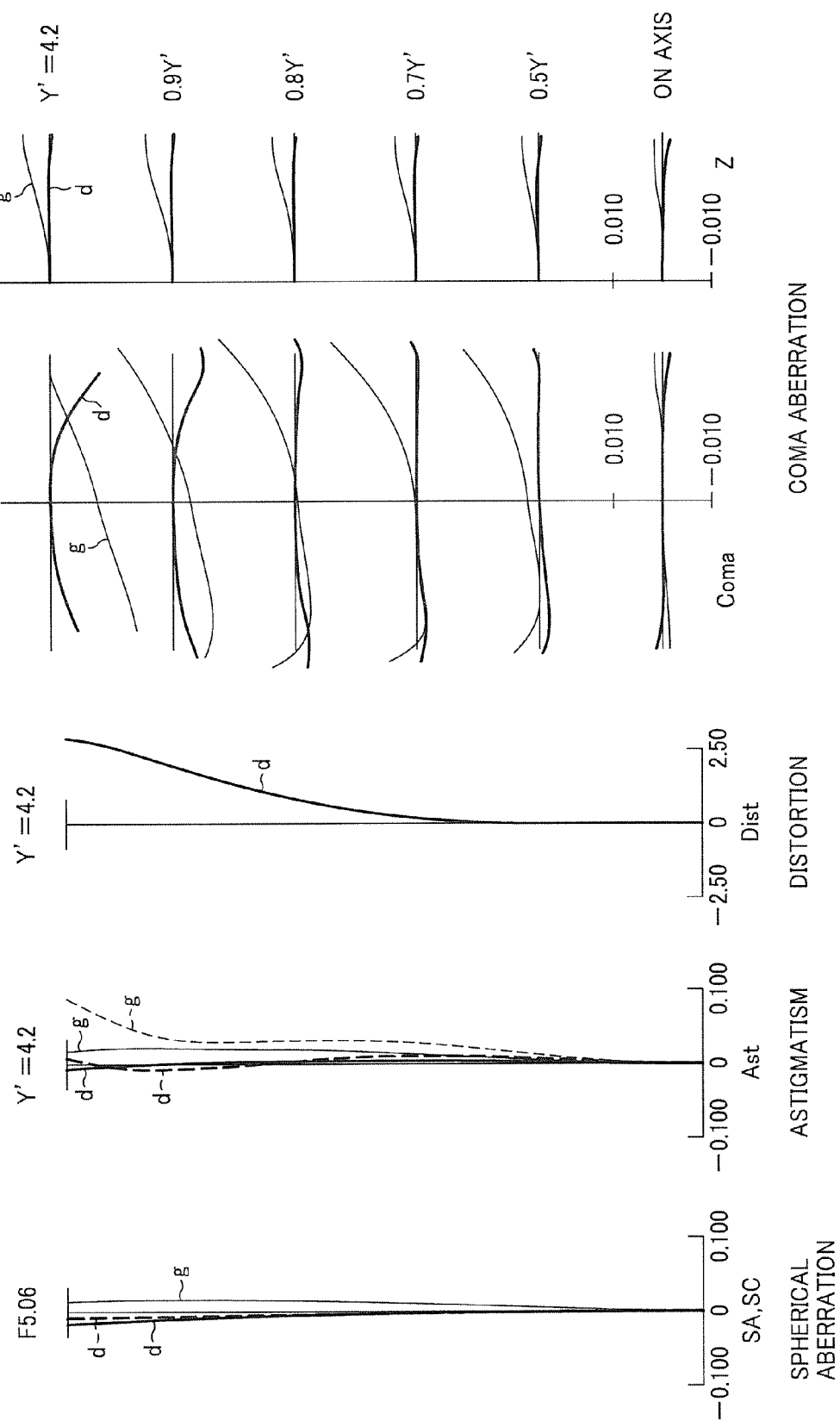
FIG. 35 is a view illustrating an aberration curve of a spherical aberration, astigmatism, distortion and coma aberration of the zoom lens according to Example 9 at an intermediate focal length position.
Figure 36:
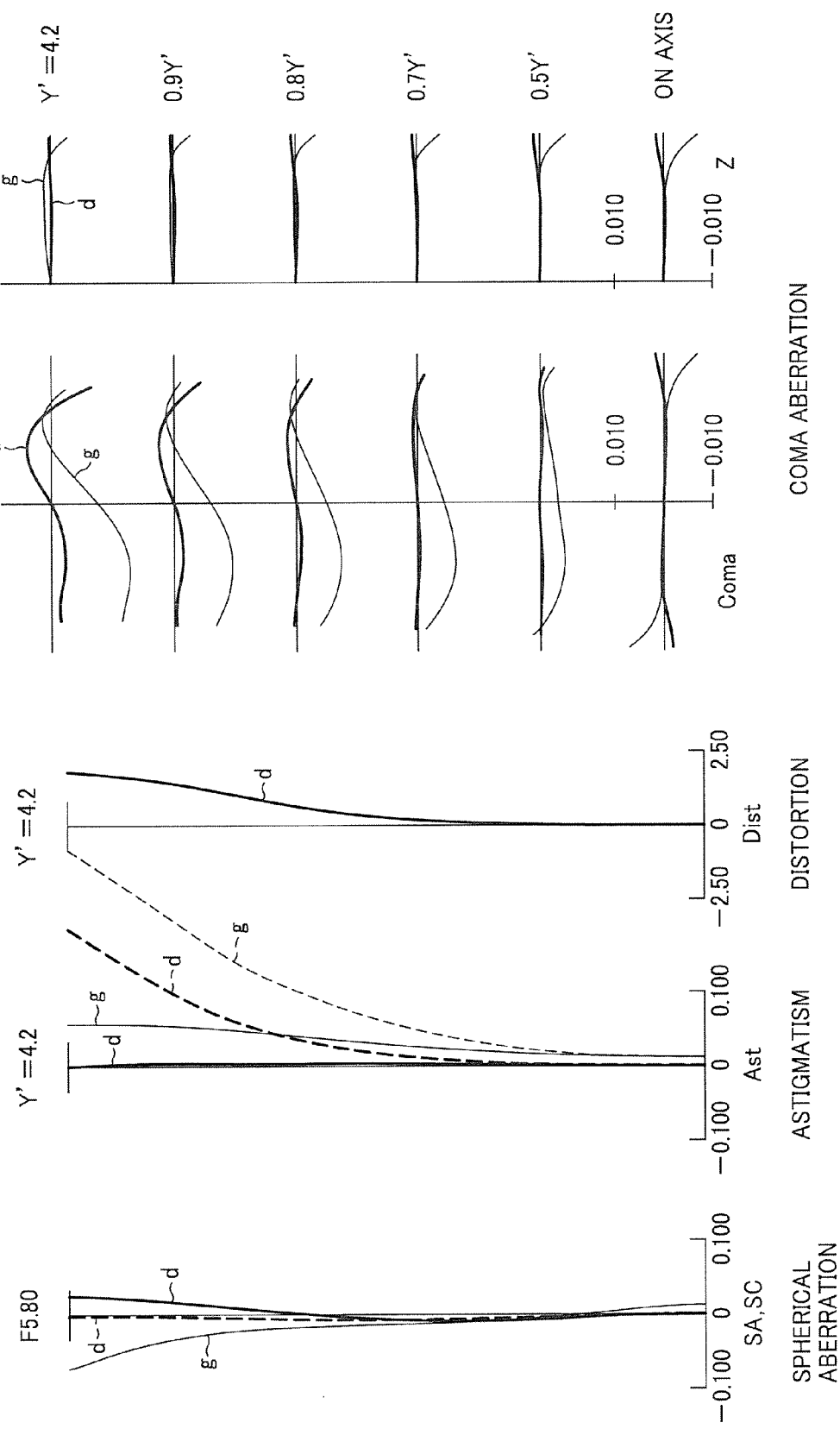
FIG. 36 is a view illustrating an aberration curve of a spherical aberration, astigmatism, distortion and coma aberration of the zoom lens according to Example 9 at a long focus end.

FIGS. 34 to 36 show aberration curves of spherical aberration, astigmatism, distortion, and coma aberration in the zoom lens according to Example 8 shown in FIG. 33. FIG. 34 shows the aberration curve at the wide angle end, FIG. 35 shows the aberration curve at the intermediate focal length position, and FIG. 36 shows the aberration curve at the telephoto end. In the spherical aberration curves, the broken line indicates a sine condition, and in astigmatism curves, the solid line indicates a sagittal image plane, the broken line indicates a meridional image plane.

According to the aberration curves shown in FIGS. 34 to 36, it is found that in the zoom lens of Example 9 shown in FIG. 33, the aberration is sufficiently corrected or controlled.

Due to the above configurations, in the zoom lens having six lens groups of positive-negative-positive-negative-positive-negative lens groups, it is possible to appropriately correct the various aberration and to provide the zoom lens, which has a sufficient small size and high performance while achieving the wide half angle of view of 38 degrees or more and the F-number FNo of 3.4 or less at the short focus end.

According to the above Example, the zoom lens can be appropriately applied to the digital camera having a small size body and high performance and therefore the zoom lens having wide half angle of view of 38 degrees or more, high variable magnification ratio of 6 or more and high performance corresponding to high resolution for an image pickup device having $5 \times 10^6$ to $10^7$ pixels can be provided.

Example 10

Next, the zoom lens according to Example 10 of the second embodiment will be explained with reference to FIG. 37.

Figure 37:
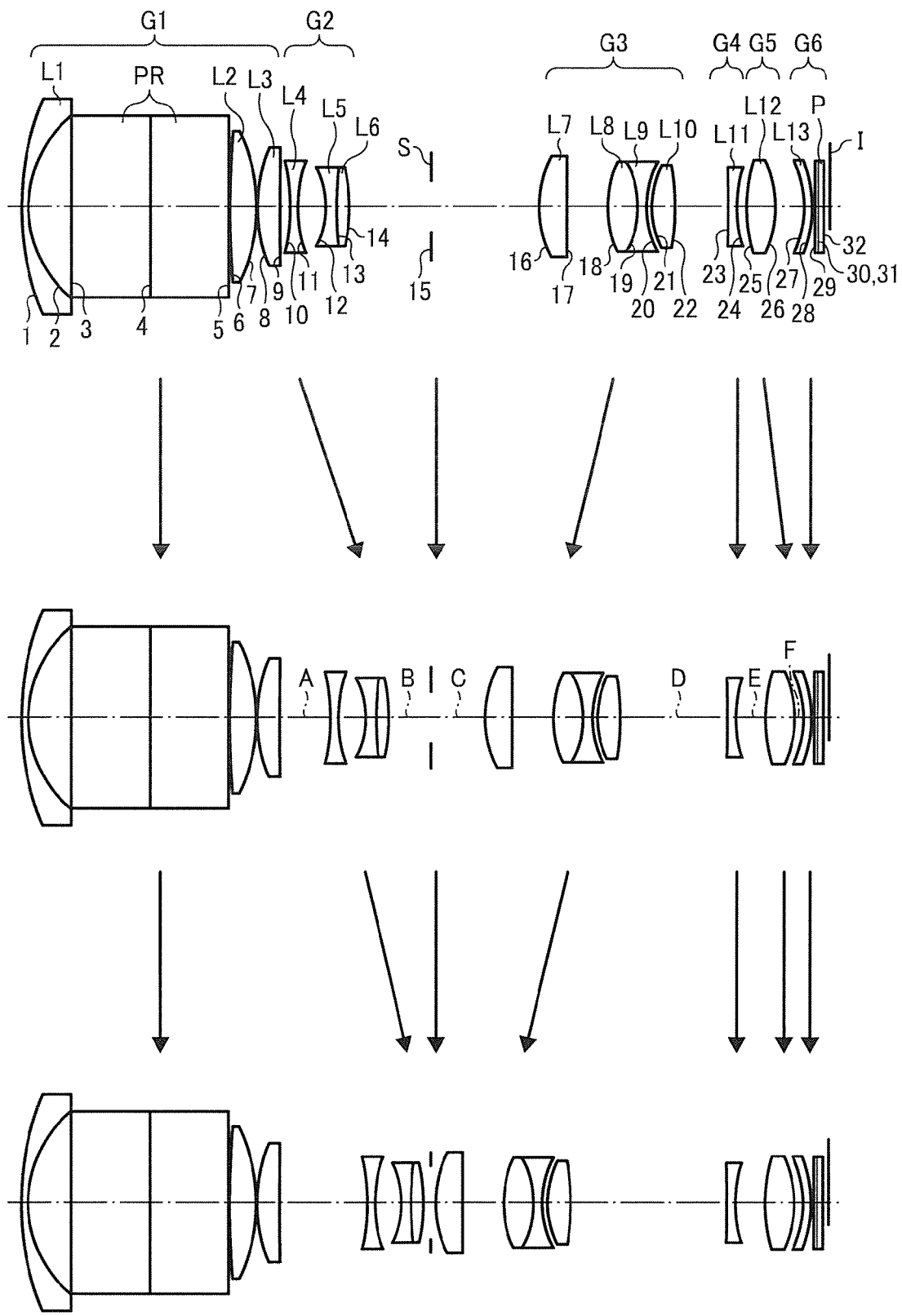
FIG. 37 is a sectional view schematically illustrating configurations of an optical system in a zoom lens according to Example 10 of the present invention.

FIG. 37 is a sectional view showing the configuration of the zoom lens according to Example 10 of the second embodiment and zooming movement loci when changing the magnification of the zoom lens from the wide angle end to the telephoto end through the intermediate focal length position.

The zoom lens includes, in order from the object side, the first lens group G1 having a positive refractive power The zoom lens includes the first lens group G1 having a positive refractive power, the second lens group G2 having a negative refractive power, the third lens group G3 having a positive refractive power, the fourth lens group G4 having a negative refractive power, the fifth lens group G5 having a positive refractive power, and the sixth lens group G6 having a negative refractive power. The zoom lens further includes an aperture stop S between the second lens group and the third lens group.

When changing the magnification of the zoom lens from the wide angle end to the telephoto end, an interval (A) between the first lens group G1 and the second lens group G2 is increased, an interval (B+C) between the second lens group G2 and the third lens group G3 is decreased, an interval (D) between the third lens group G3 and the fourth lens group G4 is increased, an interval (E) between the fourth lens group G4 and the fifth lens group G5 is increased, and an interval (F) between the fifth lens group G5 and the sixth lens group G6 is decreased.

In Example 10, the first lens group G1, the aperture stop S, the fourth lens group G4 and the sixth lens group G6 are not moved in a fixed state in zooming.

The first lens group G1 includes a negative meniscus lens L1 having a convex surface at the object side and an aspheric surface at the image side, a prism PR, and two positive lenses L2, L3 in order from the object side.

The second lens group G2 has a negative lens L4 which has a concave surface at both sides and where the concave surface at the imago side is formed as an aspheric surface and a cemented lens in which a negative lens L5 having a concave surface at both sides and a positive lens L6 having a convex surface at both sides are closely attached to each other to form a cemented lens in order from the object side.

The aperture stop S is disposed between the second lens group G2 and the third lens group G3.

The third lens group G3 includes a positive meniscus lens L7 which has a convex surface at both sides and where the stronger convex surface than the other is directed toward the object side and is formed as an aspheric surface, a cemented lens which is formed by a positive lens L8 having a convex surface at both sides and a negative lens L9 having a concave surface at both sides, and a positive lens having L10 having a convex surface at both sides, in order from the object side.

The fourth lens group G4 includes a negative meniscus lens L11 which has a concave surface at both sides and the concave surface at the image side is formed as an aspheric surface.

The fifth lens group G5 includes a positive lens L12 which has a convex surface at both sides and where the convex surface at the object side is formed as an aspheric surface.

The sixth lens group G6 includes a negative meniscus lens L13 having an aspheric surface at the object side and a convex surface at the image side.

As shown by Example 10, the parallel plate P is disposed between the sixth lens group G6 and the imaging surface I. Here, the parallel plate P corresponds to the optical element, for example, an optical filter such as a low-pass filter which is configured to cut a spatial frequency corresponding to excess of limit resolution of a solid-state image sensing device such as a CCD or the like disposed at an imaging surface I, or a cover glass which is configured to protect the image sensing device.

In Example 10, with changing the focal length from the wide angle end to the telephoto end, the focal length f of the zoom lens, the F-number FNo, and the half angle of view ω are respectively changed as follows.

Focal length f of the zoom lens: 5.2-35.0 mm

FNo (F-number): 3.57-5.85

Half angle of view ω: 38.9-6.8

The properties of each optical surface are shown in the following table (Table 19).

TABLE 19

| Surface No. | R | D | Nd | vd |
|---|---|---|---|---|
| 1 | 28.31032 | 0.70000 | 1.92286 | 18.90 |
| 2 | 11.25635 | 4.30000 | | |
| 3 | ∞ | 8.00000 | 1.88300 | 40.76 |
| 4 | ∞ | 8.00000 | 1.88300 | 40.76 |
| 5 | ∞ | 0.10000 | | |

TABLE 19-continued

| Surface No. | R | D | Nd | vd |
|---|---|---|---|---|
| 6 | 85.85108 | 2.71603 | 1.51633 | 64.14 |
| 7 | −17.03452 | 0.10000 | | |
| 8 | 16.20458 | 2.25308 | 1.64000 | 60.08 |
| 9 | 910.38236 | Variable (A) | | |
| 10 | −31.86938 | 0.80000 | 2.00330 | 28.27 |
| 11 | 9.20213 | 2.94713 | | |
| 12 | −7.46158 | 1.06977 | 1.58913 | 61.15 |
| 13 | 35.36813 | 1.23606 | 1.92286 | 18.90 |
| 14 | −16.73301 | Variable (B) | | |
| 15 | ∞ (Aperture stop) | Variable (C) | | |
| 16 | 10.71389 | 2.84516 | 1.71700 | 47.93 |
| 17 | −3109.41267 | 4.32612 | | |
| 18 | 11.54987 | 3.02339 | 1.61800 | 63.33 |
| 19 | −8.68996 | 0.80000 | 1.90366 | 31.32 |
| 20 | 8.58883 | 0.44713 | | |
| 21 | 8.82218 | 2.40401 | 1.48749 | 70.24 |
| 22 | −19.30681 | Variable (D) | | |
| 23 | −104.23069 | 0.80000 | 1.92286 | 18.90 |
| 24 | 16.11154 | Variable (E) | | |
| 25 | 21.61061 | 3.00000 | 1.48749 | 70.24 |
| 26 | −10.11978 | Variable (F) | | |
| 27 | −10.32054 | 0.80000 | 1.77250 | 49.00 |
| 28 | −12.64506 | 0.10000 | | |
| 29 | ∞ | 0.30000 | 1.52300 | 58.00 |
| 30 | ∞ | 0.10000 | | |
| 31 | ∞ | 0.50000 | 1.50000 | 64.00 |
| 32 | ∞ | | | |

In Table 19, each of a second surface, an 11th surface, a 16th surface, a 22nd surface, a 24th surface, a 25th surface, and a 27th surface is aspheric and the parameters in the equation (18) for each aspheric surface are as follows.

Aspheric surface: the 2nd surface $K=0.00000E+00$ $A_4=-2.71728E-06$ $A_6=-3.58900E-07$ $A_8=1.70392E-09$ $A_{10}=4.11931E-13$ Aspheric surface: the 11th surface $K\ 0.00000E+00$ $A_4=-1.24369E-04$ $A_6=1.17040E-06$ $A_8=-9.3606E-08$ $A_{10}=-1.94537E-09$ Aspheric surface: the 16th surface $K=0.00000E+00$ $A_4=-5.03986E-05$ $A_6=1.88819E-07$ $A_8=4.04258E-09$ $A_{10}=4.05202E-11$ Aspheric surface: the 22nd surface $K=0.00000E+00$ $A_4=2.35721E-04$ $A_6=1.56156E-06$ $A_8=-1.45635E-07$ $A_{10}=2.75915E-09$ Aspheric surface: the 24th surface $K=0.00000E+00$ $A_4=3.77794E-04$ $A_6=1.16807E-05$ $A_8=6.58942E-07$ $A_{10}=-4.47280E-08$ Aspheric surface: the 25th surface $K=0.00000E+00$ $A_4=1.70399E-04$ $A_6=2.68367E-05$ $A_8=1.09834E-05$ $A_{10}=-3.07464E-08$ Aspheric surface: the 27th surface $K=0.00000E+00$ $A_4=3.59460E-04$ $A_6=-5.08998E-05$ $A_8=1.62131E-06$ A variable interval A between the first lens group G1 and the second lens group G2, a variable interval B between the second lens group G2 and the aperture stop S, a variable interval C between the aperture stop S and the third lens group G3, a variable interval D between the third lens group G3 and the fourth lens group G4, a variable interval E between the fourth lend group G4 and the fifth lens group G1, a variable interval F between the fifth lens group G5 and the sixth lens group G6 are changed in zooming as shown in the following table (Table 20).

TABLE 20

|   | Wide-angle end | Intermediate focal length position | Telephoto end |
|---|---|---|---|
| A | 0.889 | 5.001 | 8.828 |
| B | 8.566 | 4.454 | 0.628 |
| C | 11.188 | 5.755 | 0.500 |
| D | 5.424 | 10.858 | 16.113 |
| E | 1.000 | 3.351 | 3.485 |
| F | 3.167 | 0.816 | 0.682 |

The values of the parameters according to the conditions (12) to (17) in Example 10 are as follows.

(Values Corresponding to Conditions)

fw=5.2 fT=35

Y'=4.2

Lr1=13

Lr2=69.5

Condition (12); fw/Y'=1.24

Condition (13); Lr1/Lr2=0.19

Condition (14): Lg1/fw=5.03

Condition (16): Lr2/ft=1.99

Condition (16): |fL1/fw|=3.97

Condition (17): Tap/T=0.51

Accordingly, the numerical values according to the above-described conditions (12) and (17) shown in FIG. 37 as Example 10 are within the conditions.

Figure 38:
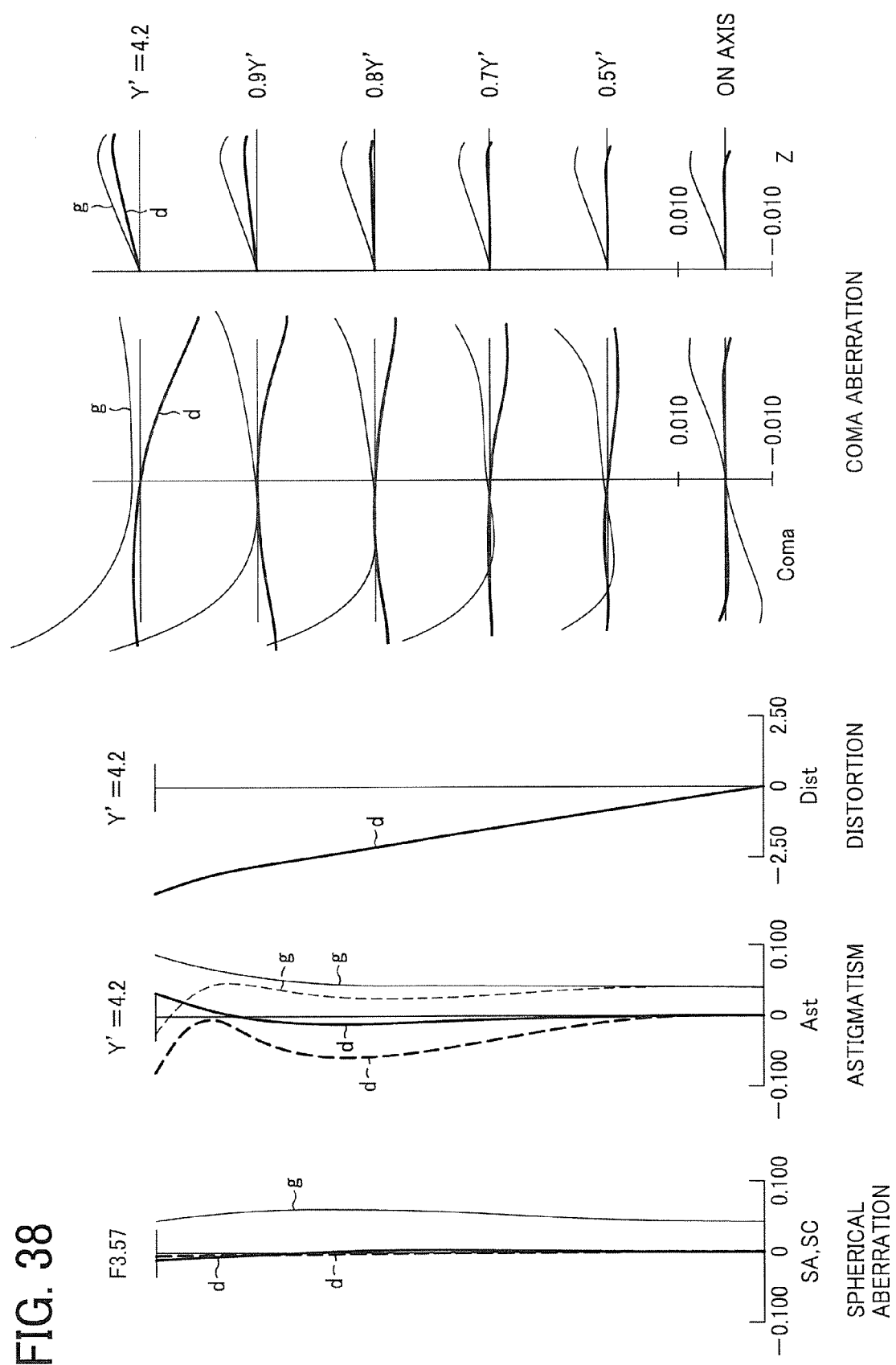
FIG. 38 is a view illustrating an aberration curve of a spherical aberration, astigmatism, distortion and coma aberration of the zoom lens according to Example 10 at a short focus end.
Figure 39:
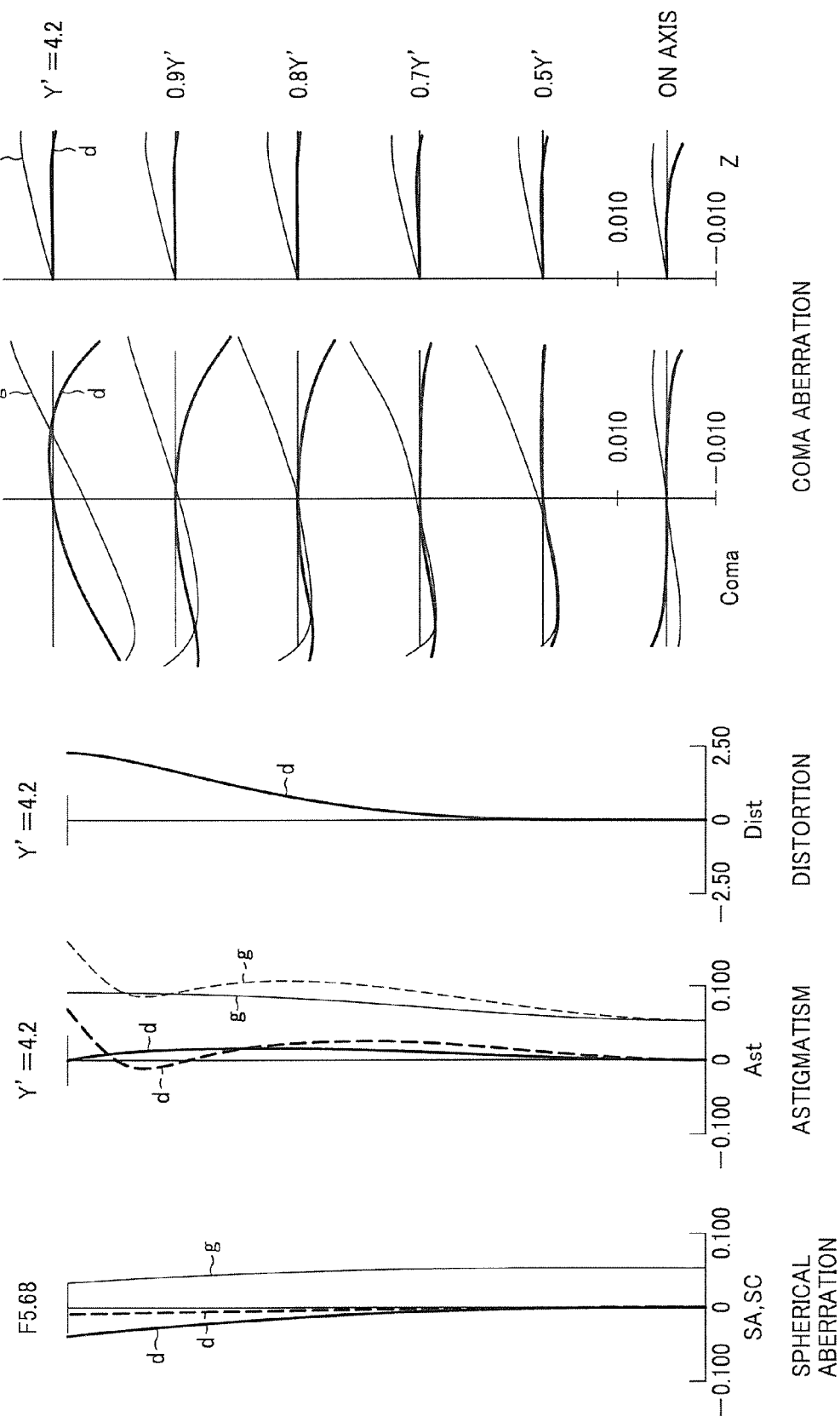
FIG. 39 is a view illustrating an aberration curve of a spherical aberration, astigmatism, distortion and coma aberration of the zoom lens according to Example 10 at an intermediate focal length position.
Figure 40:
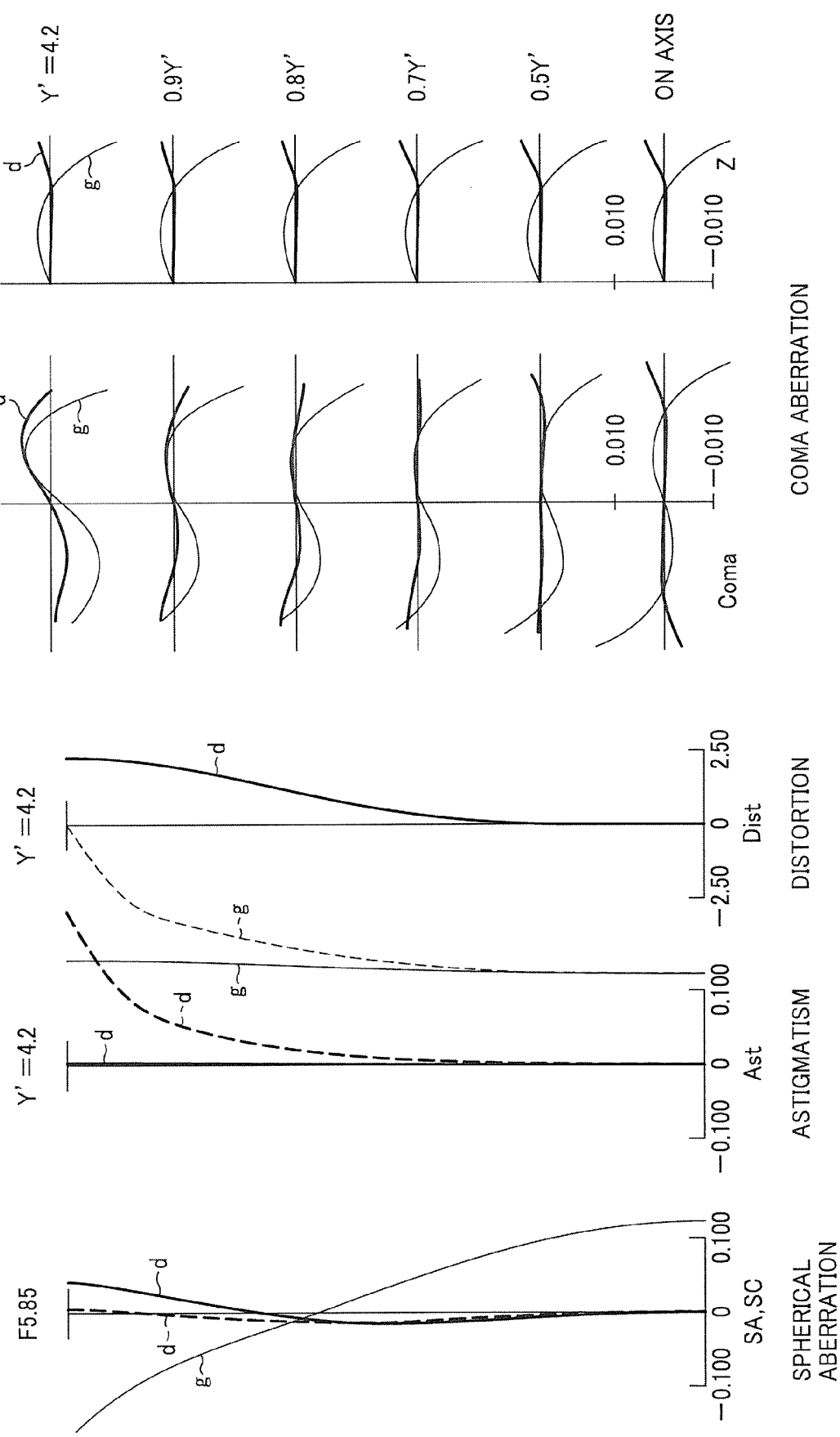
FIG. 40 is a view illustrating an aberration curve of a spherical aberration, astigmatism, distortion and coma aberration of the zoom lens according to Example 10 at a long focus end.

FIGS. 38 to 40 show aberration curves of spherical aberration, astigmatism, distortion, and coma aberration in the zoom lens according to Example 10 shown in FIG. 37. FIG. 38 shows the aberration curve at the wide angle end, FIG. 39 shows the aberration curve at the intermediate focal length position, and FIG. 40 shows the aberration curve at the telephoto end. In the spherical aberration curves, the broken line indicates a sine condition, and in astigmatism curves, the solid line indicates a sagittal image plane, the broken line indicates a meridional image plane.

According to the aberration curves shown in FIGS. 38 to 40, it is found that in the zoom lens of Example 10 shown in FIG. 37, the aberration is sufficiently corrected or controlled.

Due to the above configurations, in the zoom lens having six lens groups of positive-negative-positive-negative-positive-negative lens groups, it is possible to appropriately correct the various aberration and to provide the zoom lens, which has a sufficient small size and high performance while achieving the wide half angle of view of 38 degrees or more and the F-number FNo of 3.5 or lose at the short focus end.

According to this Example, the zoom lens can be appropriately applied to a digital camera having a small size body and high performance and therefore a zoom lens having wide half angle of view of 38 degrees or more, high variable magnification ratio of 5 or more and high performance corresponding to high resolution for an image pickup device having $5\times10^6$ to $10^7$ pixels can be provided.

Fourth Embodiment

Next, an imaging apparatus such as a camera, a personal data assistant or the like using the zoom lens according to an embodiment of the present invention as an imaging optical system will be explained in detail with reference to the drawings.

Figure 41A:
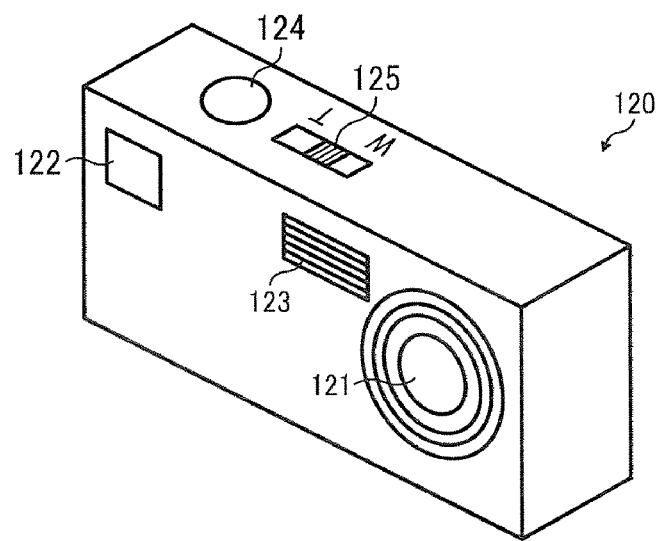
FIG. 41A is a perspective view of a camera according to the fourth embodiment of the present invention from a front side in a collapsed state.
Figure 41B:
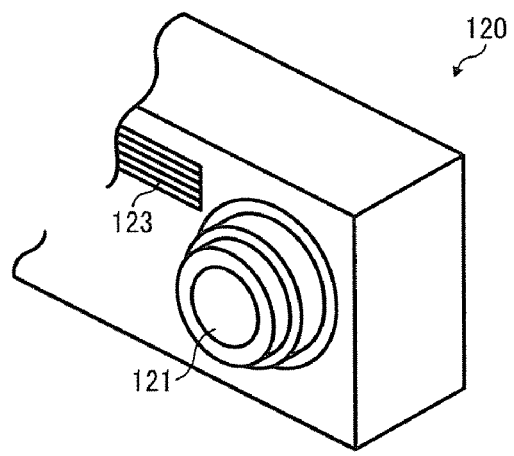
FIG. 41B is a perspective view of a part of a camera according to the fourth embodiment of the present invention from a front side in an extended state.
Figure 41C:
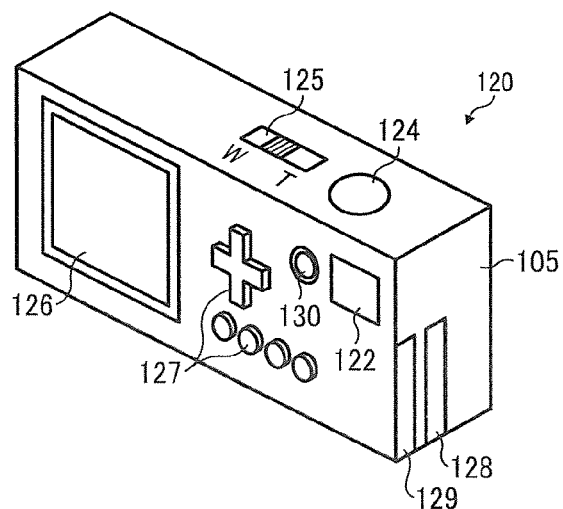
FIG. 41C is a perspective view of a camera according to the fourth embodiment of the present invention from a back side.

FIGS. 41A to 41C are perspective views illustrating an external constitution of a camera constituted by adopting an imaging optical system of the zoom lens according to any one of the above-described Examples 1 to 10 of the present invention. Within these, FIG. 41A is a perspective view illustrating in a frame format an external appearance of a collapsed state of a camera (that is, a state in which a photographic lens unit is collapsed) viewed from a front side (the side of the object, that is, the side of the photogenic subject). FIG. 41B is a perspective view illustrating a partial external appearance of an in-use state of the camera (that is, a state in which the photographic lens unit is extended) viewed from the front side. FIG. 41C is a perspective view illustrating in a frame format an external appearance of the camera viewed from a back side (the side of the photographer). In addition, FIG. 42 is a block diagram illustrating a functional constitution of the camera illustrated in FIG. 41.

A camera 120 illustrated in FIGS. 41A, 41B and 41C includes a photographic lens 121, a finder 122, a strobe 123, a shutter button 121, a zoom lever 123, a liquid crystal display (LCD) monitor 126, an operating button unit 127, a power switch 130, a memory slot 129 and a communication card slot 128 or the like.

Figure 42:
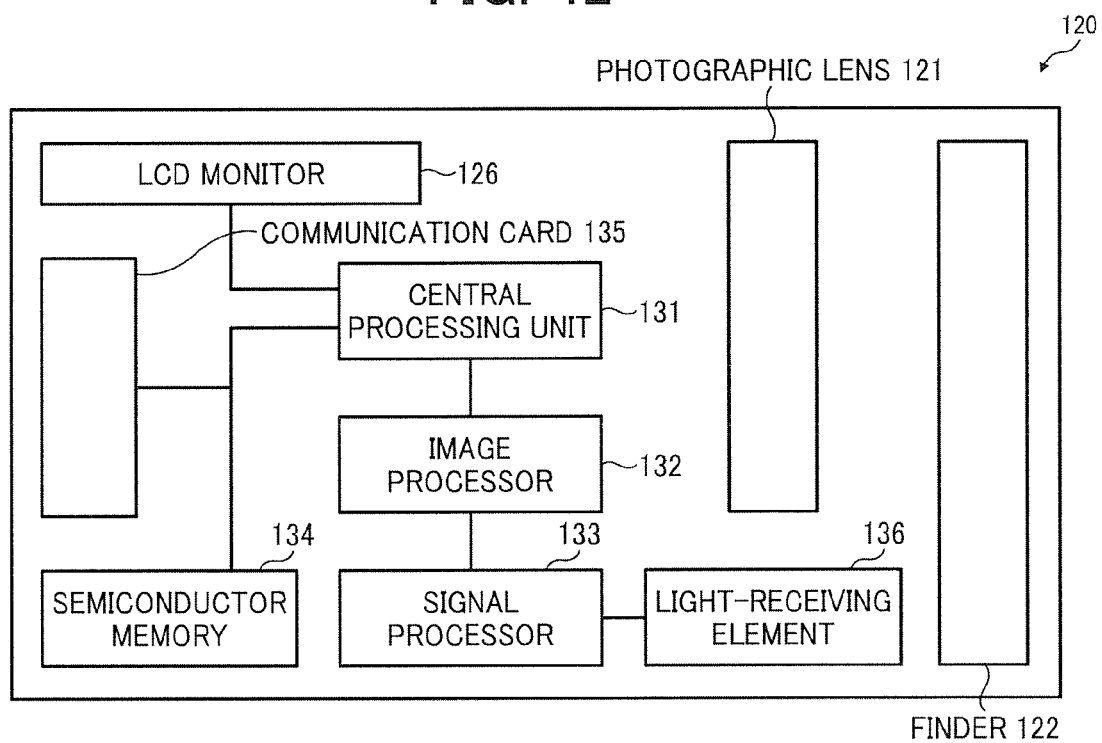
FIG. 42 is a block diagram showing a system structure of the camera according to the fourth embodiment of the present invention.

Furthermore, as illustrated in FIG. 42, functional blocks of the camera 120 include a central processing unit (CPU) 131, an image processor 132, a signal processor 133, a semiconductor memory 134, the LCD monotor 126, a communication card 135 or the like and a light receiving element 136.

First, general constitutions of the camera illustrated in FIGS. 41A to 41C and FIG. 42 are described.

The camera illustrated in FIGS. 41A to 41C includes the photographic lens 121 and a not illustrated light receiving element (an area sensor, that is, the later-described light receiving element 136) in which images of a photographed target, which are formed through the photographic lens 121, are constituted to be read by the light receiving element 136.

In FIG. 42, outputs from the light receiving element 136 (area sensor) are processed by the signal processor 133 (the signal processor 133 is controlled by the central processing unit 131) and converted into digital information. Image information digitalized by the signal processor 133 is image-processed in the image processor 132 (the image processor 132 is controlled by the central processor 131). Image information is then recorded in the semiconductor memory 134. Images during photographing or images recorded in the semiconductor memory 134 can be displayed in the liquid crystal monitor 126. In addition, images recorded in the semiconductor memory 134 can possibly be sent out externally using the communication card 135 or the like.

When the camera is carried in a pocket or the like, the photographic lens 121 is in a collapsed state as illustrated in FIG. 41A. When a user turns on the power by operating the power switch 130, a lens barrel is extended as illustrated in FIG. 41B. At this moment, each lens group of the zoom lens internal to the lens barrel is, for example, disposed at a wide angle end. Dispositions of each lens group of the zoom lens are changed by operating the zoom lever 125 and magnification changes towards a telephoto end can be performed. At this moment, the finder 122 also changes magnification by coupling to angle of view changes of the photographic lens 121.

Focusing is performed by pushing half-way the shutter button 124. Focusing can be performed by movements of the lens elements or relative movements of the light receiving element 136 against the photographic lens optical system. Photographing is performed when the shutter button 124 is further pushed-into and the above-described processing is performed thereafter.

The operating button 127 is used for operation when images recorded in the semiconductor memory 134 are displayed in the LCD monitor 126 or sent out externally using the communication card 135 or the like. The semiconductor memory 134 and the communication card 135 or the like are respectively inserted into an exclusive or general-purpose slot (hereby, the memory card slot 129 and communication card slot 128) for usage.

In addition, in the above-described camera, the zoom lens can be used as the photographic lens optical system. Therefore, a small sized and high image quality camera using the light receiving element 136 of a grade of 5 million to 10 million pixels can be realized.

Next, further detailed constitutions of the camera illustrated in FIGS. 41A to 41C and FIG. 42 adopting the imaging apparatus of the present invention are described. However, although the following descriptions are made with regard to the camera, a so called PDA (personal data assistant) or a mobile information terminal device of a cell phone or the like incorporating camera functions has been released in recent years. Although such mobile information terminal devices have slightly differing outside appearances, they may incorporate virtually identical functions and constitutions as the camera illustrated in FIGS. 41A to 41C and FIG. 42 and the imaging optical system of the imaging apparatus according to the present invention can be adopted in such mobile information terminal devices.

The camera according to the present invention includes the photographic lens 121 as the photographic lens optical system and the light receiving element 136 (FIG. 42) as the area sensor of a CCD (charge coupled device) image pickup device or the like. Images of a photogenic subject formed by the photographic lens 121 (imaging optical system) are constituted to be read by the light receiving element 136. The imaging optical system of the imaging apparatus according to the present invention described in FIG. 17 and so on is used as the photographic lens 121. Specifically, as described above, lenses or the like as the optical elements that constitute the photographic lens optical system (zoom lens) are used for constituting a lens unit. The lens unit has a mechanism that retains each lens or the like so that at least each lens group is movable by operation. The photographic lens 121 incorporated in the camera according to the present invention is normally incorporated in the form of this lens unit.

According to an embodiment of the present invention, a zoom lens, an imaging apparatus, and a personal data assistant in which a sufficiently small body and high variable magnification ratio can be obtained while achieving high performance and wide angle of view can be provided.

Although the present invention has been described in terms of exemplary embodiments, it is not limited thereto. It should be appreciated that variations may be made in the embodiments described by persons skilled in the art without departing from the scope of the present invention as defined by the following claims.

What is claimed is:

1. A zoom lens comprising:
a first optical system having a positive focal length, the first optical system including a deflection optical element configured to reflect and deflect a light path;
a second optical system having a negative focal length;
a third optical system having a positive focal length;
a fourth optical system having a negative focal length;
a fifth optical system having a positive focal length, the first to fifth optical systems being arranged in order from an object side to an image side; and
an aperture stop provided at an object side of the third optical system,
wherein when changing a magnification of the zoom lens from a short focus end to a long focus end, the first lens group is fixed, an interval between the first optical system and the second optical system increases, an interval between the second optical system and the aperture stop decreases, an interval between the aperture stop and the third optical system decreases, an interval between the third optical system and the fourth optical system increases, and an interval between the fourth optical system and the fifth optical system varies; and
wherein the following condition is satisfied:

$$0.5 < (T23w/Y')/(ft/fw) < 1.0$$

where T23w is an interval between the second optical system and the third optical system at the short focus end, Y' is a maximum image height of the zoom lens, ft is a focal length of the zoom lens at the long focus end, and fw is a focal length of the zoom lens at the short focus end; and wherein the following condition is satisfied:

$$0.2 < Ts3w/T2sw < 1.5$$

where Ts3w is an interval between the aperture stop and the third optical system at the short focus end, and T2sw is an interval between the second optical system and the aperture stop at the short focus end.

2. The zoom lens according to claim 1, wherein a maximum aperture diameter Dt of the aperture stop at the long focus end is larger than a maximum aperture diameter Dw of the aperture stop at the short focus end.

3. The zoom lens according to claim 1, wherein the following condition is satisfied:

$$2.0 > Dt/Dw > 1.1$$

where Dt is a maximum aperture diameter of the aperture stop at the long focus end and Dw is a maximum aperture diameter of the aperture stop at the short focus end.

4. The zoom lens according to claim 1, wherein the following conditions are satisfied:

$$-3.0 < f2/Y' < -1.2$$

$$2.0 < f3/Y' < 4.0$$

where f2 is a focal length of the second optical system and f3 is a focal length of the third optical system.

5. The zoom lens according to claim 1, wherein the fourth optical system remains still when changing the magnification of the zoom lens from the short focus end to the long focus end.

6. The zoom lens according to claim 1, wherein the following conditions are satisfied:

$$3.5 > b2t/b2w > 2.0$$

$$3.0 > b3t/b3w > 1.5$$

where b2t is a lateral magnification of the second optical system at the long focus end, b2w is a lateral magnification of the second optical system at the short focus end, b3t is a lateral magnification of the third optical system at the long focus end, and b3w is a lateral magnification of the third optical system at the short focus end.

7. The zoom lens according to claim 1, wherein the following condition is satisfied:

$$1.0 > (b3t/b3w)/(b2t/b2w) > 0.5$$

where b2t is a lateral magnification of the second optical system at the long focus end, b2w is a lateral magnification of the second optical system at the short focus end, b3t is a lateral magnification of the third optical system at the long focus end, and b3w is a lateral magnification of the third optical system at the short focus end.

8. An imaging apparatus comprising the zoom lens according to claim 1.

* * * * *